(12) United States Patent
Kobayashi et al.

(10) Patent No.: US 9,710,955 B2
(45) Date of Patent: Jul. 18, 2017

(54) IMAGE PROCESSING DEVICE, IMAGE PROCESSING METHOD, AND PROGRAM FOR CORRECTING DEPTH IMAGE BASED ON POSITIONAL INFORMATION

(75) Inventors: Goh Kobayashi, Tokyo (JP); Takuro Kawai, Tokyo (JP); Toshinori Ihara, Tokyo (JP); Keisuke Yamaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 14/110,957

(22) PCT Filed: May 11, 2012

(86) PCT No.: PCT/JP2012/062087
§ 371 (c)(1),
(2), (4) Date: Oct. 10, 2013

(87) PCT Pub. No.: WO2012/157540
PCT Pub. Date: Nov. 22, 2012

(65) Prior Publication Data
US 2014/0043335 A1   Feb. 13, 2014

(30) Foreign Application Priority Data
May 19, 2011   (JP) .................. 2011-112312

(51) Int. Cl.
*G06T 15/08*   (2011.01)
*H04N 13/04*   (2006.01)
(Continued)

(52) U.S. Cl.
CPC .............. *G06T 15/08* (2013.01); *G06T 19/20* (2013.01); *H04N 13/0022* (2013.01);
(Continued)

(58) Field of Classification Search
CPC ... G06T 19/006; G06T 7/0051; G06T 7/0071; H04N 13/0022; H04H 13/0472
(Continued)

(56) References Cited

U.S. PATENT DOCUMENTS 5,852,504 A * 12/1998 Kato .................. G03H 1/08
                                                     359/22
6,603,485 B2 * 8/2003 Forman .............. G06F 21/84
                                                     345/157
(Continued)

FOREIGN PATENT DOCUMENTS

| JP | 2000-341721 | 12/2000 |
|---|---|---|
| JP | 2000-354257 | 12/2000 |

(Continued)

*Primary Examiner* — Kee M Tung
*Assistant Examiner* — Yanna Wu
(74) *Attorney, Agent, or Firm* — Paratus Law Group, PLLC

(57) ABSTRACT

This technology relates to an image processing device, an image processing method, and a program capable of realizing motion parallax closely related to that of the real world. An image processing unit corrects a depth image formed of a depth value indicating a position in a depth direction of each pixel of a color image of a predetermined viewpoint externally input as an input image based on positional information indicating a position of a viewer and the like. This technology is applicable to an image processing device, which performs a process to correct the depth image based on the positional information as an image process, for example.

15 Claims, 59 Drawing Sheets

(51) Int. Cl.
*H04N 13/00* (2006.01)
*G06T 19/20* (2011.01)

(52) U.S. Cl.
CPC ..... *H04N 13/0472* (2013.01); *H04N 13/0475* (2013.01); *G06T 2219/2016* (2013.01)

(58) Field of Classification Search
USPC ................................................ 345/633, 427
See application file for complete search history.

(56) References Cited

U.S. PATENT DOCUMENTS

| | | | | |
|---|---|---|---|---|
| 2005/0195295 | A1* | 9/2005 | Kawai | H04N 5/2254 |
| | | | | 348/239 |
| 2006/0082644 | A1* | 4/2006 | Tsubaki | H04N 13/0282 |
| | | | | 348/42 |
| 2011/0193863 | A1* | 8/2011 | Gremse | G02B 27/225 |
| | | | | 345/419 |
| 2011/0268177 | A1* | 11/2011 | Tian | G06T 7/0071 |
| | | | | 375/240.01 |
| 2012/0057040 | A1* | 3/2012 | Park | H04N 5/2254 |
| | | | | 348/222.1 |
| 2012/0099836 | A1* | 4/2012 | Welsh | H04N 13/004 |
| | | | | 386/230 |

FOREIGN PATENT DOCUMENTS

| | | |
|---|---|---|
| JP | 2004-007395 | 1/2004 |
| JP | 2008-146221 | 6/2008 |
| JP | 2010-211036 | 9/2010 |
| WO | WO2004/082297 | 9/2004 |

\* cited by examiner

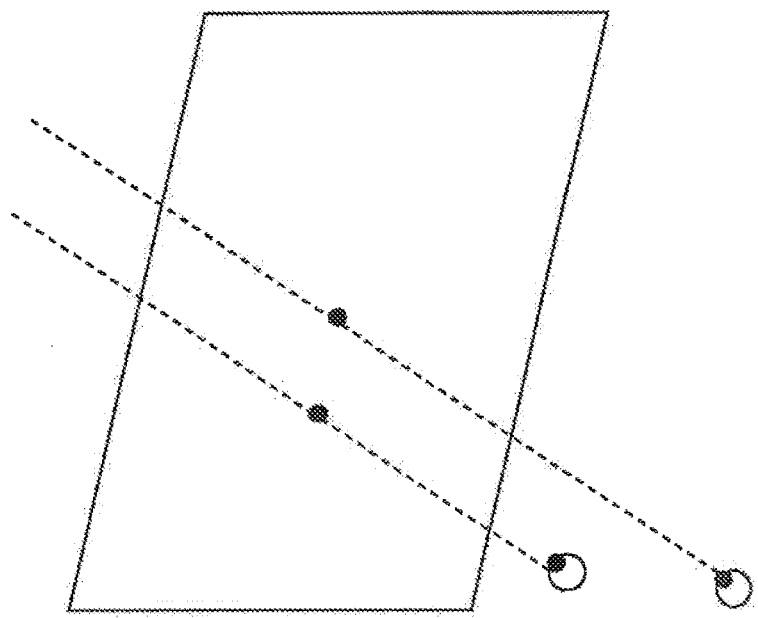
FIG. 2
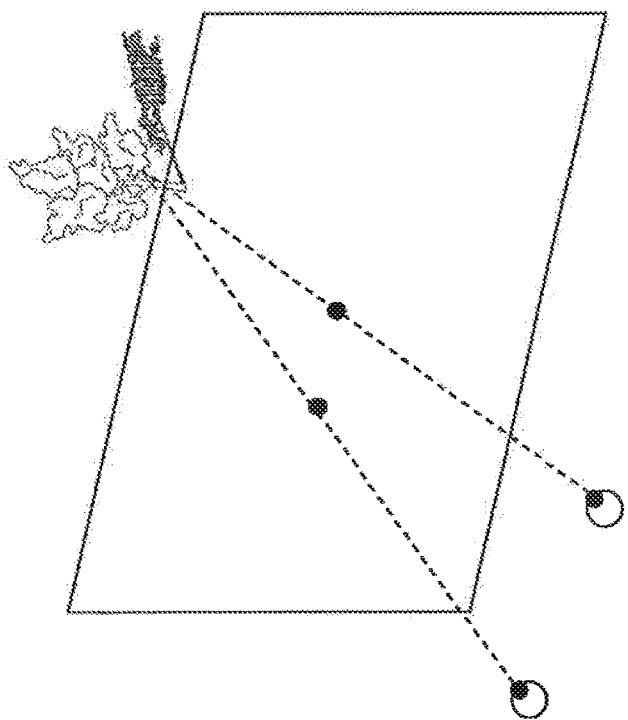

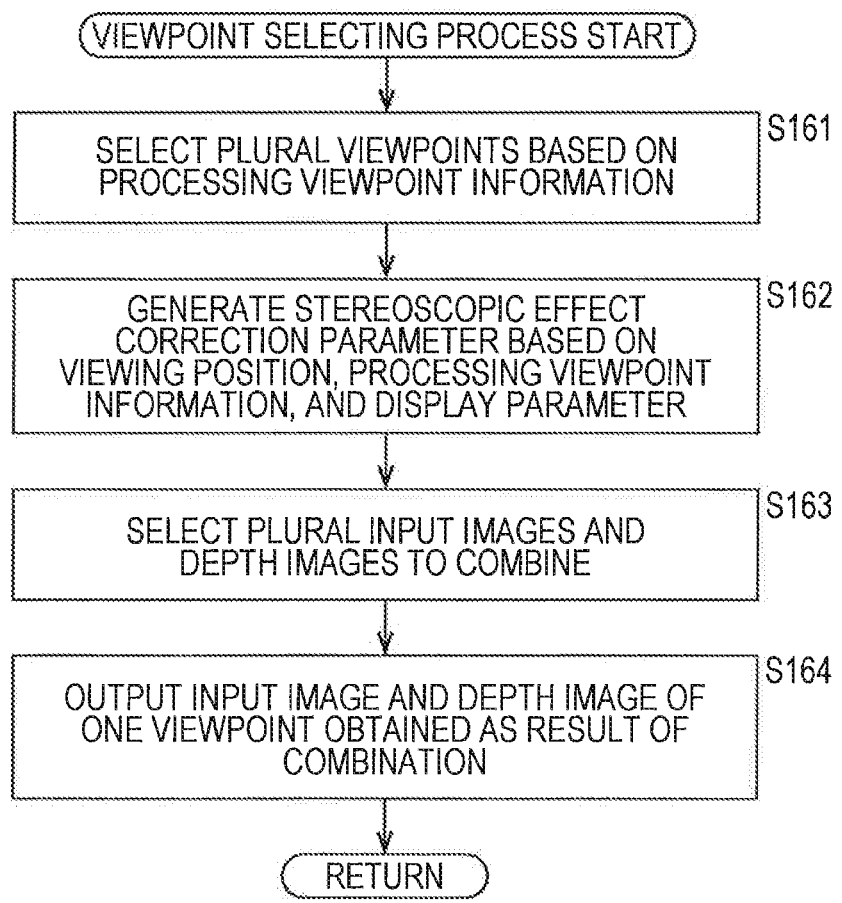

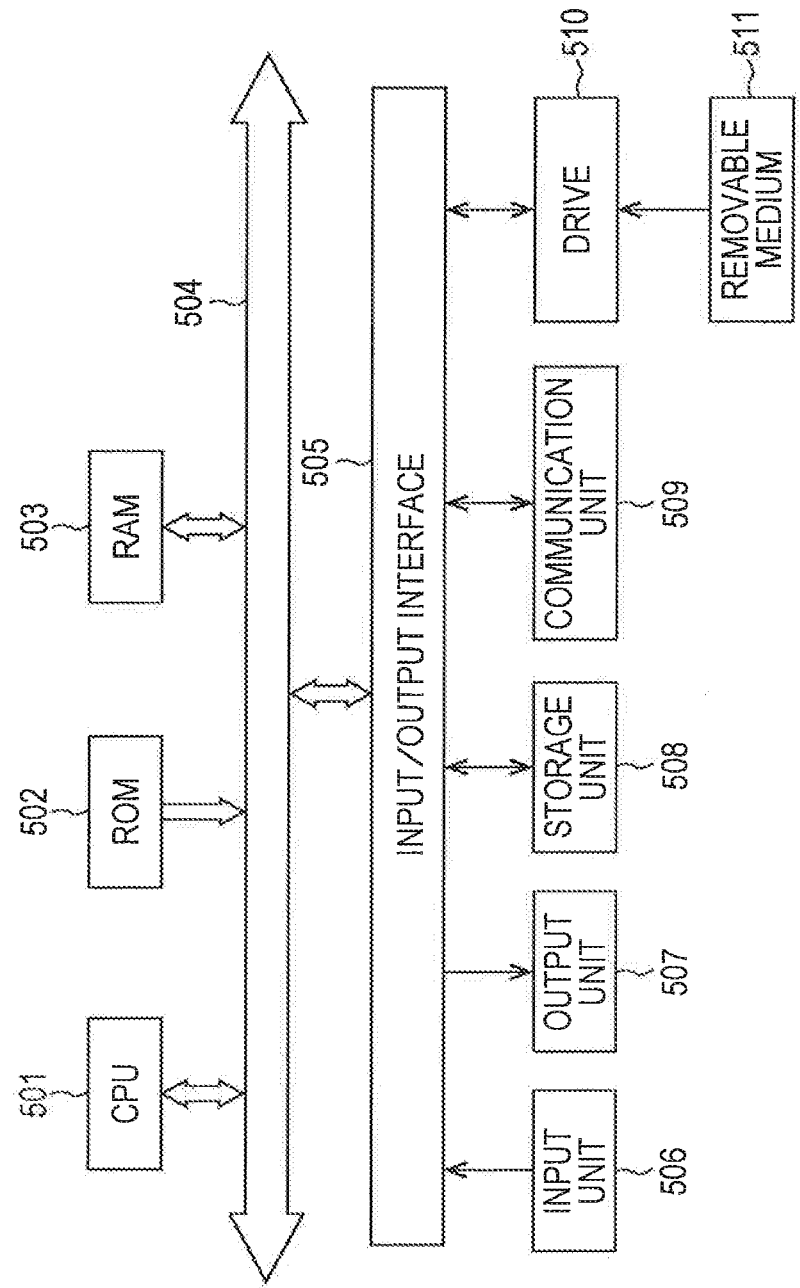

IMAGE PROCESSING DEVICE, IMAGE PROCESSING METHOD, AND PROGRAM FOR CORRECTING DEPTH IMAGE BASED ON POSITIONAL INFORMATION

CROSS REFERENCE TO PRIOR APPLICATION

This application is a National Stage Patent Application of PCT International Patent Application No. PCT/JP2012/062087 (filed on May 11, 2012) under 35 U.S.C. §371, which claims priority to Japanese Patent Application No. 2011-112312 (filed on May 19, 2011), which are all hereby incorporated by reference in their entirety.

TECHNICAL FIELD

This technology relates to an image processing device, an image processing method, and a program and especially relates to the image processing device, the image processing method, and the program capable of realizing motion parallax closely relate to that of the real world.

BACKGROUND ART

In currently popular 2D display and 3D display, which displays a two-view (single view) 3D image, the same 3D image is displayed regardless of a position of a viewer. Therefore, the viewer cannot enjoy the motion parallax obtained in the real world.

Although the 3D display, which displays a multi-view 3D image, is becoming popular (for example, refer to Patent Document 1), the number of viewpoints of the image, which may be displayed, is small, so that it is difficult to sufficiently realize the motion parallax. Meanwhile, the term multiple viewpoints herein refers to three or more viewpoints.

In the conventional 3D display, the motion parallax different from that of the real world might be realized. For example, an absolute position of fusing changes according to change in the position in a depth direction of the viewer.

Specifically, as illustrated in FIG. 1, when eyes of the viewer approach the 3D display by Δv when the viewer approaches one's face and the like, a position in the depth direction of an image of a tree moves in a direction toward a far side. That is to say, a distance Δd of the image of the tree from a display surface changes to a distance Δd'. This is different from a sense in the real world, so that the viewer has a feeling of strangeness. Meanwhile, FIG. 1 is a view of the viewer who views the 3D display seen from above.

In the 3D display, as illustrated in FIG. 2, when a position in a horizontal direction of the eyes of the viewer significantly changes when the viewer inclines one's face and the like, the fusing becomes difficult and the viewer might feel fatigued.

CITATION LIST

Patent Document

Patent Document 1: JP 2010-211036 A

SUMMARY OF THE INVENTION

Problems to be Solved by the Invention

As described above, the conventional display cannot realize the motion parallax closely related to that of the real world.

This technology is achieved in view of such a condition and an object thereof is to realize the motion parallax closely related to that of the real world.

Solutions to Problems

An image processing device according to one aspect of this technology is an image processing device provided with an image processing unit, which corrects a depth image formed of a depth value indicating a position in a depth direction of each pixel of a color image of a predetermined viewpoint based on viewer positional information being information indicating a position of a viewer.

An image processing method and a program according to one aspect of this technology correspond to the image processing device according to one aspect of this technology.

In one aspect of this technology, the depth image formed of the depth value indicating the position in the depth direction of each pixel of the color image of a predetermined viewpoint is corrected based on the viewer positional information being the information indicating the position of the viewer.

Effects of the Invention

According to one aspect of this technology, it is possible to realize the motion parallax closely related to that in the real world.

BRIEF DESCRIPTION OF DRAWINGS

FIG. 2 is a view illustrating another example of the display in the conventional 3D display.

FIG. 59 is a flowchart illustrating the viewpoint selecting process by the input viewpoint selecting unit in FIG. 56 in detail.

FIG. 60 is a view illustrating a configuration example of one embodiment of a computer.

MODE FOR CARRYING OUT THE INVENTION

First Embodiment

[Configuration Example of First Embodiment of Image Processing Device]

Figure 1:
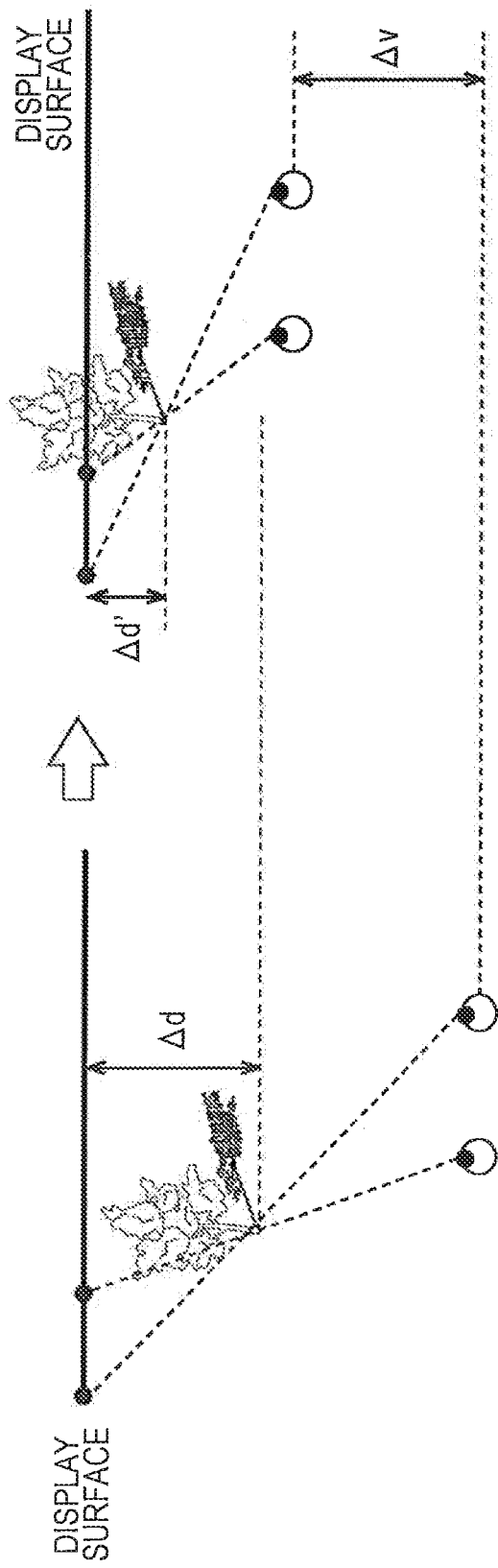
FIG. 1 is a view illustrating an example of display in a conventional 3D display.
Figure 3:
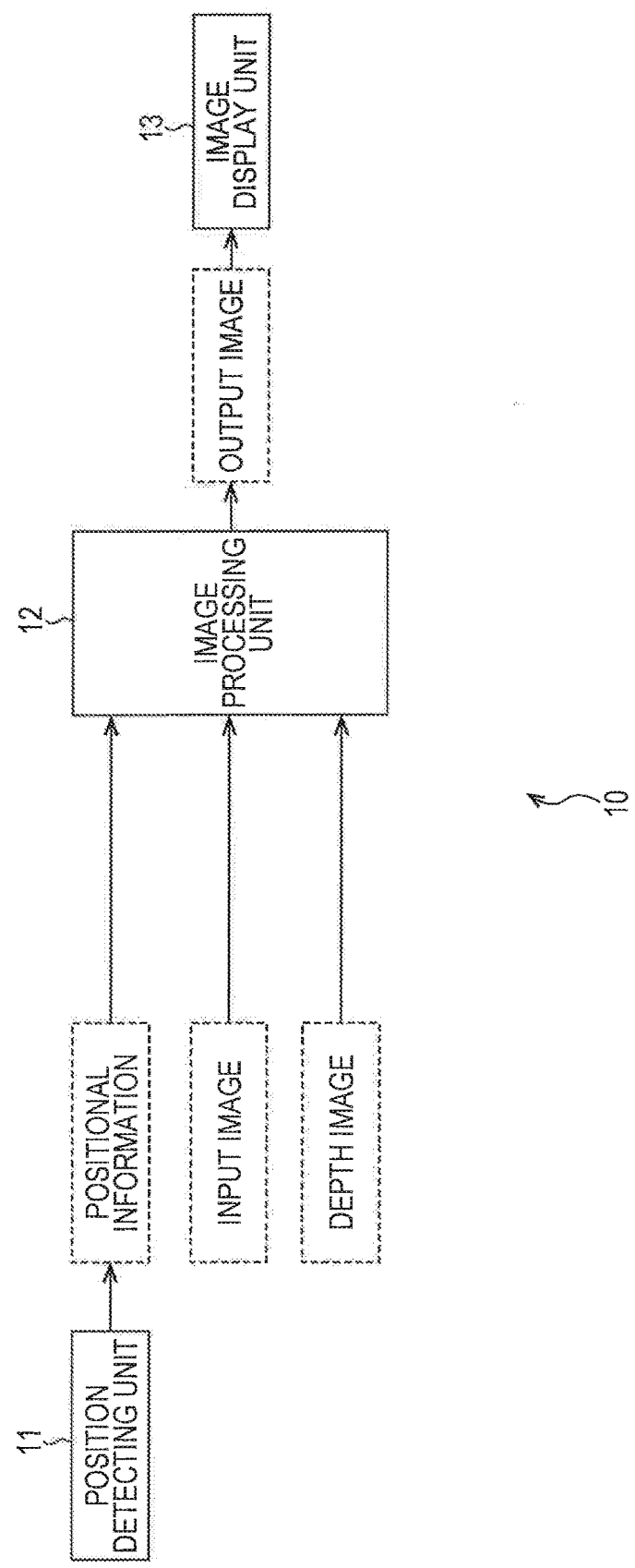
FIG. 3 is a block diagram illustrating a configuration example of a first embodiment of an image processing device to which this technology is applied.

FIG. 3 is a block diagram illustrating a configuration example of a first embodiment of an image processing device to which this technology is applied.

An image processing device 10 in FIG. 3 composed of a position detecting unit 11, an image processing unit 12, and an image display unit 13 realizes motion parallax of a color image of one viewpoint based on a position of a viewer.

Specifically, the position detecting unit 11 of the image processing device 10 is composed of a camera, various sensors and the like mounted on the image display unit 13, for example. The position detecting unit 11 detects a position of a head, both eyes, or a single eye of the viewer in a direction including at least a depth direction as a viewing position.

The position detecting unit 11 also detects a position of a point of gaze of the viewer from an eye direction of the viewer and the like. The position detecting unit 11 supplies positional information indicating the detected viewing position and position of the point of gaze to the image processing unit 12.

A color image of one or more viewpoints is externally input as an input image and a depth image of one or more viewpoints corresponding to the input image is externally input to the image processing unit 12. Meanwhile, the depth image (depth map) is an image formed of a depth value indicating a position of each pixel of the corresponding color image in the depth direction. In this embodiment, the depth value is set to 0 when the position in the depth direction is a position on a display surface, set to a negative value when this is a position on a near side of the display surface (side of the viewer), and set to a positive value when this is a position on a far side of the display surface.

The image processing unit 12 corrects the input image and the depth image, which are externally input, based on the positional information supplied from the position detecting unit 11 and generates the color image of one predetermined viewpoint as an output image using the corrected input image and depth image. The image processing unit 12 supplies the output image to the image display unit 13.

The image display unit 13 composed of a 2D display displays the output image supplied from the image processing unit 12.

Figure 4:
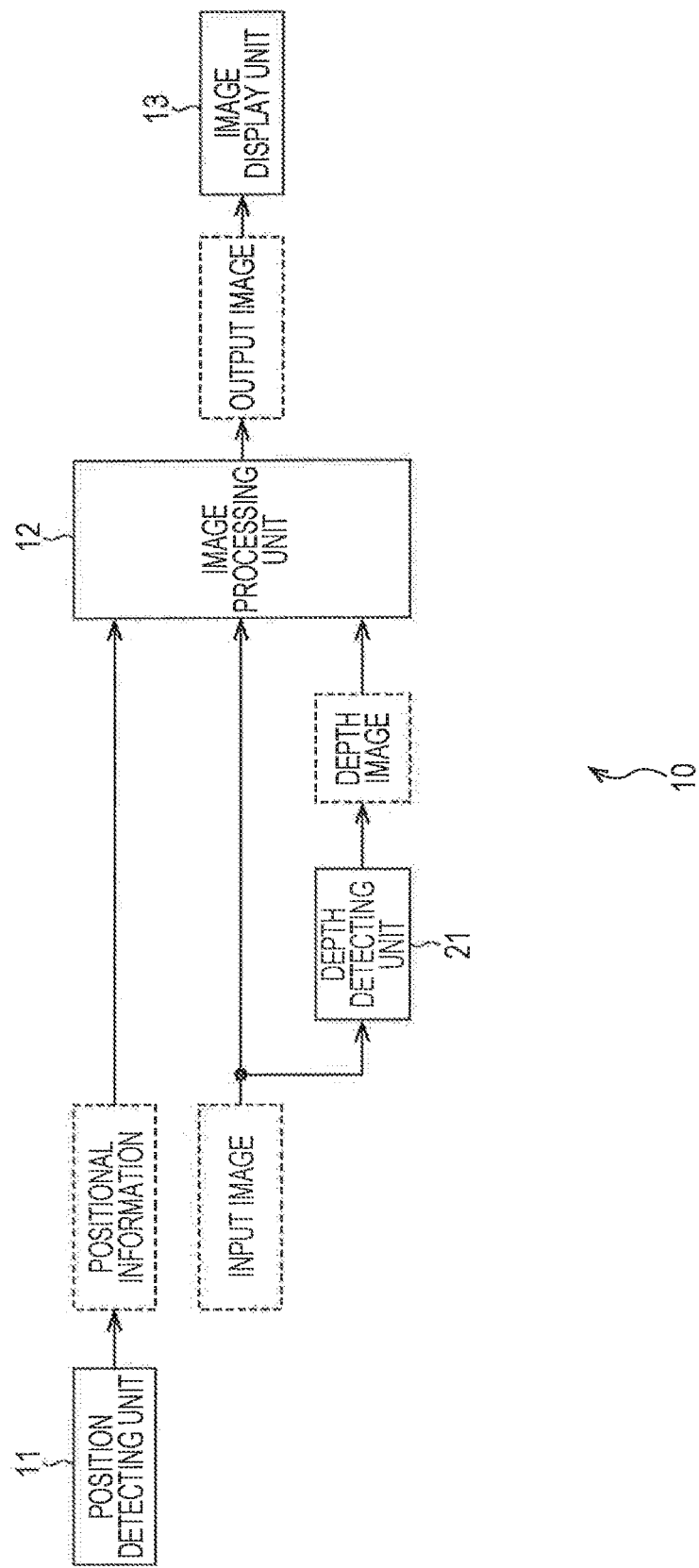
FIG. 4 is a block diagram illustrating another configuration example of the first embodiment of the image processing device to which this technology is applied.

Meanwhile, although the depth image of one or more viewpoints corresponding to the input image is input in the image processing device 10 in FIG. 3, this may also be generated from the input image. In this case, the image processing device 10 is provided with a depth detecting unit 21, which generates the depth image of one or more viewpoints from the input image, as illustrated in FIG. 4.

[Detailed Configuration Example of Image Processing Unit]

Figure 5:
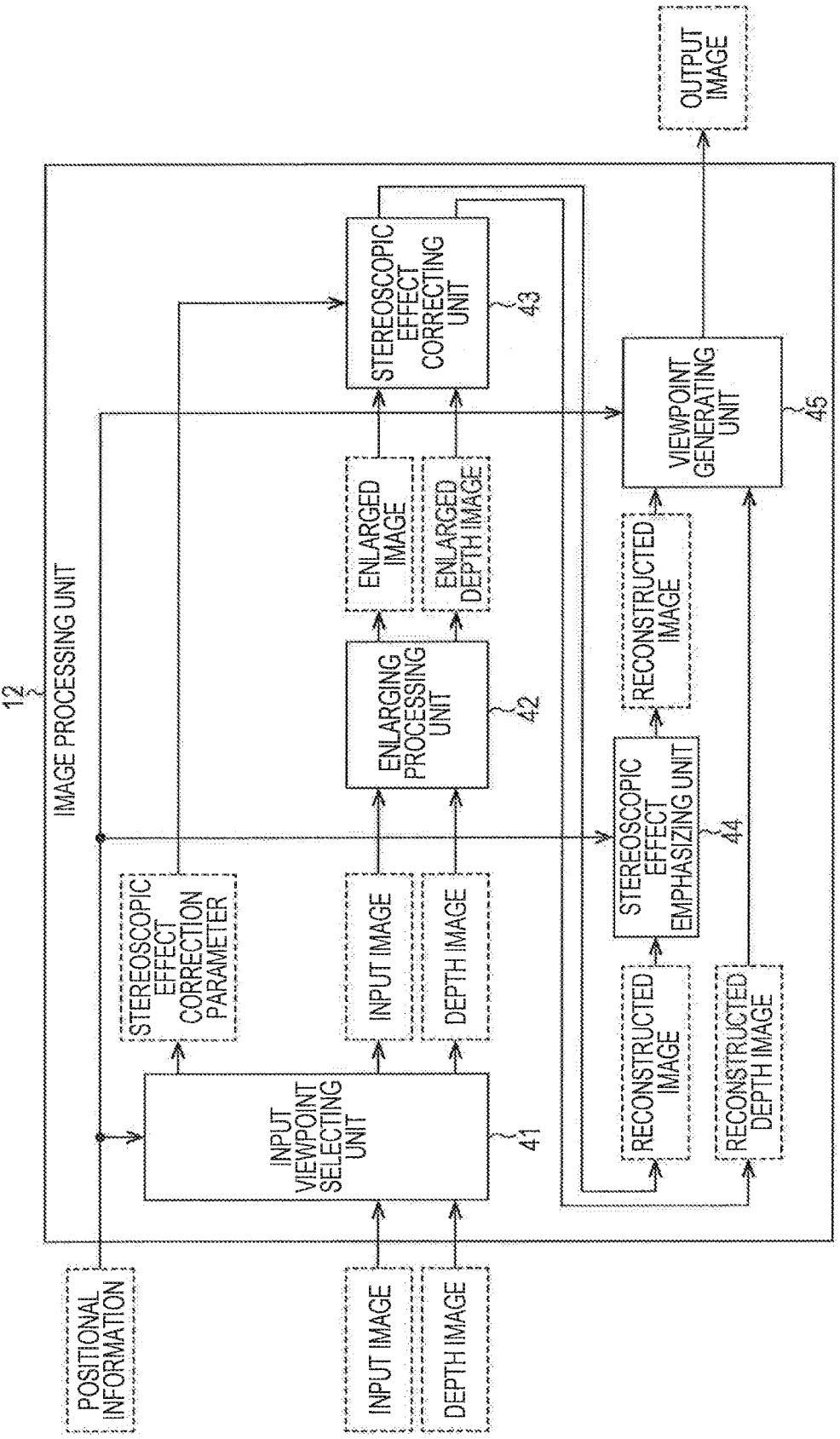
FIG. 5 is a block diagram illustrating a detailed configuration example of an image processing unit in FIG. 3.

FIG. 5 is a block diagram illustrating a detailed configuration example of the image processing unit 12 in FIG. 3.

The image processing unit 12 in FIG. 5 is composed of an input viewpoint selecting unit 41, an enlarging processing unit 42, a stereoscopic effect correcting unit 43, a stereoscopic effect emphasizing unit 44, and a viewpoint generating unit 45.

The input viewpoint selecting unit 41 selects a predetermined viewpoint from the viewpoint of the input image, which is externally input, based on the viewing position indicated by the positional information supplied from the position detecting unit 11. Then, the input viewpoint selecting unit 41 generates the input image and the depth image of one predetermined viewpoint using the input image of the selected predetermined viewpoint and the corresponding depth image and supplies the same to the enlarging processing unit 42. The input viewpoint selecting unit 41 also generates a stereoscopic effect correction parameter, which is a parameter used by the stereoscopic effect correcting unit 43, based on the viewing position indicated by the positional information and supplies the same to the stereoscopic effect correcting unit 43.

The enlarging processing unit 42 performs an enlarging process to the input image and the depth image supplied from the input viewpoint selecting unit 41. This enlarging process is performed for obtaining the output image having desired resolution in consideration of a scaling process by the stereoscopic effect correcting unit 43 and a difference in resolution between the input image and the output image. The enlarging processing unit 42 supplies the input image after the enlarging process to the stereoscopic effect correcting unit 43 as an enlarged image and supplies the depth image after the enlarging process to the stereoscopic effect correcting unit 43 as an enlarged depth image.

The stereoscopic effect correcting unit 43 performs a process to correct a stereoscopic effect (hereinafter, referred to as a motion parallax process) for obtaining the motion parallax closely related to that of the real world to the enlarged image and the enlarged depth image supplied from the enlarging processing unit 42. The stereoscopic effect correcting unit 43 supplies the enlarged image after the motion parallax process to the stereoscopic effect emphasizing unit 44 as a reconstructed image and supplies the enlarged depth image after the motion, parallax process to the viewpoint generating unit 45 as a reconstructed depth image.

The stereoscopic effect emphasizing unit 44 performs a process to emphasize the stereoscopic effect (hereinafter, referred to as an aerial perspective process) for obtaining aerial perspective to the reconstructed image supplied from the stereoscopic effect correcting unit 43 based on the position of the point of gaze indicated by the positional information supplied from the position detecting unit 11.

For example, the stereoscopic effect emphasizing unit 44 performs a process to improve edge enhancement and texture enhancement to an area in the vicinity of the point of gaze of the reconstructed image and performs a process to reduce the edge enhancement and the text enhancement to an area other than this area based on the position of the point of gaze. The stereoscopic effect emphasizing unit 44 also performs a process to improve a contrast to the area in the vicinity of the point of gaze of the reconstructed image and performs a process to reduce the contrast to the area other than this area. According to this, the aerial perspective is obtained and the stereoscopic effect is emphasized in the reconstructed image. The stereoscopic effect emphasizing unit 44 supplies the reconstructed image after the aerial perspective process to the viewpoint generating unit 45.

The viewpoint generating unit 45 serves as a display control unit and a projecting processing unit. The viewpoint generating unit 45 performs a projecting process to project the color image toward the viewing position to the reconstructed image supplied from the stereoscopic effect emphasizing unit 44 based on the viewing position indicated by the positional information supplied from the position detecting unit 11 and the reconstructed depth image supplied from the stereoscopic effect correcting unit 43. The viewpoint generating unit 45 supplies the color image of one predetermined viewpoint obtained as a result to the image display unit 13 (FIG. 3) as the output image and allows the same to display the image.

Figure 6:
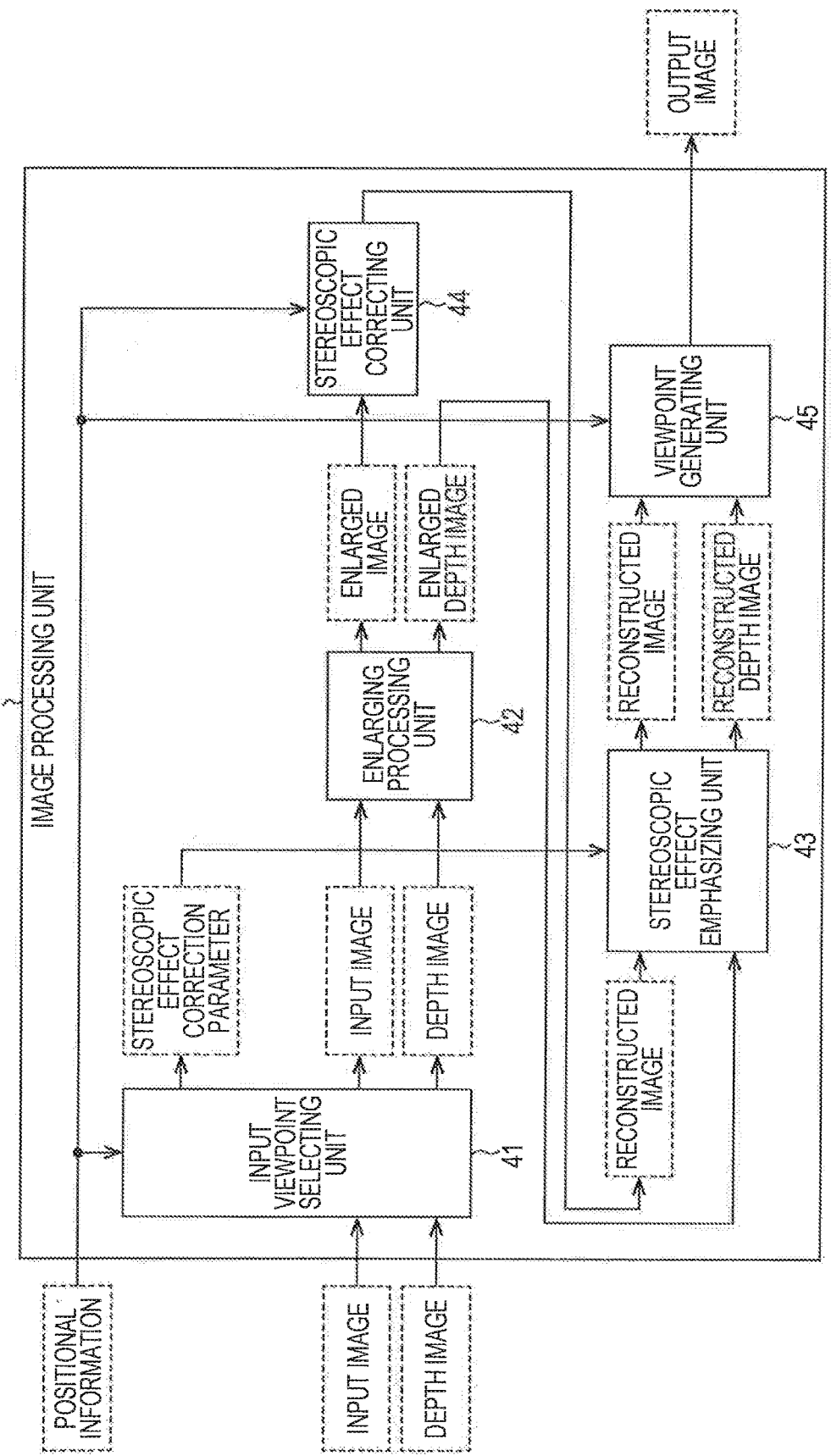
FIG. 6 is a block diagram illustrating another detailed configuration example of the image processing unit in FIG. 3.

Meanwhile, although the image processing unit 12 in FIG. 5 is provided with the stereoscopic effect emphasizing unit 44 on a subsequent stage of the stereoscopic effect correcting unit 43, it is also possible that the stereoscopic effect correcting unit 43 is provided on a subsequent stage of the stereoscopic effect emphasizing unit 44 as illustrated in FIG. 6.

[Detailed Configuration Example of Input Viewpoint Selecting Unit]

Figure 7:
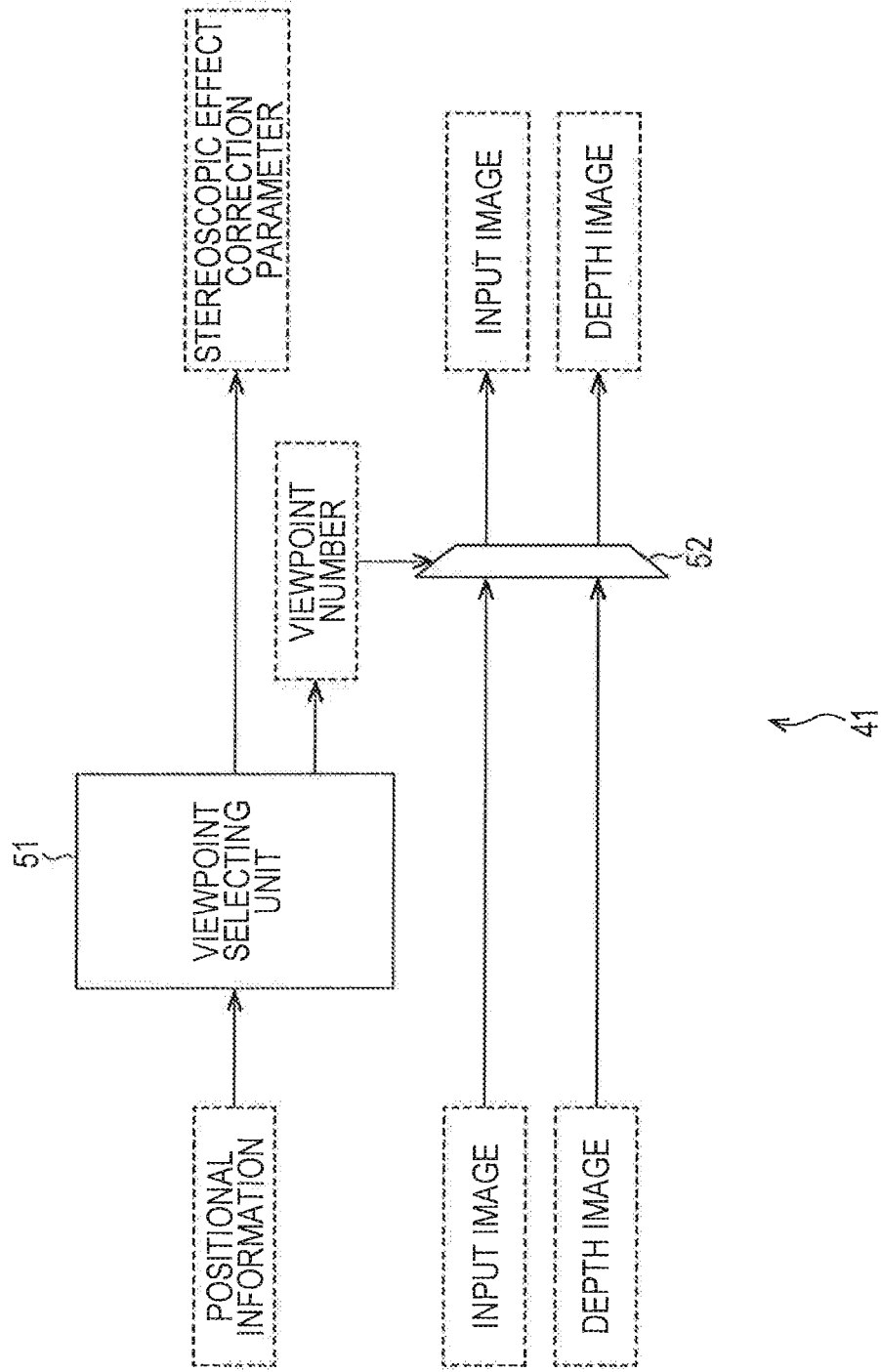
FIG. 7 is a block diagram illustrating a detailed configuration example of an input viewpoint selecting unit in FIG. 3.

FIG. 7 is a block diagram illustrating a detailed configuration example of the input viewpoint selecting unit 41 in FIG. 3.

The input viewpoint selecting unit 41 in FIG. 7 is composed of a viewpoint selecting unit 51 and a selector 52.

The viewpoint selecting unit 51 of the input viewpoint selecting unit 41 selects one predetermined viewpoint corresponding to the viewing position from the viewpoint of the input image based on the viewing position indicated by the positional information supplied from the position detecting unit 11. The viewpoint selecting unit 51 supplies a viewpoint number, which is a number for specifying the viewpoint, of the one selected viewpoint to the selector 52. The viewpoint selecting unit 51 also generates a coordinate based on an initial position set in advance for the one selected viewpoint of the viewing position as the stereoscopic effect correction parameter based on the viewing position indicated by the positional information and supplies the same to the stereoscopic effect correcting unit 43.

Meanwhile, in this embodiment, when the viewing position is on a side closer to the image display unit 13 than the initial position, the coordinate in the depth direction included in the stereoscopic effect correction parameter is set to a positive value and when this is on a side opposite to the image display unit 13, the coordinate in the depth direction is set to a negative value.

The selector 52 selects the input image and the depth image of the viewpoint specified by the viewpoint number supplied from the viewpoint selecting unit 51 from the input image and the depth image, which are externally input, and supplies the same to the enlarging processing unit 42.

[Another Detailed Configuration Example of Input Viewpoint Selecting Unit]

Figure 8:
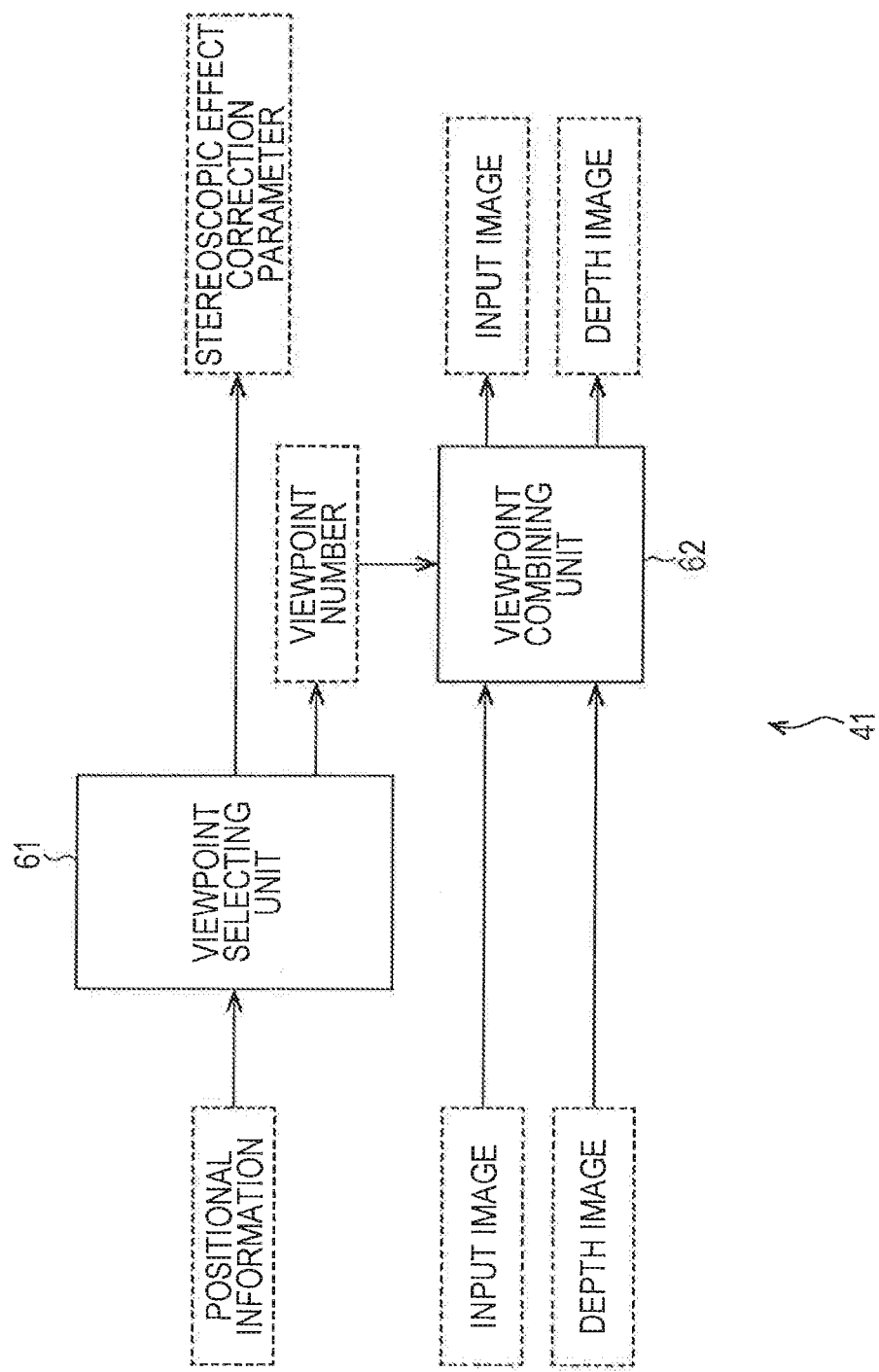
FIG. 8 is a block diagram illustrating another detailed configuration example of the input viewpoint selecting unit in FIG. 3.

FIG. 8 is a block diagram illustrating another detailed configuration example of the input viewpoint selecting unit 41.

The input viewpoint selecting unit 41 in FIG. 8 is composed of a viewpoint selecting unit 61 and a viewpoint combining unit 62.

The viewpoint selecting unit 61 of the input viewpoint selecting unit 41 selects a plurality of viewpoints including one predetermined viewpoint corresponding to the viewing position and the viewpoint adjacent to the one viewpoint from the viewpoints of the input images based on the viewing position indicated by the positional information supplied from the position detecting unit 11. The viewpoint selecting unit 61 supplies the viewpoint numbers of a plurality of selected viewpoints to the viewpoint combining unit 62. The viewpoint selecting unit 61 also generates the stereoscopic effect correction parameter based on the viewing position and supplies the same to the stereoscopic effect correcting unit 43 in the same manner as the viewpoint selecting unit 51 in FIG. 7.

The viewpoint combining unit 62 selects the input images and the depth images of a plurality of viewpoints specified by the viewpoint numbers supplied from the viewpoint selecting unit 61 from the input images and the depth images, which are externally input. The viewpoint combining unit 62 generates the input image of one viewpoint by combining the input images of a plurality of selected viewpoints and supplies the same to the enlarging processing unit 42. The viewpoint combining unit 62 also generates the depth image of one viewpoint by combining the depth images of a plurality of selected viewpoints and supplies the same to the enlarging processing unit 42.

[Description of Process of Enlarging Processing Unit]

Figure 9:
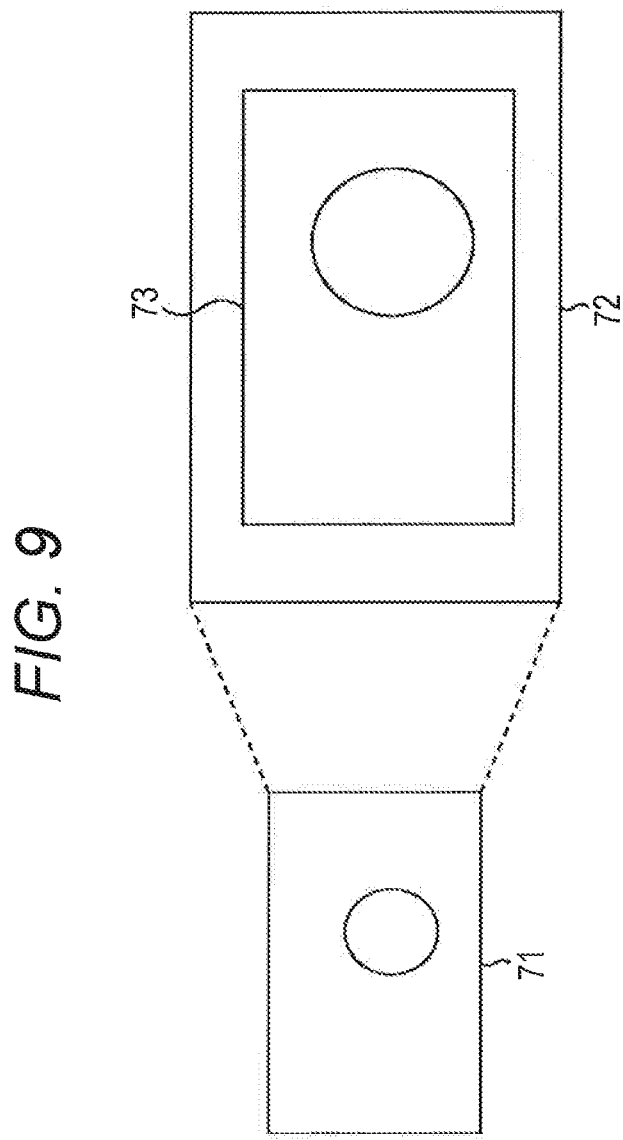
FIG. 9 is a view illustrating a process of an enlarging processing unit in FIG. 3.

FIG. 9 is a view illustrating the process of the enlarging processing unit 42 in FIG. 3.

As illustrated in FIG. 9 the enlarging processing unit 42 performs the enlarging process to an input image 71 to generate an enlarged image 72. In this enlarging process, the scaling process by the stereoscopic effect correcting unit 43 is taken into consideration, so that the enlarged image 72 is larger than an image 73 having the same resolution as that of the output image.

[Configuration Example of Stereoscopic Effect Correcting Unit]

Figure 10:
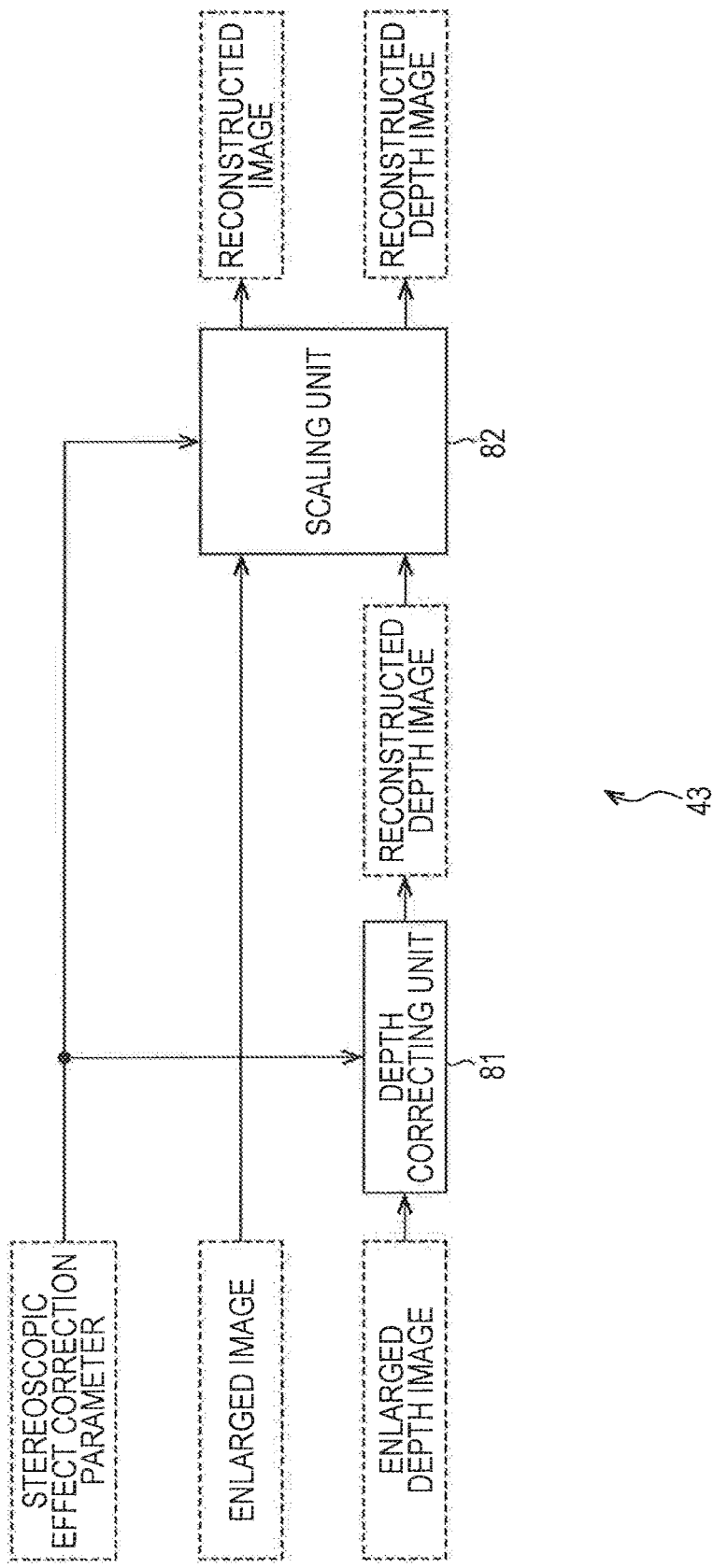
FIG. 10 is a block diagram illustrating a configuration example of a stereoscopic effect correcting unit in FIG. 5.

FIG. 10 is a block diagram illustrating a configuration example of the stereoscopic effect correcting unit 43 in FIG. 5.

As illustrated in FIG. 10, the stereoscopic effect correcting unit 43 is composed of a depth correcting unit 81 and a scaling unit 82.

The depth correcting unit 81 corrects the enlarged depth image supplied from the enlarging processing unit 42 based on the stereoscopic effect correction parameter supplied from the input viewpoint selecting unit 41 in FIG. 5. The depth correcting unit 81 supplies the corrected enlarged depth image to the scaling unit 82 as the reconstructed depth image.

The scaling unit 82 performs scaling of the enlarged image supplied from the enlarging processing unit 42 and the reconstructed depth image supplied from the depth correcting unit 81 based on the stereoscopic effect correction parameter. The scaling unit 82 supplies the enlarged image after the scaling to the stereoscopic effect emphasizing unit 44 in FIG. 5 as the reconstructed image and supplies the reconstructed depth image after the scaling to the viewpoint generating unit 45.

Figure 11:
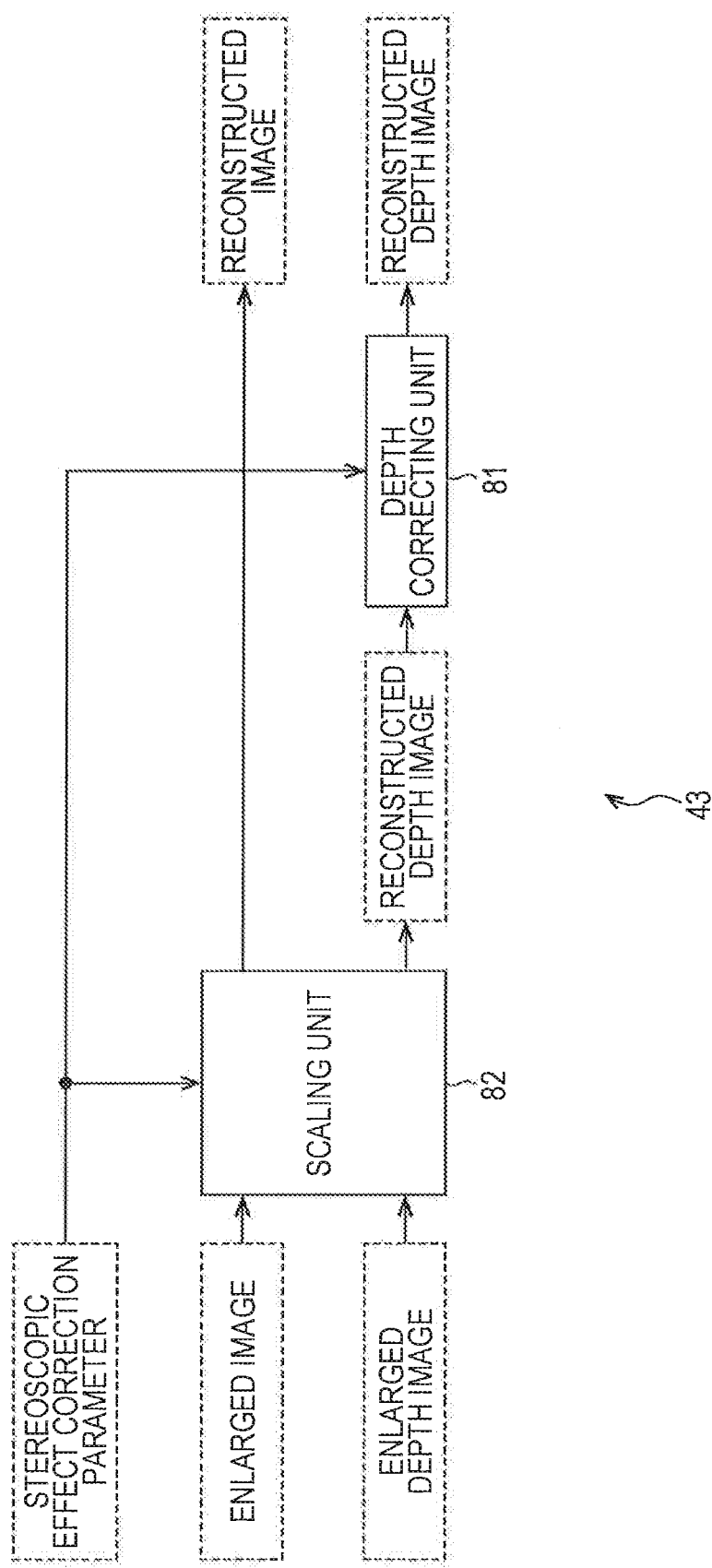
FIG. 11 is a block diagram illustrating another configuration example of the stereoscopic effect correcting unit in FIG. 5.

Meanwhile, although the stereoscopic effect correcting unit 43 in FIG. 10 is provided with the scaling unit 82 on a subsequent stage of the depth correcting unit 81, it is also possible that the depth correcting unit 81 is provided on a subsequent stage of the scaling unit 82 as illustrated in FIG. 11.

[Description of Process of Depth Correcting Unit]

Figure 12:
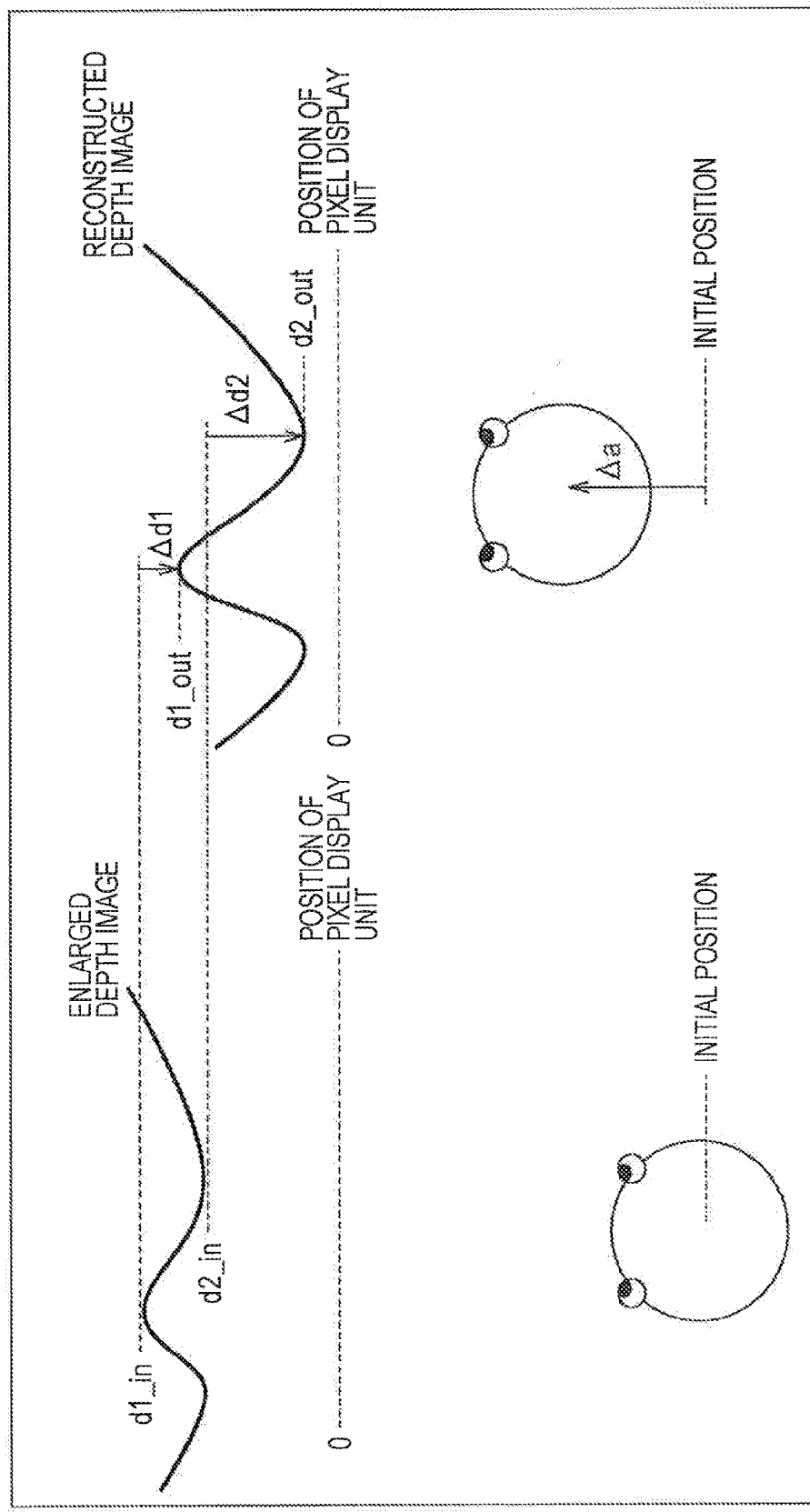
FIG. 12 is a view illustrating a process of a depth correcting unit in FIG. 10.
Figure 13:
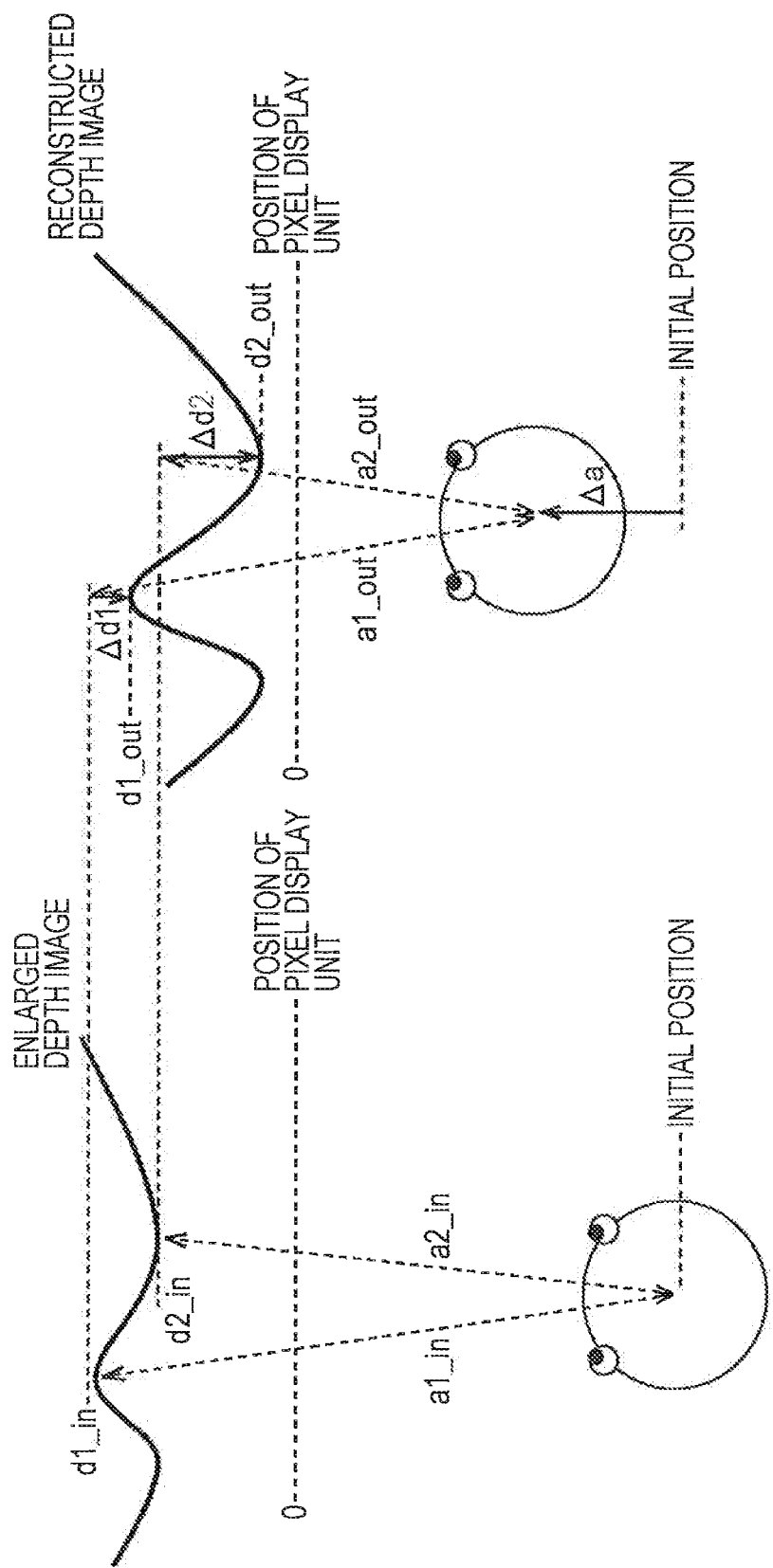
FIG. 13 is a view illustrating the process of the depth correcting unit in FIG. 10.

FIGS. 12 and 13 are views illustrating a process of the depth correcting unit 81 in FIG. 10.

Meanwhile, FIGS. 12 and 13 are the views of the viewer who views the image display unit 13 seen from above. A curved line on an upper portion of FIGS. 12 and 13 represents the position in the depth direction indicated by the depth value of each pixel forming the enlarged depth image or the reconstructed depth image.

As illustrated in FIGS. 12 and 13, the depth correcting unit 81 determines a correction amount of each pixel of the enlarged depth image so as to be larger for the pixel corresponding to the depth value indicating that the position in the depth direction is on a nearer side based on the stereoscopic effect correction parameter.

Specifically, the depth correcting unit 81 obtains the correction amount based on a direction of movement and an amount of movement in the depth direction from the initial position set in advance for the viewpoint selected by the input viewpoint selecting unit 41 to the viewing position indicated by the positional information and the enlarged depth image as illustrated in FIG. 12, for example. According to this, correction amounts $\Delta d1$ and $\Delta d2$ of two pixels are represented by following equation (1).

$$\Delta d1 = f(\Delta a, d1\_in)$$

$$\Delta d2 = f(\Delta a, d2\_in) \qquad (1)$$

Meanwhile, in the equation (1), $\Delta a$ represents the coordinate in the depth direction of the stereoscopic effect correction parameter, that is to say, the amount of movement in the depth direction from the initial position set in advance for the viewpoint selected by the input viewpoint selecting unit 41 to the viewing position indicated by the positional information d1_n and d2_in represent the depth values before the correction of the pixels corresponding to Δd1 and Δd2, respectively.

Function f in equation (1) is a function by which absolute values of Δd1 and Δd2 are larger as d1_in and d2_in are smaller and an absolute value of Δa is larger and a sign of Δd1 and Δd2 is opposite to that of Δa.

Meanwhile, as illustrated in FIG. 13, it is also possible to obtain the correction amount based on a difference between a distance between the initial position and a position corresponding to the depth value of each pixel and a distance between the viewing position and the position corresponding to the depth value of each pixel in place of Δa. In this case, correction amounts Δd1 and Δd2 are represented by following equation (2).

$$\Delta d1 = f'(d1\_in, a1\_in - a1\_out)$$

$$\Delta d2 = f'(d2\_in, a2\_in - a2\_out) \quad (2)$$

In equation (2), d1_in and d2_in represent the depth values before the correction of the pixels corresponding to Δd1 and Δd2, respectively. Also, a1_in and a2_in represent the distances between the positions corresponding to the depth values before the correction of the pixels corresponding to Δd1 and Δd2 and the initial position a1_out and a2_out represent the distances between the positions corresponding to the depth values before the correction of the pixels corresponding to Δd1 and Δd2 and the viewing position.

Function f' in equation (2) is a function by which the absolute values of Δd1 and Δd2 are larger as d1_in and d2_in are smaller and absolute values of a1_in−a1_out and a2_in−a2_out are larger and the sign of Δd1 and Δd2 is opposite to that of a1_in−a1_out and a2_in−a2_out.

The depth correcting unit 81 corrects the depth value of the pixel by the correction amount of each pixel of the enlarged depth image determined in the above-described manner. In examples in FIGS. 12 and 13, depth values d1_in and d2_in before the correction are corrected by correction amounts Δd1 and Δd2, respectively, and the corrected depth values are d1_out and d2_out.

Figure 14:
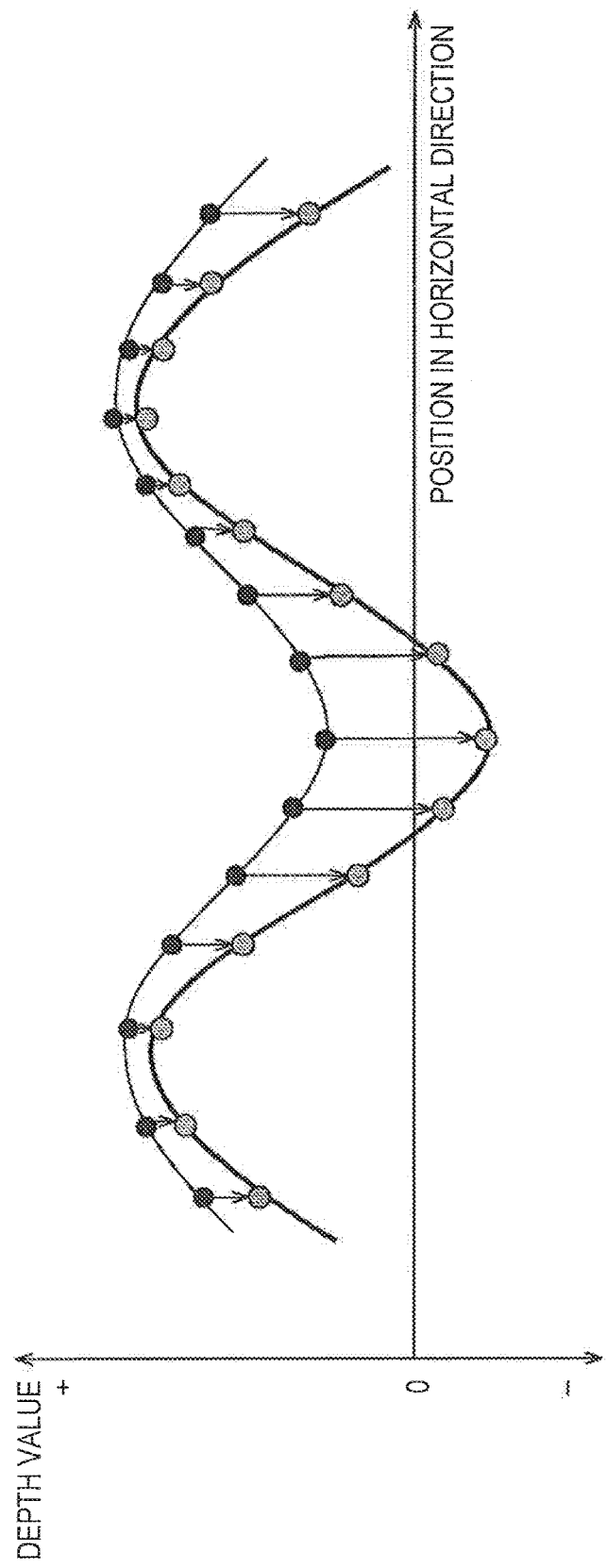
FIG. 14 is a graph illustrating a depth value of an enlarged depth image and a reconstructed depth image.
Figure 15:
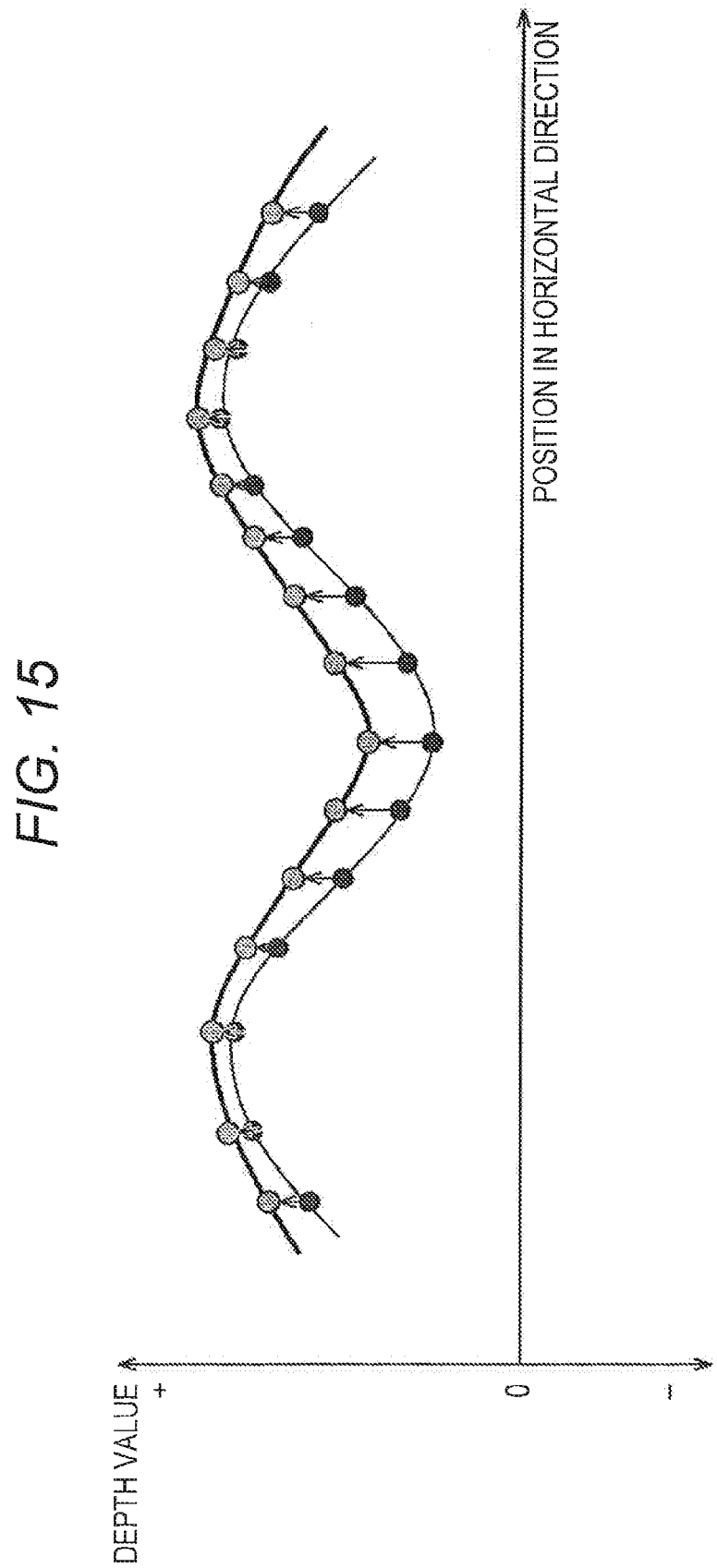
FIG. 15 is a graph illustrating the depth value of the enlarged depth image and the reconstructed depth image.

FIGS. 14 and 15 are graphs illustrating the depth value of the enlarged depth image input to the depth correcting unit 81 in FIG. 10 and the depth value of the reconstructed depth image output from the depth correcting unit 81 in FIG. 10.

Meanwhile, in FIGS. 14 and 15, positions in a horizontal direction of the enlarged depth image and the reconstructed depth image are plotted along the abscissa and the depth value is plotted along the ordinate. In FIGS. 14 and 15, a black circle represents the depth value of each pixel of the enlarged depth image and a gray circle represents the depth value of each pixel of the reconstructed depth image.

FIG. 14 is the view illustrating the depth value in a case in which the viewing position is on the side closer to the image display unit 13 than the initial position and FIG. 15 is the view illustrating the depth value in a case in which the viewing position is on the side opposite to the image display unit 13 across the initial position.

As illustrated in FIG. 14, when the viewing position is on the side closer to the image display unit 13 than the initial position, that is to say, when Δa is the positive value, the depth value of each pixel of the enlarged depth image is corrected in a negative direction by a larger correction amount as the depth value is smaller. As a result, a position of an entire output image in the depth direction is on a nearer side and the stereoscopic effect is emphasized.

On the other hand, as illustrated in FIG. 15, when the viewing position is on the side opposite to the image display unit 13 across the initial position, that is to say, when Δa is the negative value, the depth value of each pixel of the enlarged depth image is corrected in a positive direction by a larger correction amount as the depth value is smaller. As a result, the position of the entire output image in the depth direction is on a farther side and the stereoscopic effect is reduced.

As described above, when the viewer approaches the image display unit 13 from the initial position, the position of the entire output image in the depth direction is on the nearer side and the stereoscopic effect is emphasized, and when the viewer steps away from the image display unit 13, the position of the entire output image in the depth direction is on the farther side and the stereoscopic effect is reduced. As a result, it is possible to realize the motion parallax more closely related to that of the real world.

[Description of Process of Scaling Unit]

Figure 16:
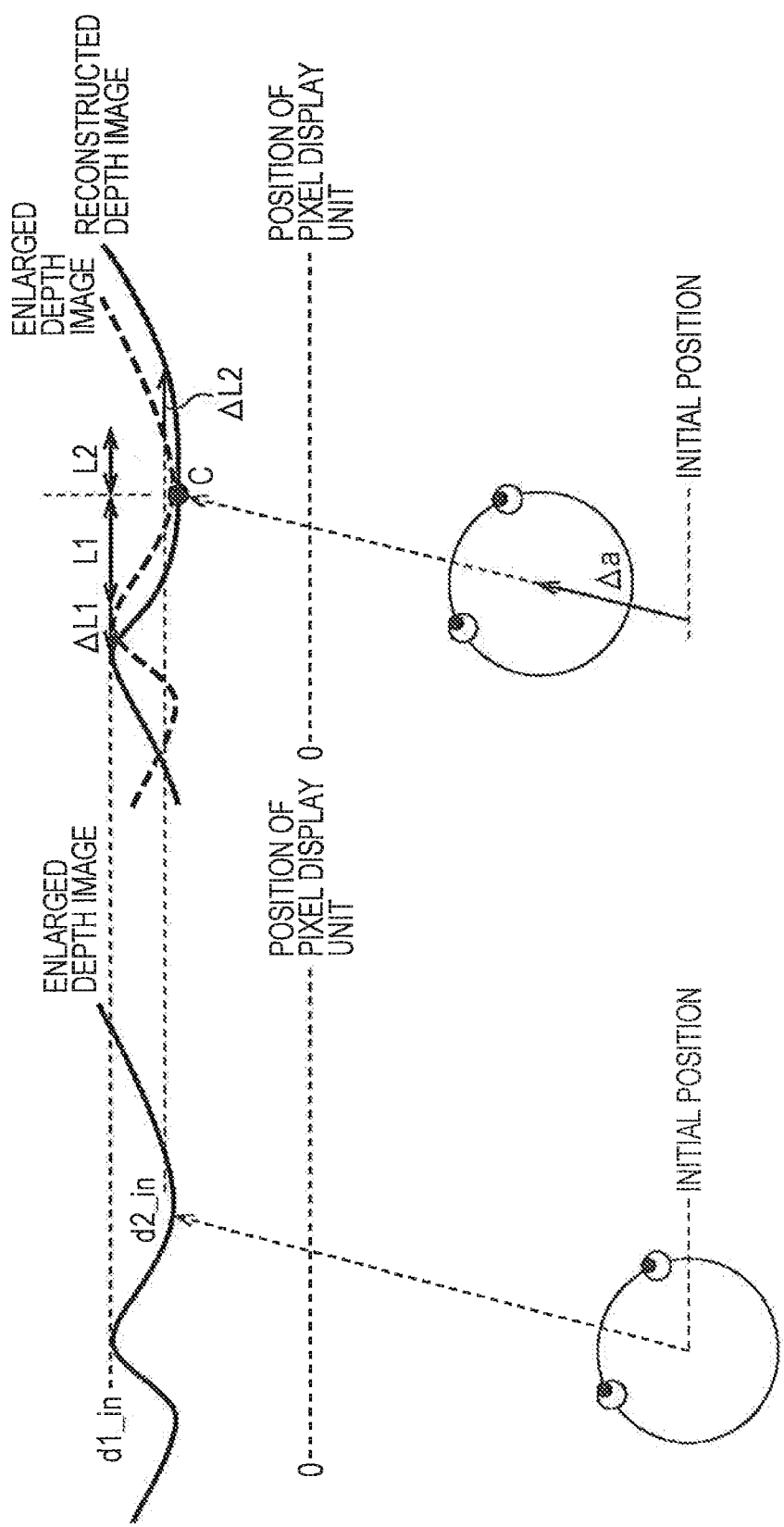
FIG. 16 is a view illustrating a process of a scaling unit.
Figure 17:
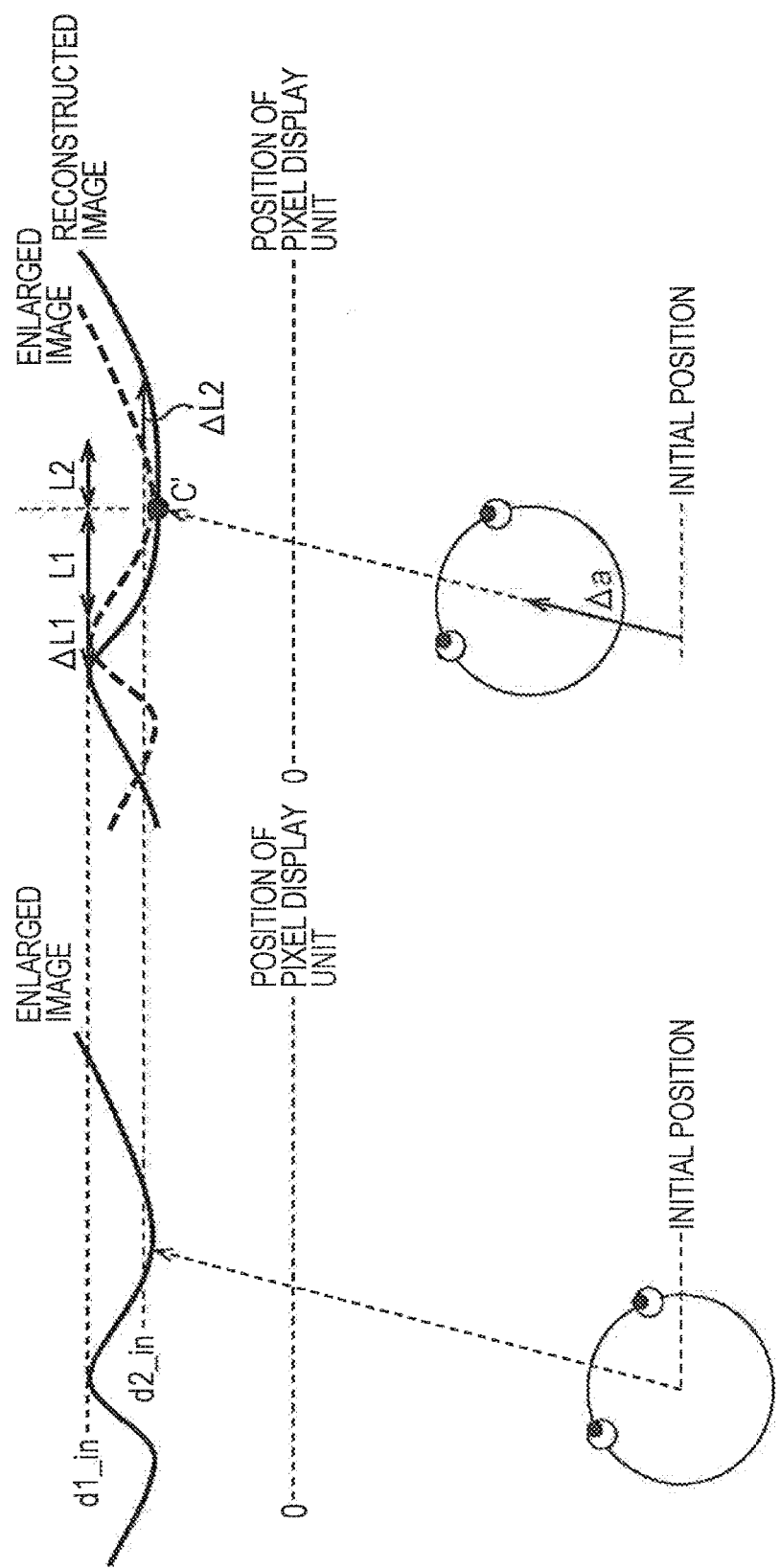
FIG. 17 is a view illustrating the process of the scaling unit.

FIGS. 16 and 17 are views illustrating a process of the scaling unit 82.

Meanwhile, FIGS. 16 and 17 are the views of the viewer who views the image display unit 13 seen from above. A curved line on an upper portion of FIGS. 16 and 17 represents the position in the depth direction indicated by the depth value of each pixel forming the enlarged depth image or the reconstructed depth image. The same applies to FIGS. 18 and 19 to be described later.

As illustrated in FIG. 16, the scaling unit 82 determines central point C of scaling in the enlarged depth image based on the stereoscopic effect correction parameter. Then, the scaling unit 82 performs the scaling of the enlarged depth image centering around central point C at a larger scaling rate for the pixel farther from central point C with a smaller depth value based on the enlarged depth image and the stereoscopic effect correction parameter, thereby correcting the stereoscopic effect.

By the scaling by the scaling unit 82, differences ΔL1 and ΔL2 between the positions in the horizontal direction before the correction and the positions in the horizontal direction after the correction of two pixels, for example, are represented by following equation (3). Meanwhile, in this embodiment, the difference between the position in the horizontal, direction before the correction and the position in the horizontal direction after the correction is a positive value when the position in the horizontal direction after the correction is on an outer side of the position in the horizontal direction before the correction based on central point C, and the difference is a negative value when the former is on an inner side of the latter.

$$\Delta L1 = fs(\Delta a, d1\_in, L1)$$

$$\Delta L2 = fs(\Delta a, d2\_in, L2)$$

Meanwhile, in equation (3), Δa represents the coordinate in the depth direction of the stereoscopic effect correction parameter. d1_in and d2_in represent the depth values before the correction of the pixels corresponding to ΔL1 and ΔL2, respectively. Also, L1 and L2 represent distances between central point C and the positions before the correction of the pixels corresponding to ΔL1 and ΔL2, respectively.

Function fs in equation (3) is a function, which becomes larger as L1 and L2 are larger, d1_in and d2_in are smaller, and the absolute value of Δa is larger, by which a sign of ΔL1 and ΔL2 is the same as that of Δa.

As illustrated in FIG. 17, the scaling unit 82 determines central point. C in the enlarged image corresponding to central point C of the scaling in the enlarged depth image. Then, the scaling unit 82 performs the scaling of the enlarged image centering around central point C' at the same scaling rate as the scaling rate for each pixel of the enlarged depth image, thereby generating the reconstructed image. Meanwhile, the curved line in FIG. 17 represents the position in the depth direction indicated by the depth value of each pixel of the enlarged depth image corresponding to the enlarged image and the reconstructed depth image corresponding to the reconstructed image. The same applies to FIG. 19 to be described later.

Figure 18:
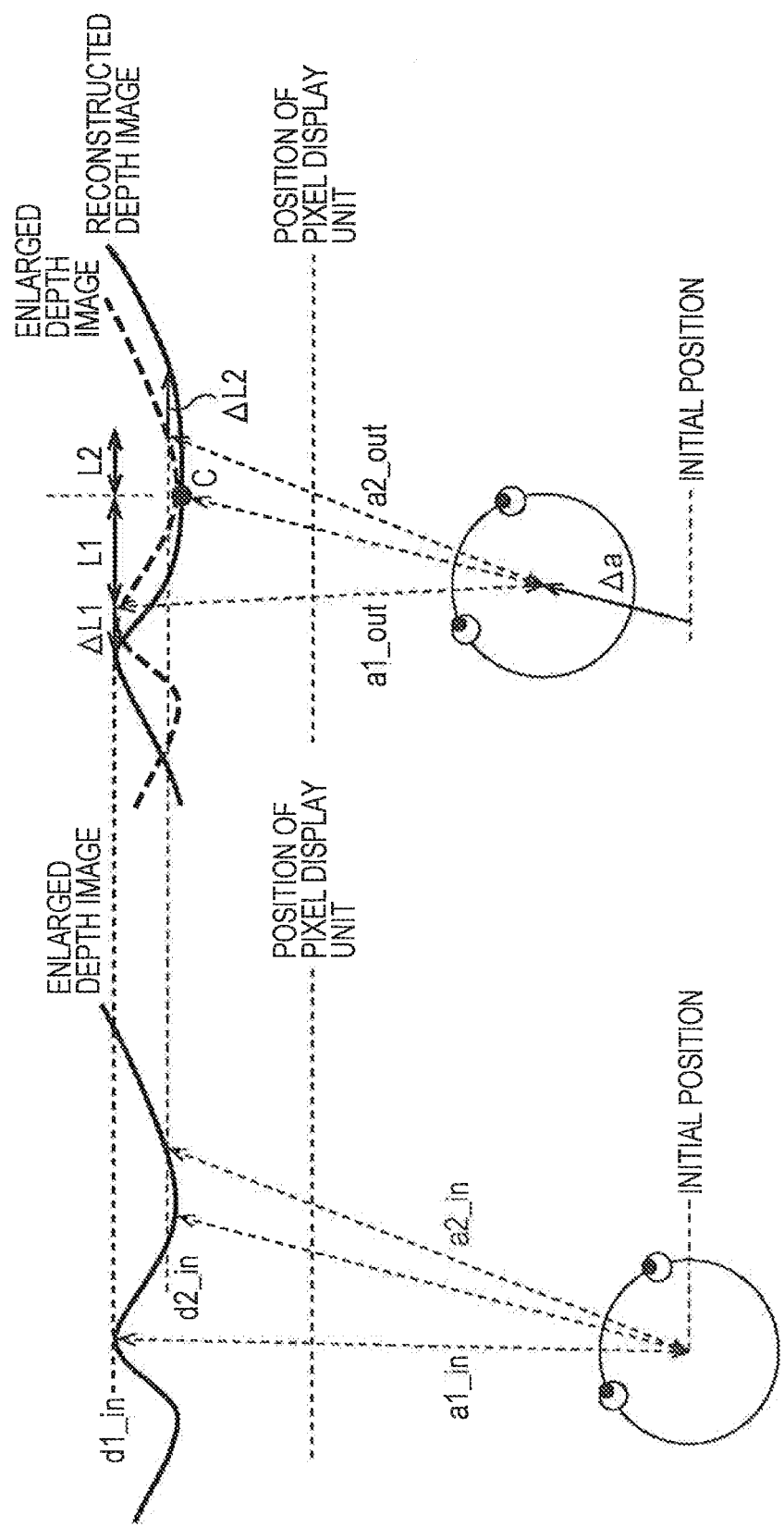
FIG. 18 is a view illustrating another process of the scaling unit.

As illustrated in FIG. 18, it is also possible to perform the scaling based on the difference between the distance between the initial position and the position corresponding to the depth value of each pixel and the distance between the viewing position and the position corresponding to the depth value of each pixel in place of Δa. In this case, differences ΔL1 and ΔL2 are represented by following equation (4).

$$\Delta L1 = fs'(d1\_in, L1, a1\_in - a1\_out)$$

$$\Delta L2 = fs'(d2\_in, L2, a2\_in - a2\_out) \quad (4)$$

In equation (4), d1_in and d2_in represent the depth values before the correction of the pixels corresponding to ΔL1 and ΔL2, respectively. Also, L1 and L2 represent the distances between central point C and the positions before the correction of the pixels corresponding to ΔL1 and ΔL2, respectively. Further, a1 in and a2 in represent the distances between the positions corresponding to the depth values before the correction of the pixels corresponding to ΔL1 and ΔL2 and the initial position. a1_out and a2_out represent the distances between the positions corresponding to the depth values before the correction of the pixels corresponding to ΔL1 and ΔL2 and the viewing position.

Function fs' in equation (4) is a function, which becomes larger as L1 and L2 are larger, d1_in and d2_in are smaller, and the absolute values of a1_in−a1_out and a2_in−a2_out are larger, by which the sign of ΔL1 and ΔL2 is the same as that of a1_in−a1_out and a2_in−a2_out.

Figure 19:
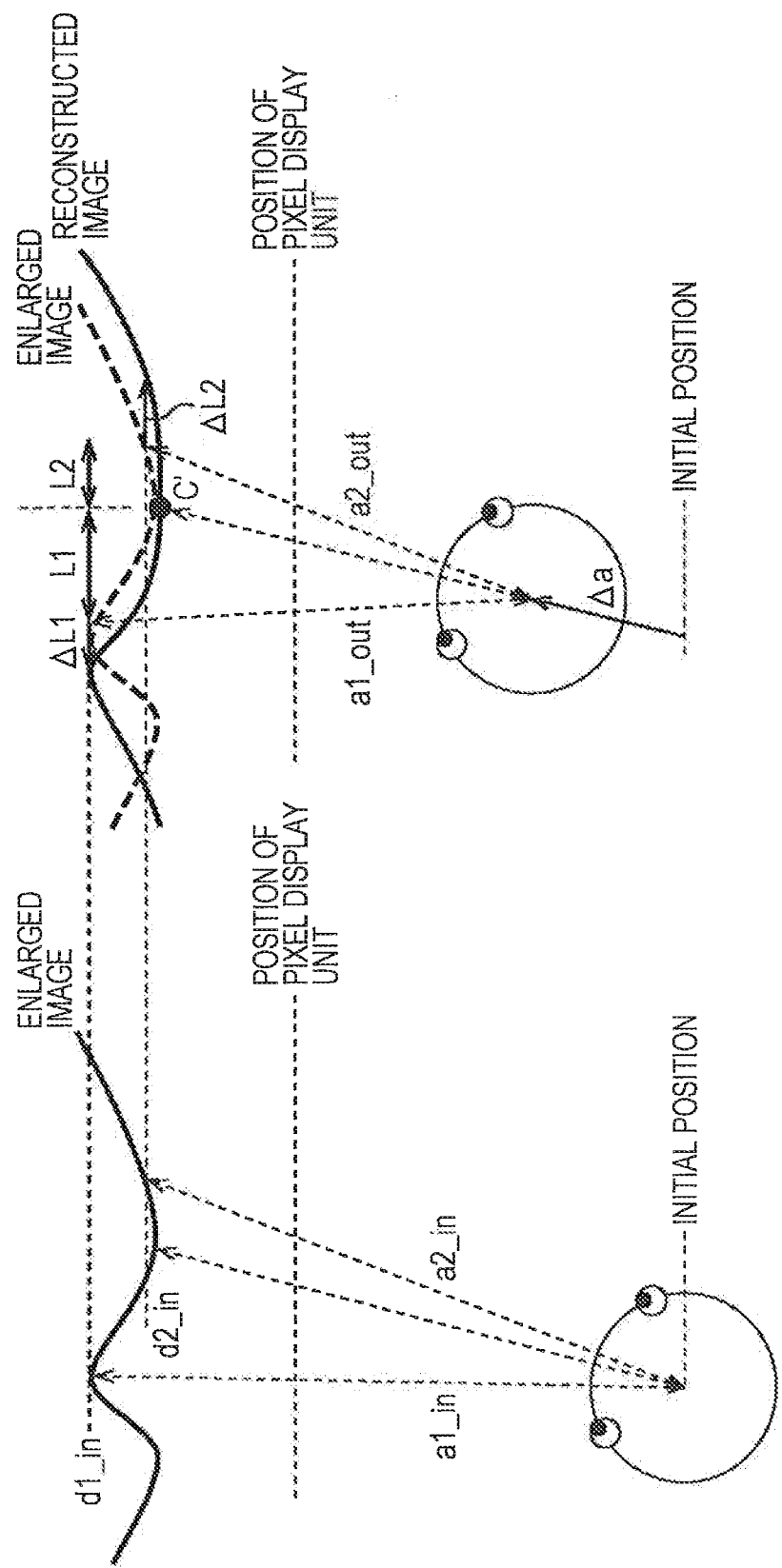
FIG. 19 is a view illustrating another process of the scaling unit.

In this case also, as illustrated in FIG. 19, the scaling unit 82 performs the scaling of the enlarged image at the same scaling rate as the scaling rate for each pixel of the enlarged depth image, thereby generating the reconstructed image.

Figure 20:
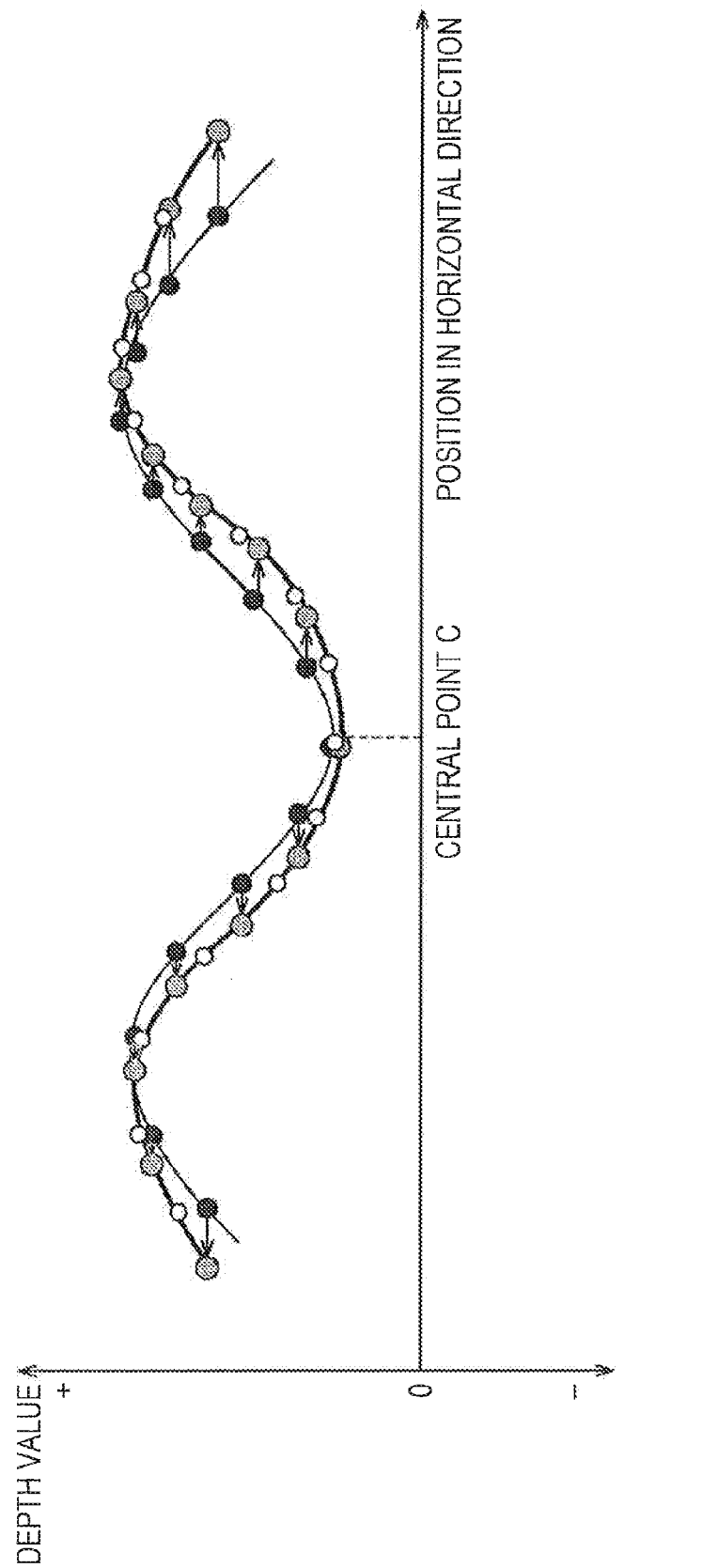
FIG. 20 is a graph illustrating the depth value of the reconstructed depth image input to/output from the scaling unit.
Figure 21:
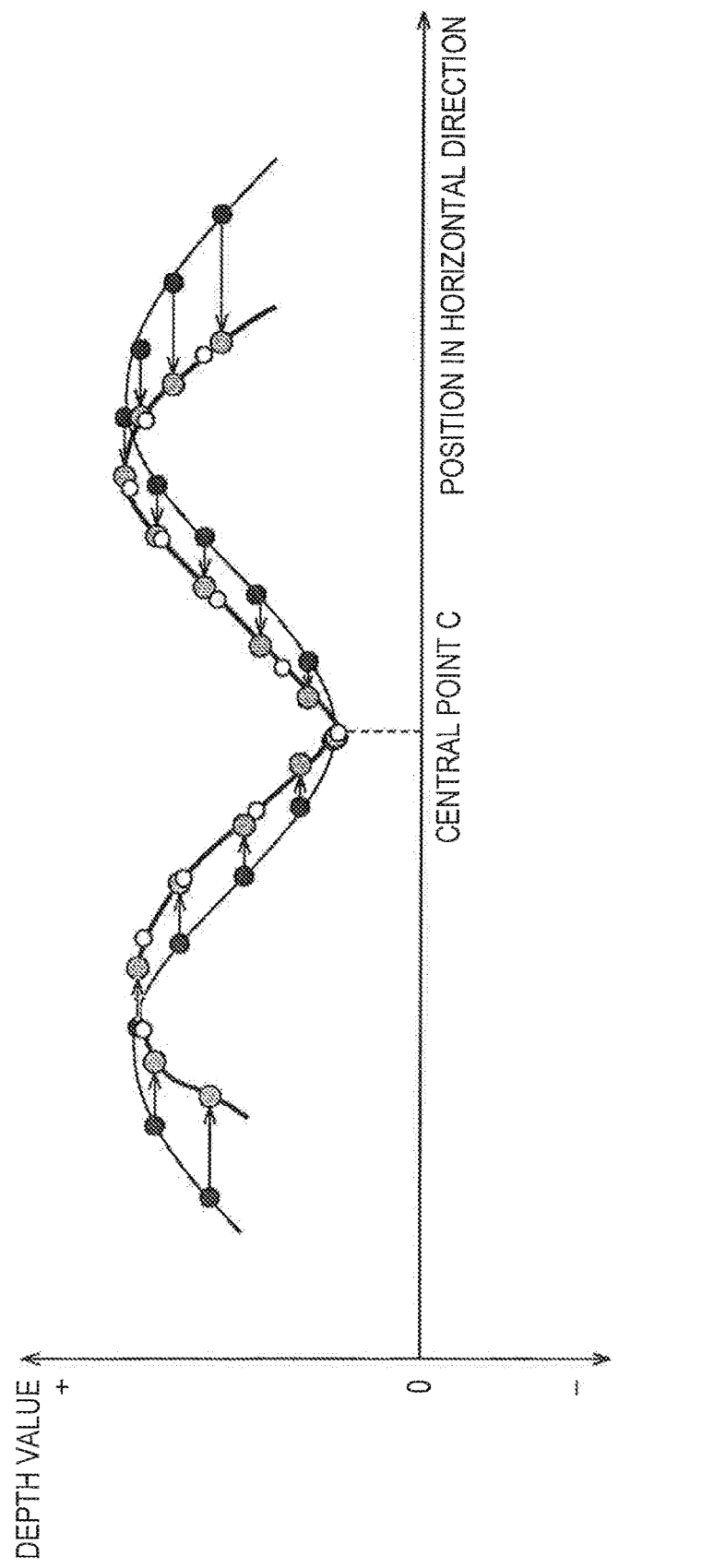
FIG. 21 is a graph illustrating the depth value of the reconstructed depth image input to/output from the scaling unit.

FIGS. 20 and 21 are graphs illustrating the depth value of the reconstructed depth image input to the scaling unit 82 in FIG. 10 and the depth value of the reconstructed depth image output from the depth correcting unit 81 in FIG. 10.

Meanwhile, in FIGS. 20 and 21, the position in the horizontal direction of the reconstructed depth image is plotted along the abscissa and the depth value is plotted along the ordinate. In FIGS. 20 and 21, the black circle represents the depth value of each pixel of the input reconstructed depth image and a white circle represents the depth value of each pixel of the output reconstructed depth image. The gray circle represents the position of the output reconstructed depth image corresponding to the depth value of each pixel of the input reconstructed depth image.

FIG. 20 is the view illustrating the depth value in a case in which the viewing position is on the side closer to the image display unit 13 than the initial position and FIG. 21 is the view illustrating the depth value in a case in which the viewing position is on the side opposite to the image display unit 13 across the initial position.

As illustrated in FIG. 20, when the viewing position is on the side closer to the image display unit 13 than the initial position, the depth value of each pixel of the reconstructed depth image is enlarged at a larger scaling rate as this is farther from central point C and die depth value is smaller. Specifically, the position of each pixel of the reconstructed depth image whose depth value is represented by the black circle moves to the position of the reconstructed depth image whose depth value is represented by the gray circle. Then, the moved depth values are interpolated and the depth value of each pixel represented by the white circle is obtained.

On the other hand, as illustrated in FIG. 21, when the viewing position is on the side opposite to the image display unit 13 across the initial position, the depth value of each pixel, of the reconstructed depth image is reduced at a larger scaling rate as this is farther from central point C and the depth value is smaller.

By the scaling performed in the above-described manner, when the viewer approaches the image display unit 13 from the initial position, the output image is enlarged centering around the central point corresponding to the viewing position and when the viewer steps away from the image display unit 13, the output image is reduced centering around the central point. As a result, it is possible to realize the motion parallax more closely related to that of the real world.

[Description of Projecting Process of Viewpoint. Generating Unit]

Figure 22:
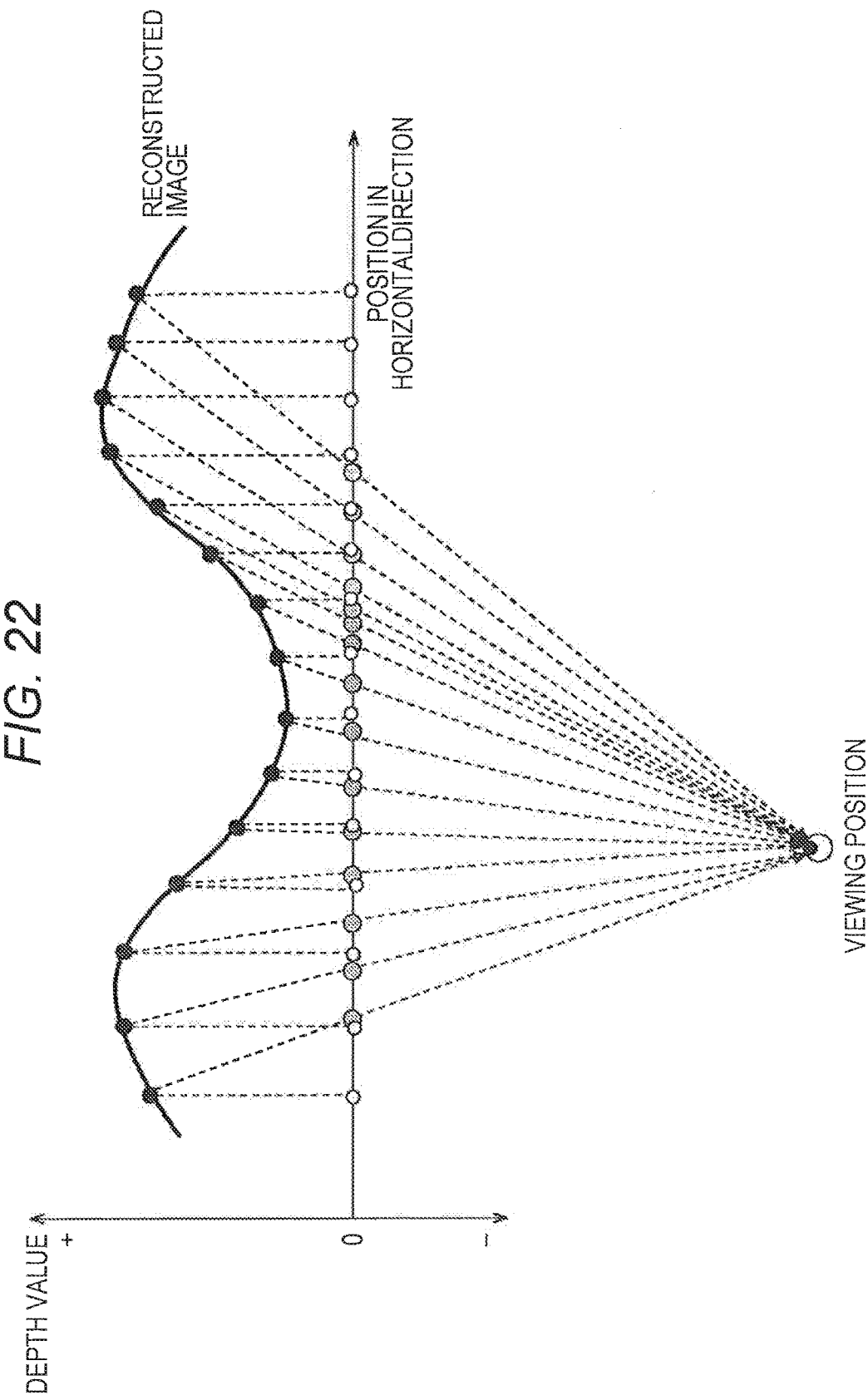
FIG. 22 is a view illustrating a projecting process of a viewpoint generating unit in FIG. 5.

FIG. 22 is a view illustrating the projecting process of the viewpoint generating unit 45 in FIG. 5.

Meanwhile, FIG. 22 is a graph illustrating the depth value of the reconstructed depth image corresponding to the reconstructed image input to the viewpoint generating unit 45 and the position of the output image corresponding to each pixel of the reconstructed image.

In FIG. 22, positions in the horizontal direction of the reconstructed image and the output image are plotted along the abscissa and the depth value is plotted along the ordinate. In FIG. 22, the black circle represents the depth value corresponding to each pixel of the reconstructed image and the gray circle represents the position of the output image corresponding to each pixel of the reconstructed image.

As illustrated in FIG. 22, the viewpoint generating unit 45 first projects each pixel of the reconstructed image toward the viewing position in the projecting process to the reconstructed image. According to this, the viewpoint generating unit 45 obtains an intersection of a projection line with the image display unit 13 as the position of the output image corresponding to each pixel of the reconstructed image represented by the gray circle in FIG. 22. Then, the viewpoint generating unit 45 uses a pixel value of each pixel of the reconstructed image as the pixel value of the intersection corresponding to the pixel to interpolate the pixel value of each pixel of the output image whose position is represented by the white circle in FIG. 22.

[Example of Output Image]

Figure 23:
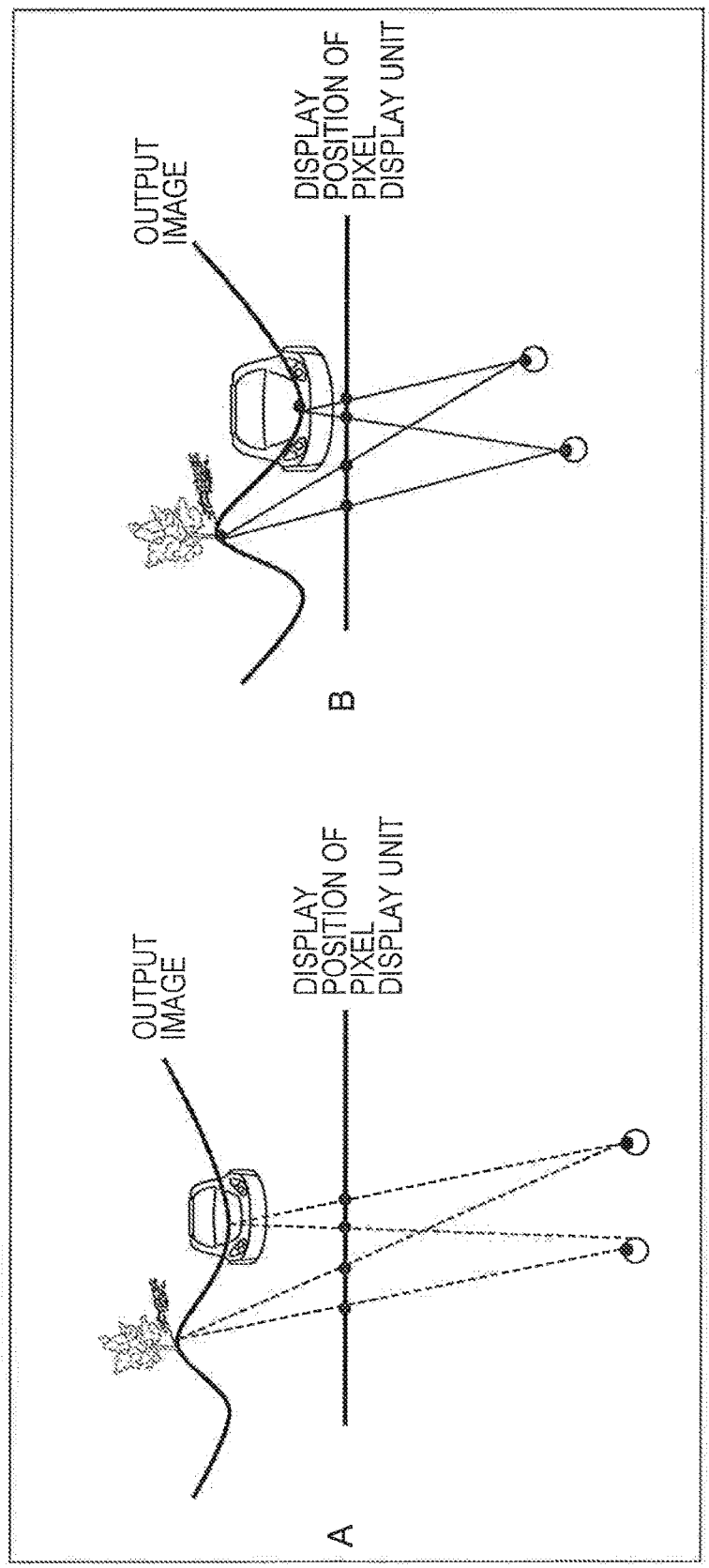
FIG. 23 is a view illustrating an example of an output image.

FIG. 23 is a view illustrating an example of the output image.

Meanwhile, FIG. 23 is a view of the viewer who views the image display unit 13 seen from above. A curved line on an upper portion of FIG. 23 represents the position in the depth direction of each pixel of the output image.

When the output image including an image of a tree and a vehicle on a near side of the tree is displayed on the image display unit 13 as illustrated in FIG. 23A, if the viewer moves forward and gazes the tree as illustrated in FIG. 235, the tree becomes larger while this moves to the near side and the vehicle moves to a nearer side and becomes larger than the tree in the output image. As illustrated in FIG. 23S, the gazed tree is sharp and the vehicle, which is not dazed, is blurred.

[Description of Process of Image Processing Unit]

Figure 24:
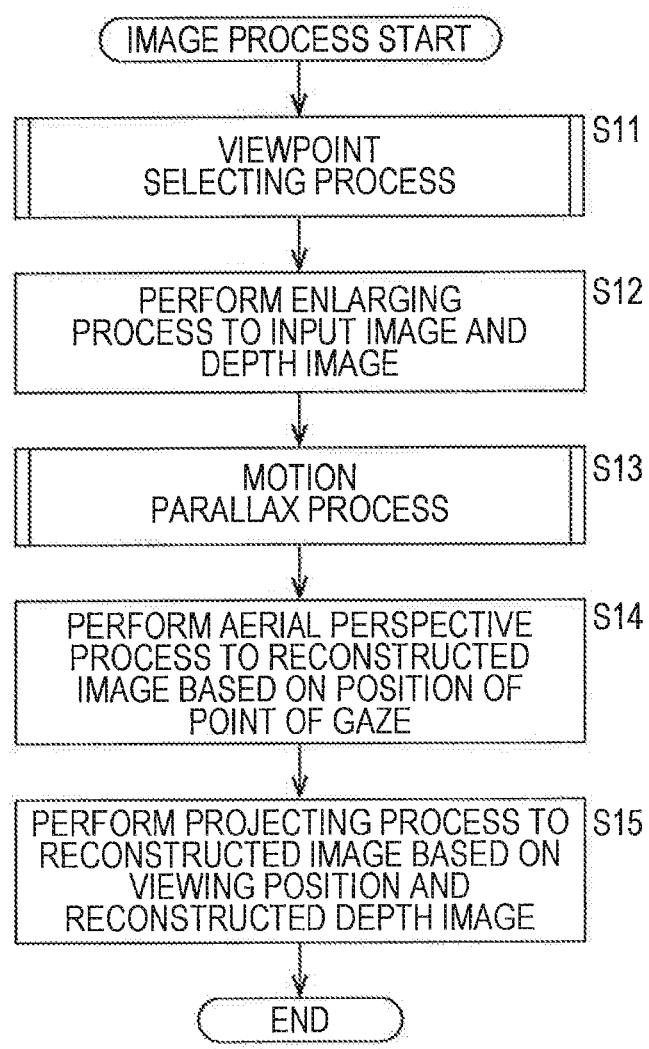
FIG. 24 is a flowchart illustrating an image process of an image processing unit in FIG. 5.

FIG. 24 is a flowchart illustrating an image process of the image processing unit 12 in FIG. 5. The image process is started when the positional information, the input image, and the depth image are supplied to the image processing unit 12, for example.

At step S11 in FIG. 24, the input viewpoint selecting unit 41 of the image processing unit 12 performs a viewpoint selecting process to select a predetermined viewpoint from the viewpoint of the input image based on the viewing position indicated by the positional information supplied from the position detecting unit 11 and generate the stereoscopic effect correction parameter. The viewpoint selecting process is described in detail with reference to FIGS. 25 and 26 to be described later.

At step S12, the enlarging processing unit 42 performs the enlarging process to the input image and the depth image supplied from the input viewpoint selecting unit 41. The enlarging processing unit 42 supplies the input image after the enlarging process to the stereoscopic effect correcting unit 43 as the enlarged image and supplies the depth image after the enlarging process to the stereoscopic effect correcting unit 43 as the enlarged depth image.

At step S13, the stereoscopic effect correcting unit 43 performs the motion parallax process to the enlarged image and the enlarged depth image supplied from the enlarging processing unit 42. The motion parallax process is described in detail with reference to FIG. 27 to be described later.

At step S14, the stereoscopic effect emphasizing unit 44 performs the aerial perspective process to the reconstructed image supplied from the stereoscopic effect correcting unit 43 based on the position of the point of gaze indicated by the positional information supplied from the position detecting unit 11. The stereoscopic effect emphasizing unit 44 supplies the reconstructed image after the aerial perspective process to the viewpoint generating unit 45.

At step S15, the viewpoint generating unit 45 performs the projecting process to the reconstructed image supplied from the stereoscopic effect emphasizing unit 44 based on the viewing position indicated by the positional information supplied from the position detecting unit 11 and the reconstructed depth image supplied from the stereoscopic effect correcting unit 43. The viewpoint generating unit 45 supplies the color image of one predetermined viewpoint obtained as a result to the image display unit 13 (FIG. 3) as the output image and finishes the process.

Figure 25:
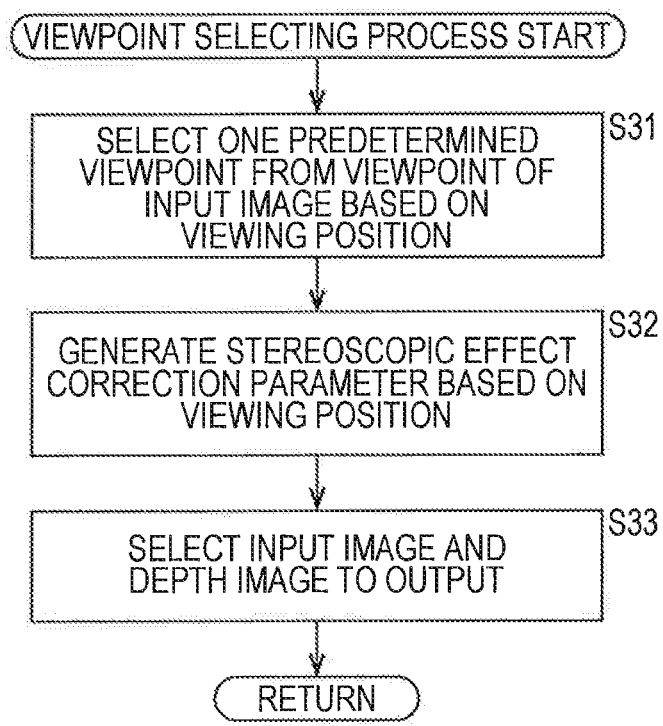
FIG. 25 is a flowchart illustrating a viewpoint selecting process in FIG. 24 in detail.

FIG. 25 is a flowchart illustrating the viewpoint selecting process at step S11 in FIG. 24 by the input viewpoint selecting unit 41 in FIG. 7 in detail.

At step S31 in FIG. 25, the viewpoint selecting unit 51 of the input viewpoint selecting unit 41 selects one predetermined viewpoint corresponding to the viewing position from the viewpoint of the input image based on the viewing position indicated by the positional information supplied from the position detecting unit 11. The input viewpoint selecting unit 41 supplies the viewpoint number of the one selected viewpoint to the selector 52.

At step S32, the viewpoint selecting unit 51 generates the coordinate based on the initial position set in advance for the one selected viewpoint of the viewing position as the stereoscopic effect correction parameter based on the viewing position indicated by the positional information and supplies the same to the stereoscopic effect correcting unit 43.

At step S33, the selector 52 selects the input image and the depth image of the viewpoint specified by the viewpoint numbers supplied from the viewpoint selecting unit 51 from the input image and the depth image, which are externally input, and outputs the same to the enlarging processing unit 42. Then, the process returns to step S11 in FIG. 24 to shift to step S12.

Figure 26:
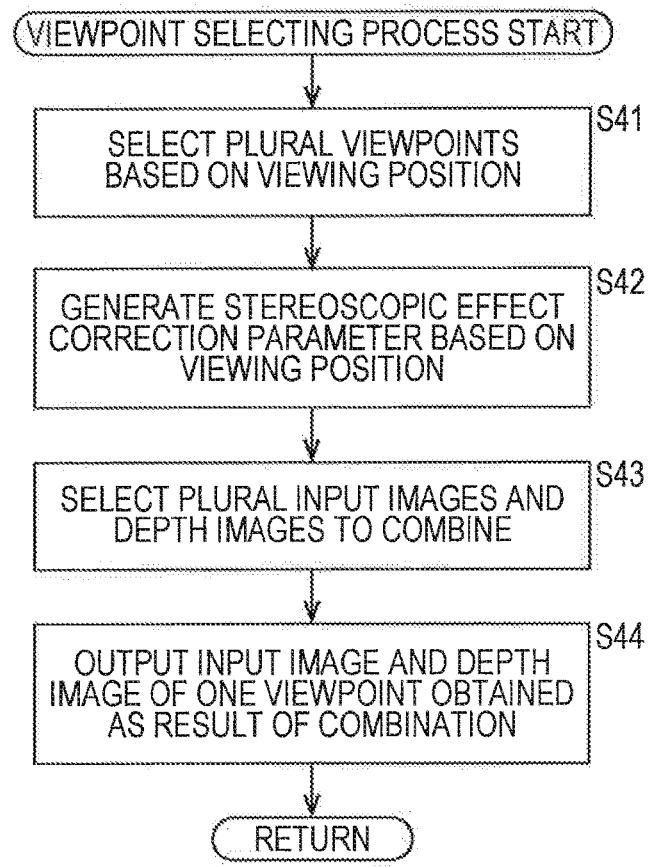
FIG. 26 is a flowchart illustrating the viewpoint selecting process in FIG. 24 in detail.

FIG. 26 is a flowchart illustrating the viewpoint selecting process at step S11 in FIG. 24 by the input viewpoint selecting unit 41 in FIG. 8 in detail.

At step S41 in FIG. 26, the viewpoint selecting unit 61 of the input viewpoint selecting unit 41 selects a plurality of viewpoints including one predetermined viewpoint, corresponding to the viewing position and the viewpoint adjacent to the one viewpoint from the viewpoints of the input images based on the viewing position indicated by the positional information supplied from the position detecting unit 11. The viewpoint selecting unit 61 supplies the viewpoint numbers of a plurality of selected viewpoints to the viewpoint combining unit 62.

At step S42, the viewpoint selecting unit 61 generates the stereoscopic effect correction parameter based on the viewing position and supplies the same to the stereoscopic effect correcting unit 43 in the same manner as the viewpoint selecting unit 51 in FIG. 7.

At step S43, the viewpoint combining unit 52 selects the input images and the depth images of a plurality of viewpoints specified by the viewpoint numbers supplied from the viewpoint selecting unit 61 from the input images and the depth images, which are externally input, and combines them.

At step S44, the viewpoint combining unit 62 outputs the input, image and the depth image of one viewpoint obtained as a result of combination at step S43 to the enlarging processing unit 42. Then, the process returns to step S11 in FIG. 24 to shift to step S12.

Figure 27:
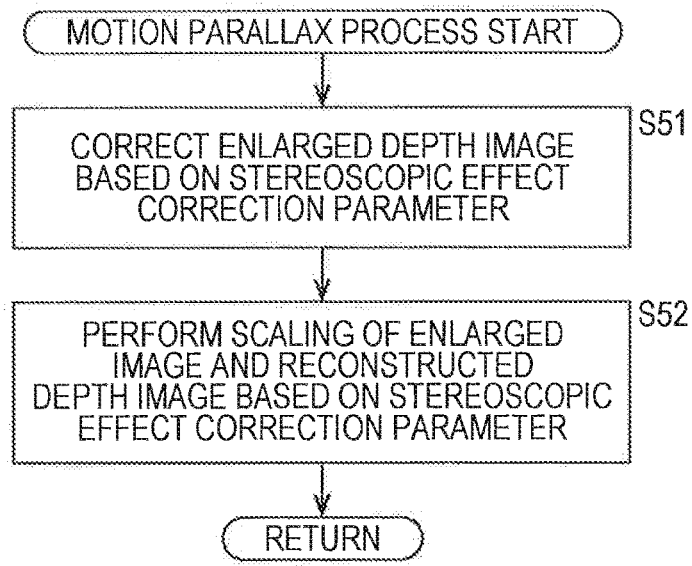
FIG. 27 is a flowchart illustrating a motion parallax process in FIG. 24 in detail.

FIG. 27 is a flowchart illustrating the motion parallax process at step S13 in FIG. 24 by the stereoscopic effect correcting unit 43 in FIG. 10 in detail.

At step S51 in FIG. 27, the depth correcting unit 81 of the stereoscopic effect correcting unit 43 corrects the enlarged depth image from the enlarging processing unit 42 based on the stereoscopic effect correction parameter from the input viewpoint selecting unit 41 as illustrated in FIGS. 12 and 13. The depth correcting unit 81 supplies the corrected enlarged depth image to the scaling unit 82 as the reconstructed depth image.

At step S52, the scaling unit 82 performs the scaling of the enlarged image from the enlarging processing unit 42 and the reconstructed depth image from the depth correcting unit 81 based on the stereoscopic effect correction parameter as illustrated in FIGS. 16 and 17. The scaling unit 82 supplies the enlarged image after the scaling to the stereoscopic effect emphasizing unit 44 in FIG. 5 as the reconstructed image and supplies the reconstructed depth image after the scaling to the viewpoint generating unit 45. Then, the process returns to step S13 in FIG. 24 to shift to step S14.

As described above, the image processing unit 12 corrects the depth image based on the viewing position, so that this may realize the motion parallax closely related to that of the real world in the image display unit 13, which is the 2D display. As a result, the viewer may realize highly accurate stereoscopic viewing.

Figure 28:
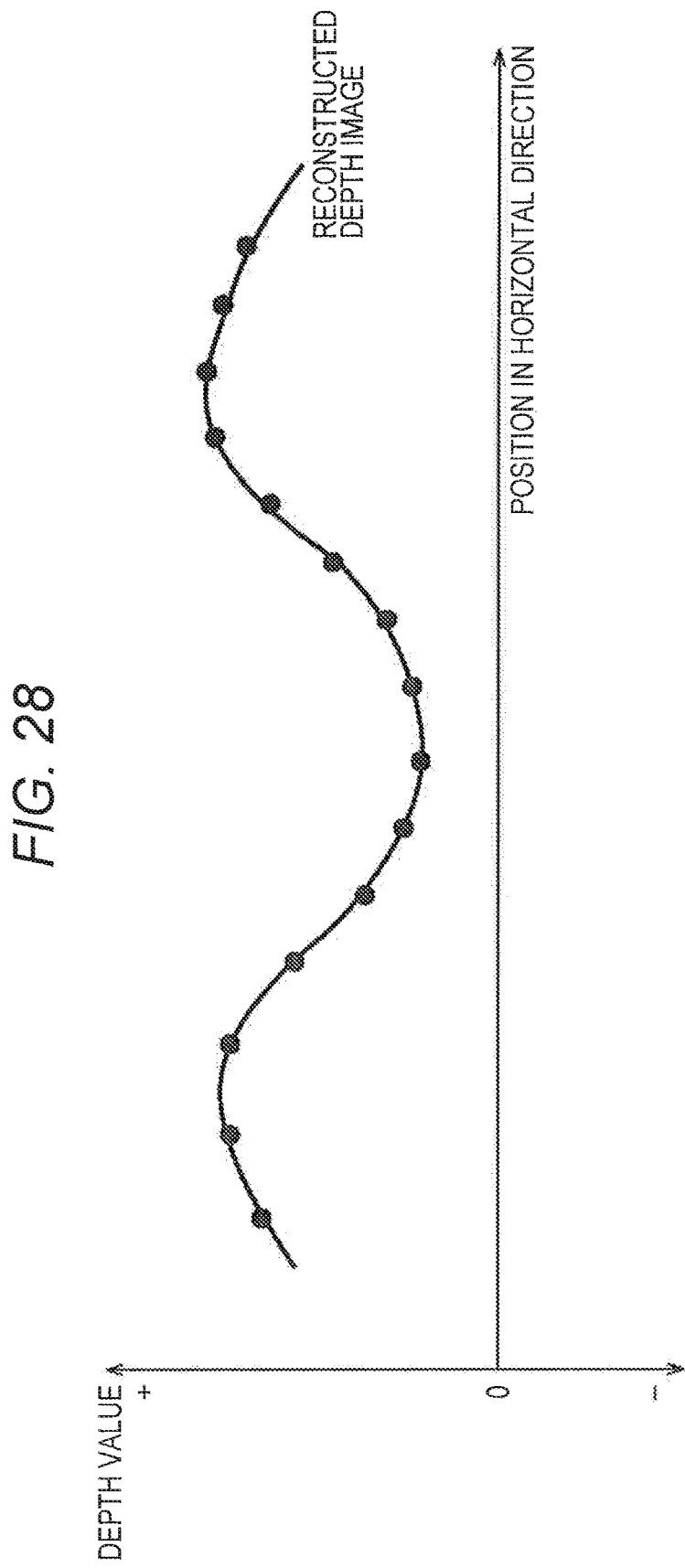
FIG. 28 is a view illustrating a depth image corresponding to the output image.

Meanwhile, although the image processing unit 12 outputs only the output image in the image processing device 10, this may also output the depth image corresponding to the output image. In this case, the viewpoint generating unit 45 outputs the depth value of each pixel forming the reconstructed depth image as-is as the depth image corresponding to the output image as illustrated in FIG. 28. Meanwhile, in FIG. 28, the position in the horizontal direction of the reconstructed depth image is plotted along the abscissa and the depth value is plotted along the ordinate.

Second Embodiment

[Configuration Example of Second Embodiment of Image Processing Device]

Figure 29:
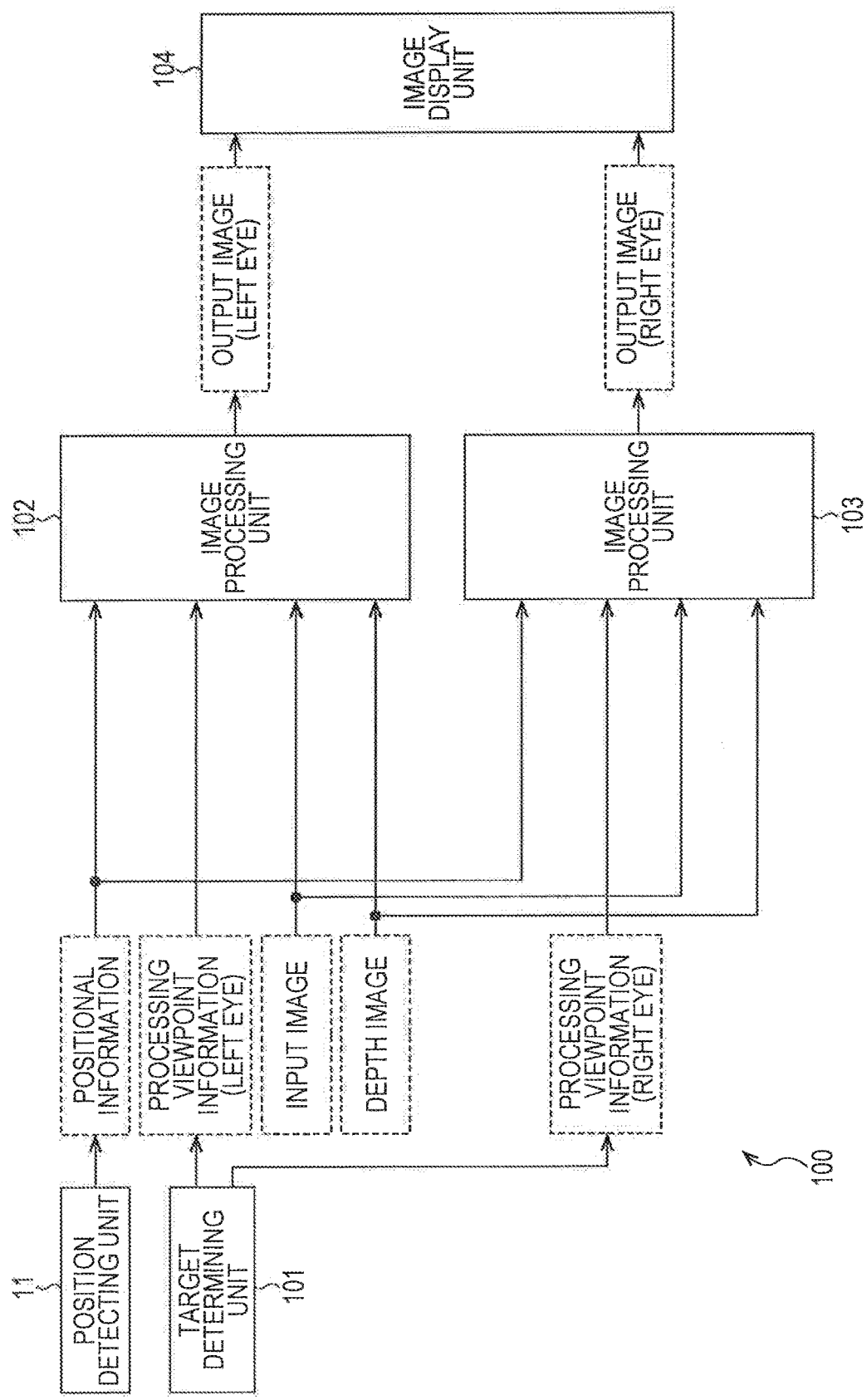
FIG. 29 is a block diagram illustrating a configuration example of a second embodiment of an image processing device to which this technology is applied.

FIG. 29 is a block diagram illustrating a configuration example of a second embodiment of an image processing device to which this technology is applied.

In the configuration illustrated in FIG. 29, the same reference sign is assigned to the same configuration as the configuration in FIG. 3. Overlapping description is appropriately omitted.

A configuration of an image processing device 100 in FIG. 29 is different from the configuration in FIG. 3 principally in that image processing units 102 and 103 are provided in place of an image processing unit 12, an image display unit 104 is provided in place of an image display unit 13, and a target determining unit 101 is newly provided. The image processing device 100 displays output images of two viewpoints for a left eye and a right eye based on an input image and a depth image of one or more viewpoints and positional information.

Specifically, the target determining unit 101 of the image processing device 100 supplies processing viewpoint information to specify the left eye as the viewpoint, corresponding to a generation target in the image processing unit 102 to the image processing unit 102. The target determining unit 101 also supplies the processing viewpoint information to specify the right eye as the viewpoint corresponding to the generation target in the image processing unit 103 to the image processing unit 103.

A color image of one or more viewpoints is externally input as the input image and the depth image of one or more viewpoints corresponding to the input image is externally input to the image processing unit 102 in the same manner as the image processing unit 12 in FIGS. 3 and 4. The image processing unit 102 corrects the input image and the depth image, which are externally input, based on the positional information supplied from the position detecting unit 11 and the processing viewpoint information supplied from the target determining unit 101. The image processing unit 102 generates the color image of one predetermined viewpoint using the corrected input image and depth image and supplies the same to the image display unit 104 as the output image for the left eye.

The image processing unit 103 is configured in the same manner as the image processing unit 102. The color image of one or more viewpoints is externally input as the input image and the depth image of one or more viewpoints corresponding to the input image is externally input to the image processing unit 103 in the same manner as the image processing unit 102. The image processing unit 103 corrects the input image and the depth image, which are externally input, based on the positional information supplied from the position detecting unit 11 and the processing viewpoint information supplied from the target determining unit 101 in the same manner as the image processing unit 102. The image processing unit 103 generates the color image of one predetermined viewpoint using the corrected input image and depth image and supplies the same to the image display unit 104 as the output image for the right eye in the same manner as the image processing unit 102.

The image display unit 104 is composed of a 3D display, which displays a two-view 3D image. The image display unit 104 alternatively displays, for example, the output image for the left eye supplied from the image processing unit 102 and the output image for the right eye supplied from the image processing unit 103. According to this, a viewer may view the 3D image by wearing glasses for 3D viewing and the like whose shutter for the left eye opens when the output image for the left eye is displayed and whose shutter for the right eye opens when the output image for the right eye is displayed.

Figure 30:
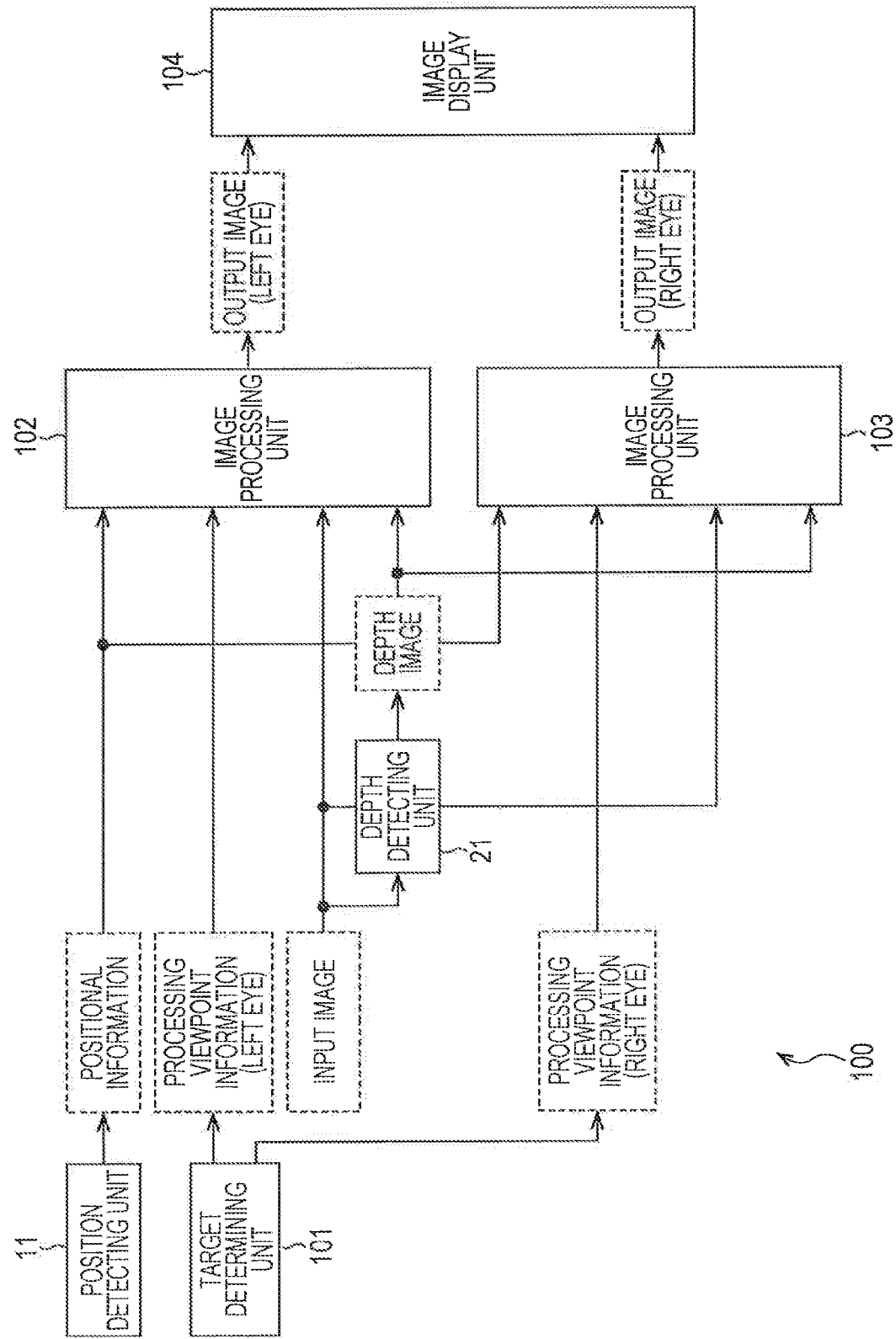
FIG. 30 is a block diagram illustrating another configuration example of the second embodiment of the image processing device to which this technology is applied.

Meanwhile, although the depth image of one or more viewpoints corresponding to the input image is input in the image processing device 100 in FIG. 29, this may also be generated from the input image. In this case, the image processing device 100 is provided with a depth detecting unit 21 in FIG. 4 as illustrated in FIG. 30.

[Detailed Configuration Example of Image Processing Unit]

Figure 31:
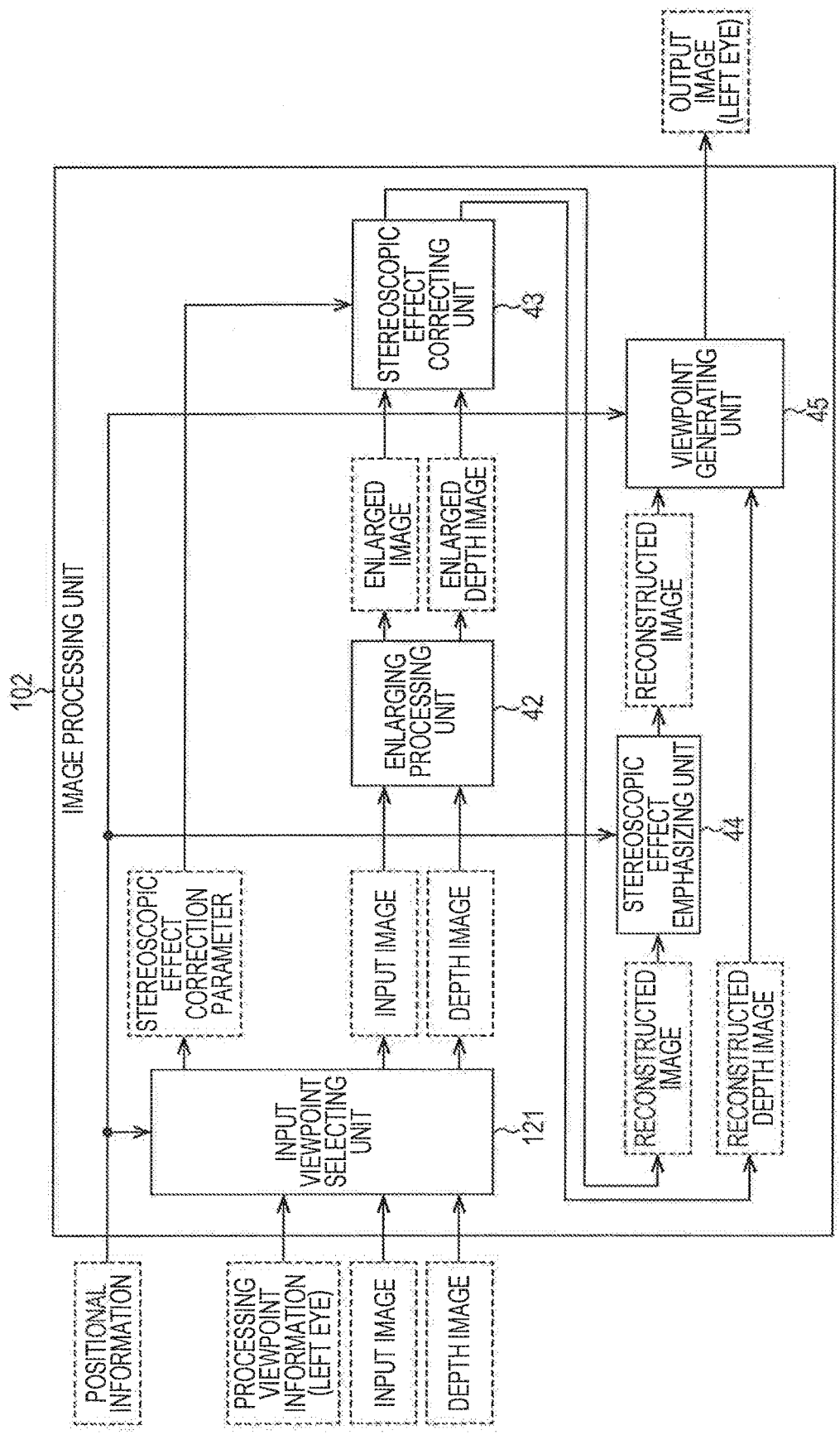
FIG. 31 is a block diagram illustrating a detailed configuration example of an image processing unit in FIG. 29.

FIG. 31 is a block diagram illustrating a detailed configuration example of the image processing unit 102 in FIG. 29.

In the configuration illustrated in FIG. 31, the same reference sign is assigned to the same configuration as the configuration in FIG. 5. Overlapping description is appropriately omitted.

The configuration of the image processing unit 102 in FIG. 31 is different from the configuration in FIG. 5 principally in that an input viewpoint selecting unit 121 is provided in place of an input viewpoint selecting unit 41.

Specifically, the input viewpoint selecting unit 121 of the image processing unit 102 selects a predetermined viewpoint from the viewpoint of the input image, which is externally input, based on the viewing position indicated by the positional information supplied from the position detecting unit 11 and the processing viewpoint information supplied from the target determining unit 101. Then, the input viewpoint selecting unit 121 generates the input image and the depth image of one predetermined viewpoint using the input image of the selected predetermined viewpoint and the corresponding depth image and supplies the same to an enlarging processing unit 42 in the same manner as the input viewpoint selecting unit 41 in FIG. 5. The input viewpoint selecting unit 121 also generates a stereoscopic effect correction parameter based on the viewing position indicated by the positional information and the left eye specified by the processing viewpoint information and supplies the same to a stereoscopic effect correcting unit 43.

Meanwhile, although not illustrated, it is also possible that the image processing unit 102 in FIG. 31 is provided with the stereoscopic effect correcting unit 43 on a subsequent stage of a stereoscopic effect emphasizing unit 44.

[Detailed Configuration Example of Input Viewpoint Selecting Unit]

Figure 32:
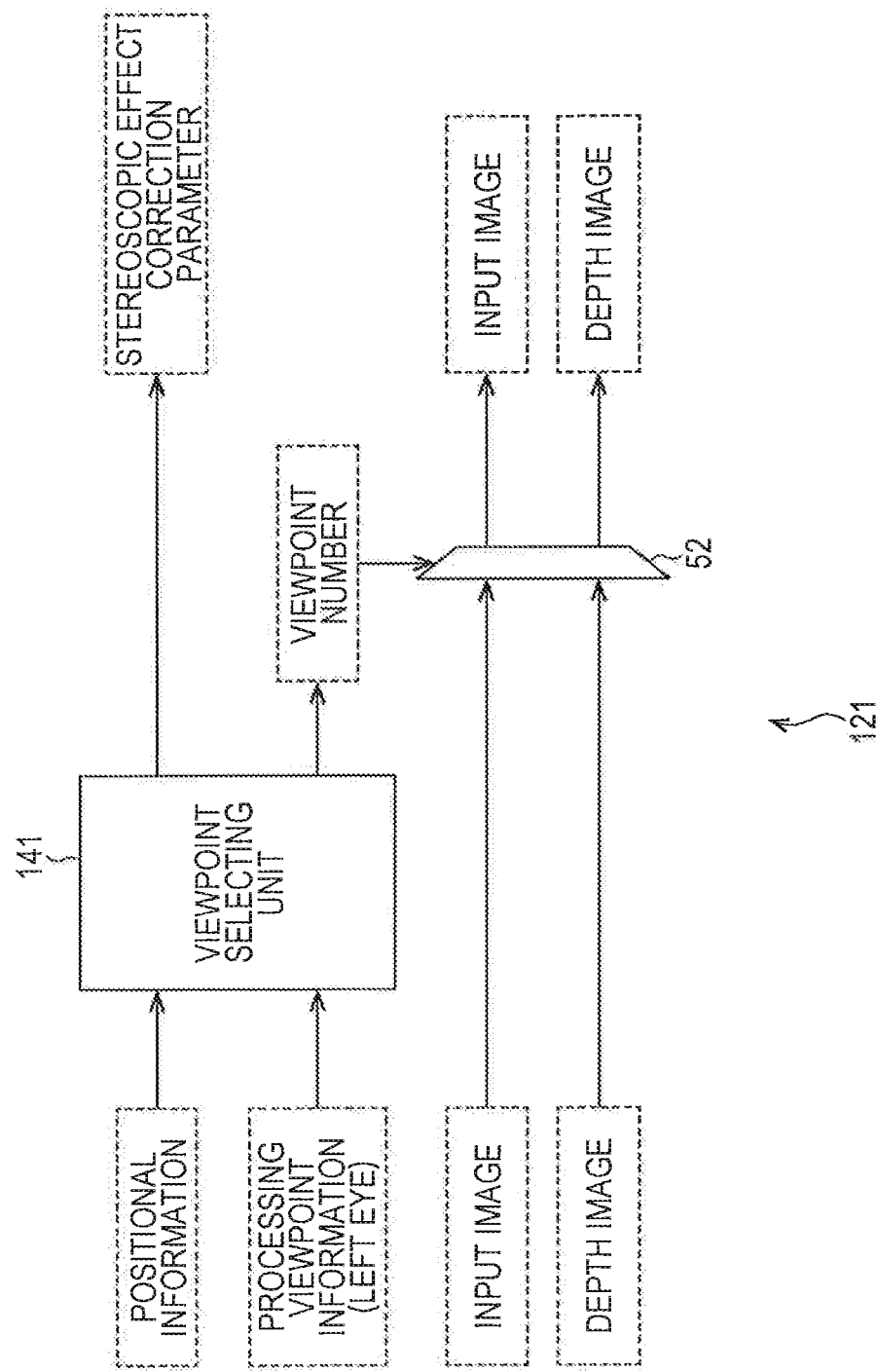
FIG. 32 is a block diagram illustrating a detailed configuration example of an input viewpoint selecting unit in FIG. 31.

FIG. 32 is a block diagram illustrating a detailed configuration example of the input viewpoint selecting unit 121 in FIG. 31.

In the configuration illustrated in FIG. 32, the same reference sign is assigned to the same configuration as the configuration in FIG. 7. Overlapping description is appropriately omitted.

The configuration of the input viewpoint selecting unit 121 in FIG. 32 is different from the configuration in FIG. 7 principally in that a viewpoint selecting unit 141 is provided in place of a viewpoint selecting unit 51.

Specifically, the viewpoint selecting unit 141 of the input viewpoint selecting unit 121 selects one predetermined viewpoint from the viewpoint of the input image based on the viewing position indicated by the positional information supplied from the position detecting unit 11 and the left eye specified by the processing viewpoint information supplied from the target determining unit 101.

In further detail, the viewpoint selecting unit 141 obtains a viewing position of the left eye (hereinafter, referred to as a left-eye viewing position) based on the viewing position and selects one predetermined viewpoint corresponding to the left-eye viewing position. Meanwhile, the left-eye viewing position is a position shifted from the viewing position to the left by a predetermined distance, for example.

The viewpoint selecting unit 141 supplies a viewpoint number of the one selected viewpoint to a selector 52. The viewpoint selecting unit 141 also generates a coordinate of the left-eye viewing position based on an initial position set in advance for the one selected viewpoint as the stereoscopic effect correction parameter based on the left-eye viewing position and supplies the same to the stereoscopic effect correcting unit 43.

[Another Detailed Configuration Example of Input Viewpoint Selecting Unit]

Figure 33:
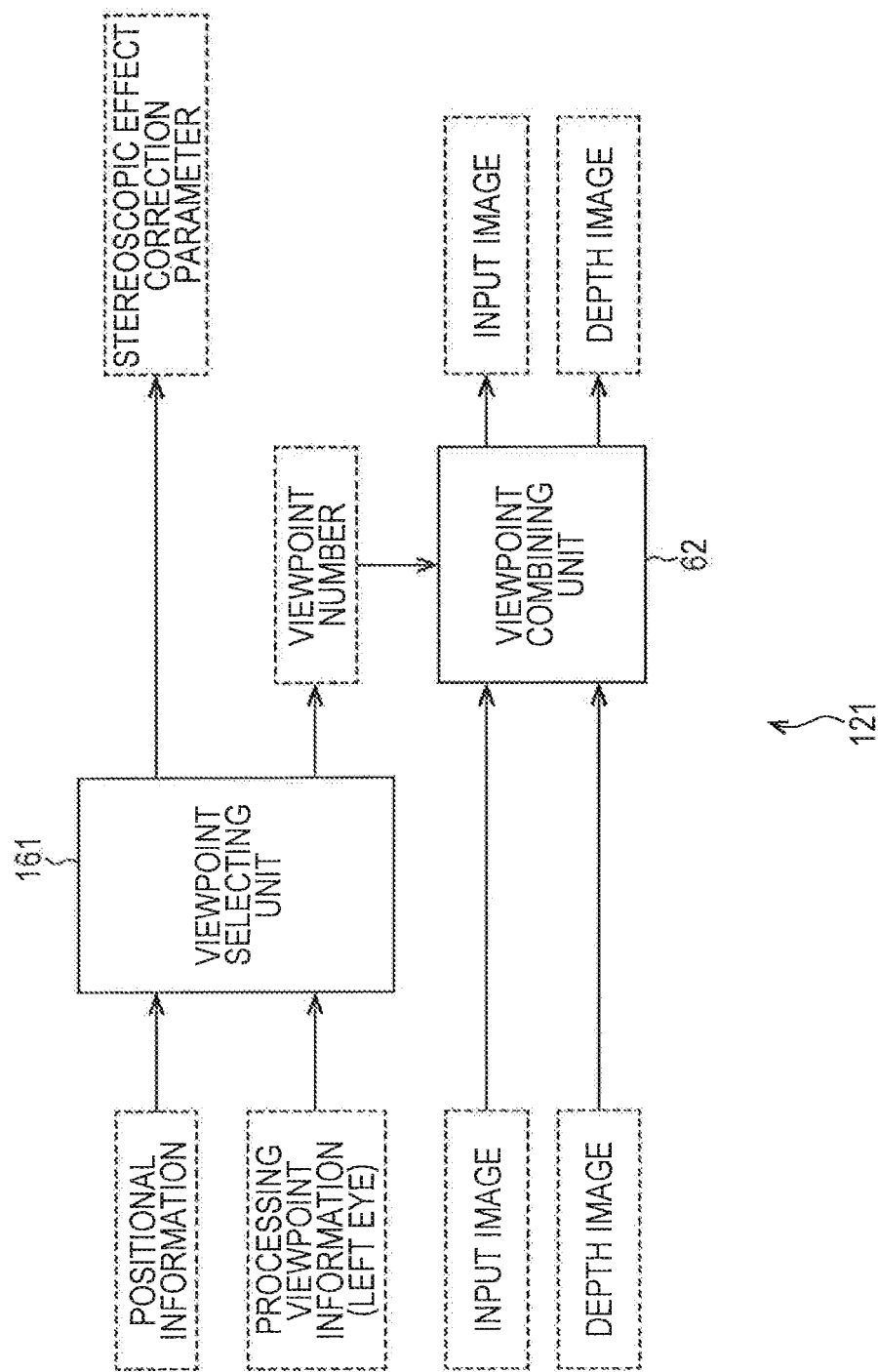
FIG. 33 is a block diagram illustrating another detailed configuration example of the input viewpoint selecting unit in FIG. 31.

FIG. 33 is a block diagram illustrating another detailed configuration example of the input viewpoint selecting unit 121 in FIG. 31.

In the configuration illustrated in FIG. 33, the same reference sign is assigned to the same configuration as the configuration in FIG. 8. Overlapping description is appropriately omitted.

The configuration of the input viewpoint selecting unit 121 in FIG. 33 is different from the configuration in FIG. 8 principally in that a viewpoint selecting unit 161 is provided in place of a viewpoint selecting unit 61.

Specifically, the viewpoint selecting unit 161 of the input viewpoint selecting unit 121 selects a plurality of viewpoints from the viewpoints of the input images based on the viewing position indicated by the positional information from the position detecting unit 11 and the left eye specified by the processing viewpoint information from the target determining unit 101. In further detail, the viewpoint selecting unit 161 obtains the left-eye viewing position based on the viewing position. Then, the viewpoint selecting unit 161 selects a plurality of viewpoints including one predetermined viewpoint corresponding to the left-eye viewing position and the viewpoint adjacent to the one viewpoint from the viewpoints of the input images.

The viewpoint selecting unit 161 supplies the viewpoint numbers of a plurality of selected viewpoints to a viewpoint combining unit 62 in the same manner as the viewpoint selecting unit 61 in FIG. 8. The viewpoint selecting unit 161 also generates the stereoscopic effect correction parameter based on the left-eye viewing position and supplies the same to the stereoscopic effect correcting unit 43 in the same manner as the viewpoint selecting unit 141 in FIG. 32.

[Description of Process of Image Processing Unit]

An image process of the image processing unit 102 in FIG. 31 is similar to the image process in FIG. 24 except a viewpoint selecting process, so that only the viewpoint selecting process is described.

Figure 34:
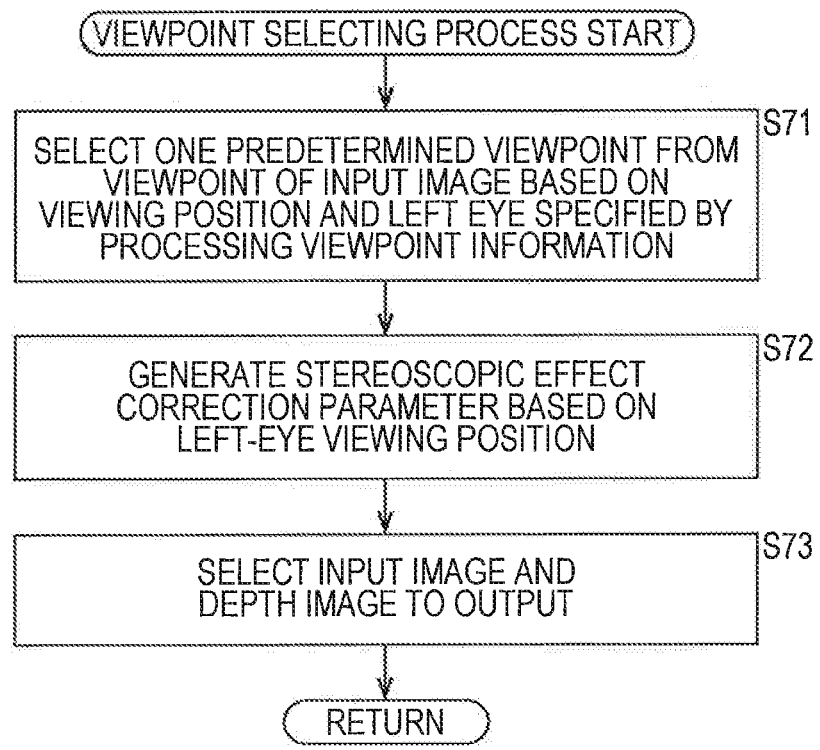
FIG. 34 is a flowchart illustrating a viewpoint selecting process by the input viewpoint selecting unit in FIG. 32 in detail.

FIG. 34 is a flowchart illustrating the viewpoint selecting process by the input viewpoint selecting unit 121 in FIG. 32 in detail.

At step S71 in FIG. 34, the viewpoint selecting unit 141 of the input viewpoint selecting unit 121 selects one predetermined viewpoint corresponding to the left-eye viewing position from the viewpoint of the input image based on the viewing position and the left eye specified by the processing viewpoint information. The input viewpoint selecting unit 41 supplies the viewpoint number of the one selected viewpoint to the selector 52.

At step S72, the viewpoint selecting unit 141 generates the coordinate of the left-eye viewing position based on the initial position set in advance for the one selected viewpoint as the stereoscopic effect correction parameter based on the left-eye viewing position and supplies the same to the stereoscopic effect correcting unit 43.

A process at step S73 is similar to the process at step S33 in FIG. 25, so that description thereof is omitted.

Figure 35:
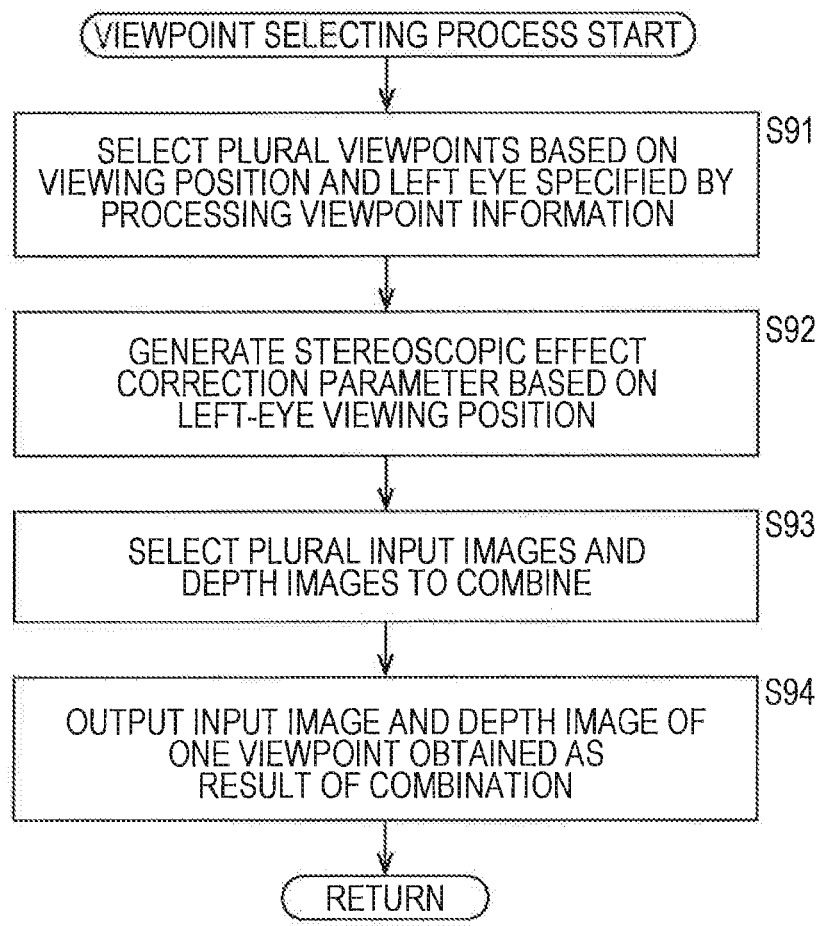
FIG. 35 is a flowchart illustrating the viewpoint selecting process by the input viewpoint selecting unit in FIG. 33 in detail.

FIG. 35 is a flowchart illustrating the viewpoint selecting process by the input viewpoint selecting unit 121 in FIG. 33 in detail.

At step S91 in FIG. 35, the viewpoint selecting unit 161 of the input viewpoint selecting unit 121 selects a plurality of viewpoints including one predetermined viewpoint corresponding to the left-eye viewing position and the viewpoint adjacent to the one viewpoint from the viewpoints of the input images based on the viewing position and the left eye specified by the processing viewpoint information. The viewpoint selecting unit 161 supplies the viewpoint numbers of a plurality of selected viewpoints to the viewpoint combining unit 62.

At step S92, the viewpoint selecting unit 161 generates the stereoscopic effect correction parameter based on the left-eye viewing position and supplies the same to the stereoscopic effect correcting unit 43 in the same manner as the viewpoint selecting unit 141 in FIG. 32.

Processes at steps S93 and S94 are similar to the processes at steps S43 and S44 in FIG. 26, so that description thereof is omitted.

[Another Configuration Example of Second Embodiment of Image Processing Device]

Figure 36:
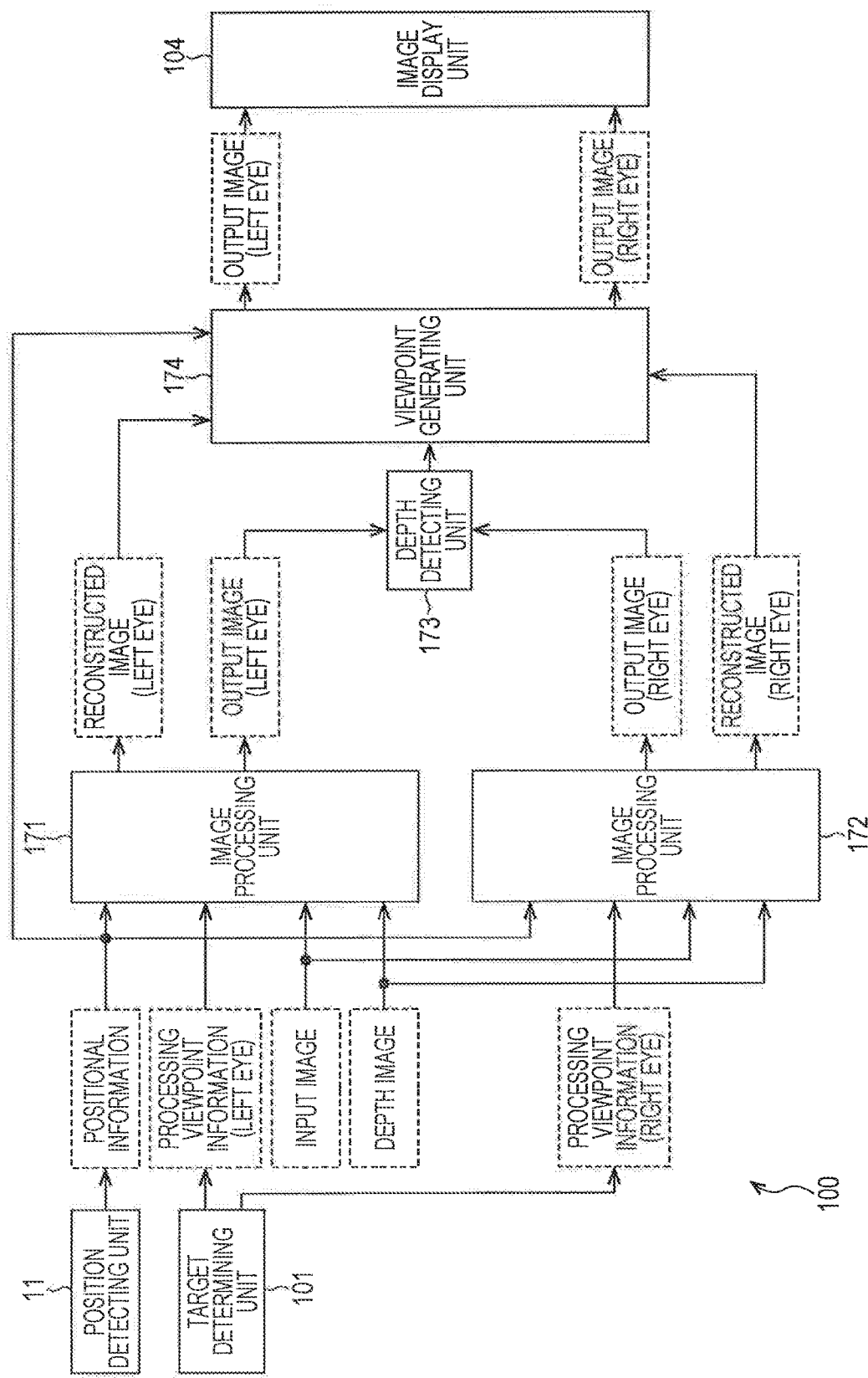
FIG. 36 is a block diagram illustrating yet another configuration example of the second embodiment of the image processing device to which this technology is applied.

FIG. 36 is a block diagram illustrating another configuration example of the image processing device 100.

In the configuration illustrated in FIG. 36, the same reference sign is assigned to the same configuration as the configuration in FIG. 29. Overlapping description is appropriately omitted.

The configuration of the image processing device 100 in FIG. 36 is different from the configuration in FIG. 29 principally in that an image processing unit 171 is provided in place of the image processing unit 102, an image processing unit 172 is provided in place of the image processing unit 103, and a depth detecting unit 173 and a viewpoint generating unit 174 are newly provided. The image processing device 100 generates a common depth image using the output image for the left eye generated by the image processing unit 102 and the output image for the right eye generated by the image processing unit 103 and generates a new output image for the left eye and a new output image for the right eye using the common depth image.

Specifically, the image processing unit 171 of the image processing device 100 is configured in the same manner as the image processing unit 102 in FIG. 31 except that a viewpoint generating unit 45 in FIG. 31 outputs a reconstructed image supplied from the stereoscopic effect emphasizing unit 44 together with the output image for the left eye. The output image for the left eye output from the image processing unit 171 is supplied to the depth detecting unit 173 and the reconstructed image is supplied to the viewpoint generating unit 174 as the reconstructed image for the left eye.

Also, the image processing unit 172 is configured in the same manner as the image processing unit 103 except that the viewpoint generating unit of the image processing unit 103 in FIG. 29 outputs the reconstructed image supplied from the stereoscopic effect emphasizing unit together with the output image for the right eye. The output image for the right eye output from the image processing unit 172 is supplied to the depth detecting unit 173 and the reconstructed image is supplied to the viewpoint generating unit 174 as the reconstructed image for the right eye.

The depth detecting unit 173 generates the common depth image by matching and the like using the output image for the left eye supplied from the image processing unit 171 and the output image for the right eye supplied from the image processing unit 172. The depth detecting unit 173 supplies the generated common depth image to the viewpoint generating unit 174.

The viewpoint generating unit 174 serves as a display control unit and performs a projecting process to the reconstructed image for the left eye supplied from the image processing unit 171 based on the viewing position indicated by the positional information supplied from the position detecting unit 11 and the depth image supplied from the depth detecting unit 173. Then, the viewpoint generating unit 174 supplies the image of one predetermined viewpoint obtained as a result to the image display unit 104 as the output image for the left eye. The viewpoint generating unit 174 also performs the projecting process to the reconstructed image for the right eye supplied from the image processing unit 172 based on the viewing position and the depth image. Then, the viewpoint generating unit 174 supplies the image of one predetermined viewpoint obtained as a result to the image display unit 104 as the output image for the right eye.

[Description of Projecting Process of Viewpoint Generating Unit]

Figure 37:
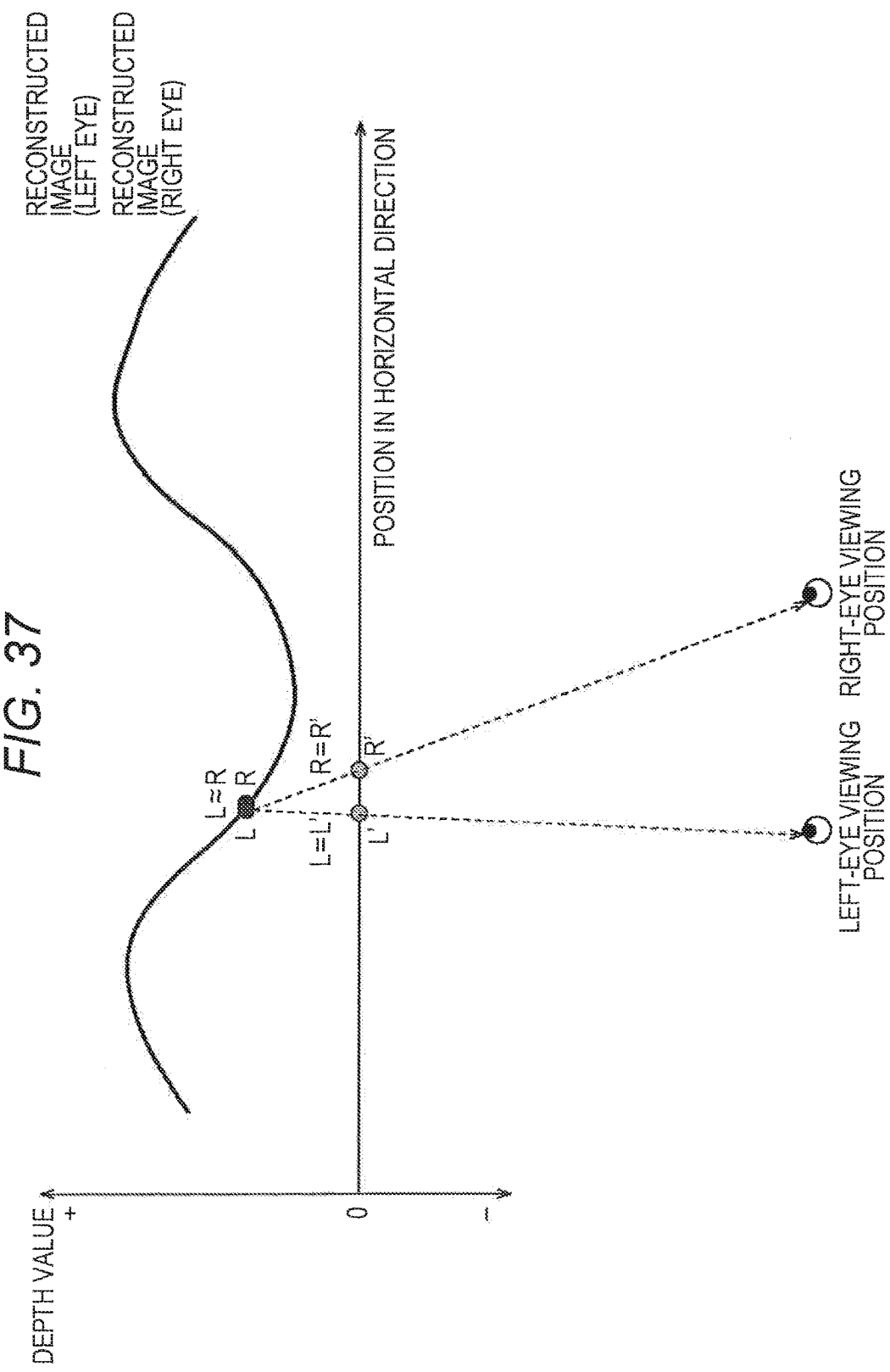
FIG. 37 is a view illustrating a projecting process of a viewpoint generating unit in FIG. 36.

FIG. 37 is a view illustrating the projecting process of the viewpoint generating unit 174 in FIG. 36.

Meanwhile, FIG. 37 is a graph illustrating a depth value of the common depth image corresponding to the reconstructed images for the left eye and the right eye input to the viewpoint generating unit 174 and positions of the output images for the left eye and the right eye corresponding to pixels of the reconstructed images for the left eye and the right eye.

In FIG. 37, positions in a horizontal direction of the reconstructed images and the output images for the left eye and the right eye are plotted along the abscissa and the depth value is plotted along the ordinate. In FIG. 37, a curved line represents the depth value of the common depth image corresponding to the reconstructed images for the left eye and the right eye.

As illustrated in FIG. 37, the viewpoint generating unit 174 first projects each pixel of the reconstructed image for the left eye toward the left-eye viewing position in the projecting process to the reconstructed image for the left eye. According to this, the viewpoint generating unit 174 obtains an intersection of a projection line with the image display unit 104 represented by a gray circle to which L is assigned in FIG. 37 as the position of the output image for the left eye corresponding to the pixel corresponding to the depth value represented by a black circle to which L is assigned in FIG. 37, for example. Then, the viewpoint generating unit 174 uses a pixel value of each pixel of the reconstructed image for the left eye as the pixel value of the intersection corresponding to the pixel to interpolate the pixel value of each pixel of the output image for the left eye.

Similarly, the viewpoint generating unit 174 first projects each pixel of the reconstructed image for the right eye toward a viewing position of the right eye (hereinafter, referred to as a right-eye viewing position) in the projecting process to the reconstructed image for the right eye. According to this, the viewpoint generating unit 174 obtains the intersection of the projection line with the image display unit 104 represented by the gray circle to which R' is assigned in FIG. 37 as the position of the output image for the right eye corresponding to the pixel corresponding to the depth value represented by the black circle to which R is assigned in FIG. 37, for example. Then, the viewpoint generating unit 174 uses the pixel value of each pixel of the reconstructed image for the right eye as the pixel value of the intersection corresponding to the pixel to interpolate the pixel value of each pixel of the output image for the right eye.

Meanwhile, the right-eye viewing position is a position shifted from the viewing position to the right by a predetermined distance, for example.

When the projecting process to the reconstructed images for the left eye and the right eye is performed using the common depth image in the above-described manner, the viewer may realize sure fusion of the 3D image in a position in a depth direction corresponding to the common depth image.

As described above, the image processing device 100 corrects the depth image based on the viewing position, so that this may realize motion parallax closely related to that of the real world in the image display unit 104, which is the 3D display to display the two-view 3D image. As a result, the viewer may realize highly-accurate stereoscopic viewing.

Third Embodiment

[Configuration Example of Third Embodiment of Image Processing Device]

Figure 38:
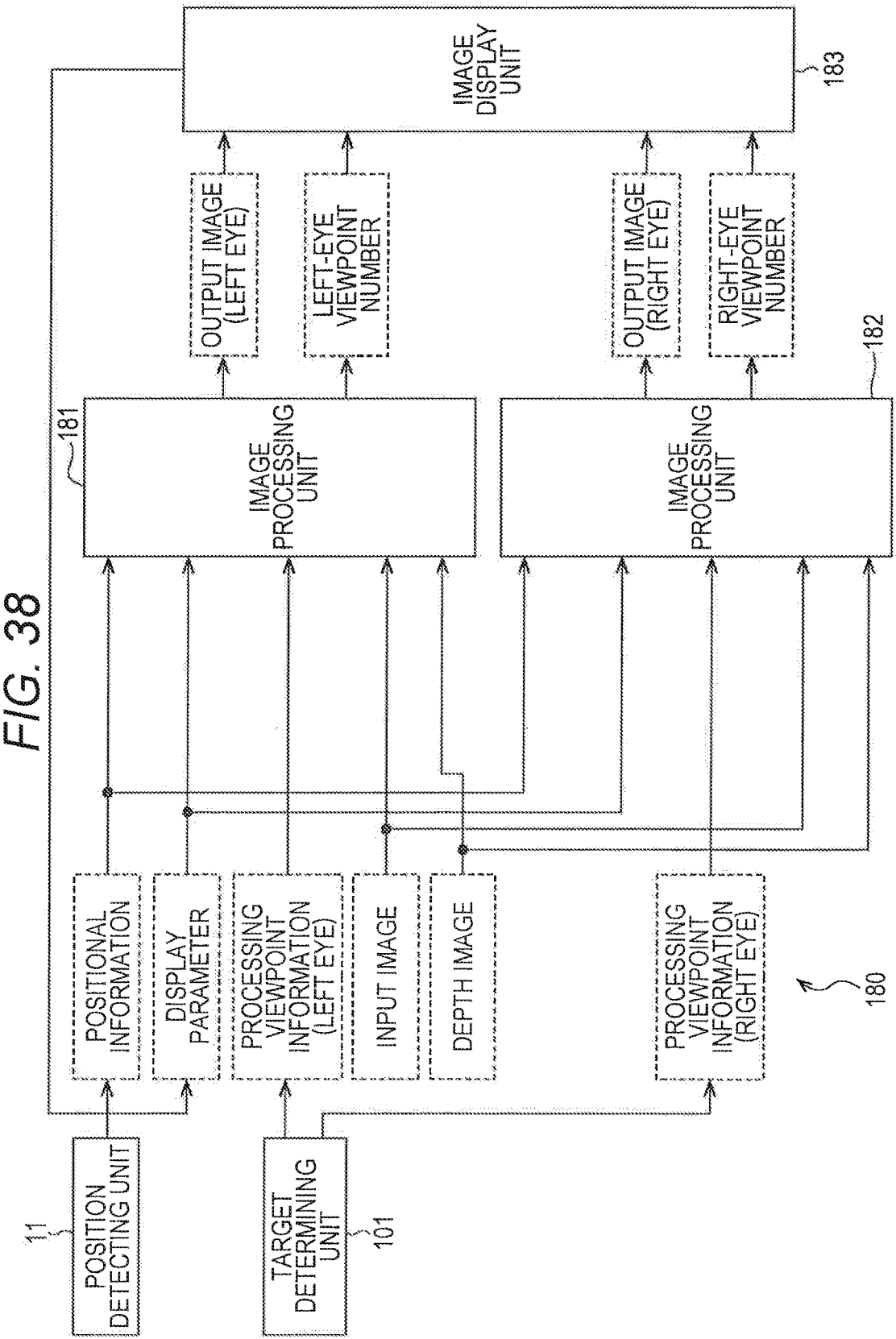
FIG. 38 is a block diagram illustrating a configuration example of a third embodiment of an image processing device to which this technology is applied.

FIG. 38 is a block diagram illustrating a configuration example of a third embodiment of an image processing device to which this technology is applied.

In the configuration illustrated in FIG. 38, the same reference sign is assigned to the same configuration as the configuration in FIG. 29. Overlapping description is appropriately omitted.

A configuration of an image processing device 180 in FIG. 38 is different from the configuration in FIG. 29 principally in that an image processing unit 181, an image processing unit 182, and an image display unit 183 are provided in place of an image processing unit 102, an image processing unit 103, and an image display unit 104, respectively. The image processing device 180 displays output images of two viewpoints for a left eye and a right eye as a two-view 3D image out of a multi-view 3D image to be displayed, based on an input image and a depth image of one or more viewpoints and positional information.

Specifically, a color image of one or more viewpoints is externally input as the input image and the depth image of one or more viewpoints corresponding to the input image is externally input to the image processing unit 181 of the image processing device 180 in the same manner as the image processing unit 102 in FIG. 29. The image processing unit 181 corrects the input image and the depth image, which are externally input, based on the positional information from a position detecting unit 11, processing viewpoint information from a target determining unit 101, and a display parameter (to be described in detail later) from the image display unit 183. Then, the image processing unit 181 generates the color image of one predetermined viewpoint using the corrected input image and depth image and supplies the same to the image display unit 183 as the output image for the left eye.

Meanwhile, the display parameter is a parameter indicating a viewing position in which the image of each viewpoint of the multi-view 3D images displayed on the image display unit 183 may be viewed. That is to say, the display parameter is the parameter indicating directionality of the multi-view 3D image displayed on the image display unit 183.

The image processing unit 181 also determines the viewpoint of the multi-view 3D image displayed on the image display unit 183 as the image of which the output image for the left eye is displayed based on the display parameter and the viewing position indicated by the positional information. Then, the image processing unit 181 supplies a viewpoint number of the viewpoint to the image display unit 183 as a left-eye viewpoint number.

The image processing unit 182 is configured in the same manner as the image processing unit 181. The color image of one or more viewpoints is externally input as the input image and the depth image of one or more viewpoints corresponding to the input image is externally input to the image processing unit 182 in the same manner as the image processing unit 181. The image processing unit 182 corrects the input, image and the depth image, which are externally input, based on the positional information from the position detecting unit 11, the processing viewpoint information from the target determining unit 101, and the display parameter from the image display unit 183 in the same manner as the image processing unit 181. The image processing unit 182 generates the color image of one predetermined viewpoint using the corrected input image and depth image and supplies the same to the image display unit 183 as the output image for the right eye in the same manner as the image processing unit 181.

The image processing unit 182 also determines the viewpoint of the multi-view 3D image displayed on the image display unit 183 as the image of which the output image for the right eye is displayed based on the display parameter and the viewing position indicated by the positional information. Then, the image processing unit 182 supplies the viewpoint number of the viewpoint to the image display unit 183 as a right-eye viewpoint number.

The image display unit 183 is composed of a 3D display, which displays the multi-view 3D image. The image display unit 183 generates the multi-view 3D image including the output image for the left eye and the output image for the right eye based on the left-eye viewpoint number supplied from the image processing unit 181 and the right-eye viewpoint number supplied from the image processing unit 182. For example, the image display unit 183 generates the multi-view 3D image in which the image of the viewpoint of the left-eye viewpoint number is the output image for the left eye, the image of the viewpoint of the right-eye viewpoint number is the output image for the right eye, and the image of the viewpoint other than the viewpoints is a predetermined image (for example, a black image).

Then, the image display unit 183 displays the generated multi-view 3D image in different directions for each viewpoint. According to this, a viewer may view the 3D image without wearing glasses for 3D viewing.

Figure 39:
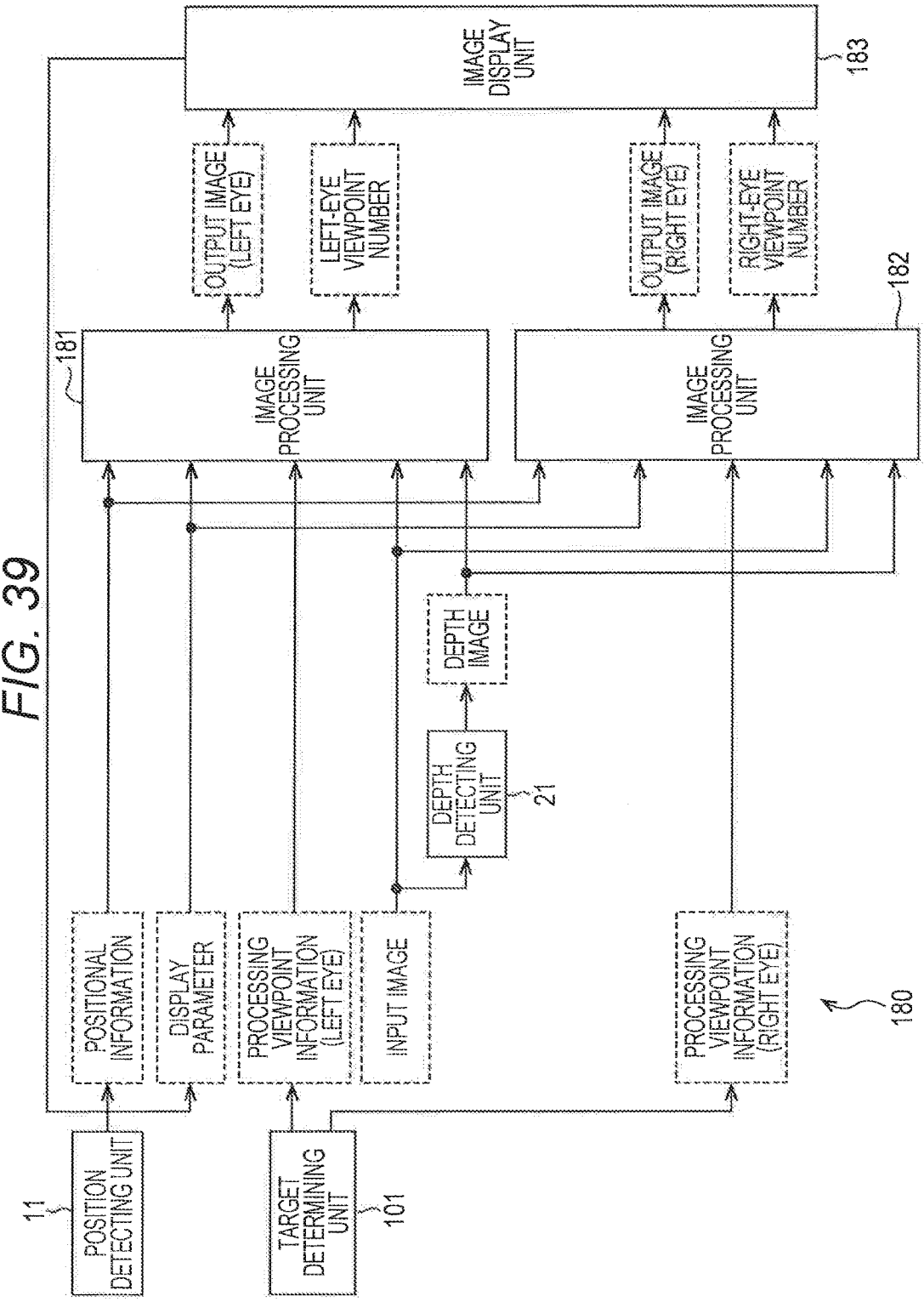
FIG. 39 is a block diagram illustrating another configuration example of the third embodiment of the image processing device to which this technology is applied.

Meanwhile, although the depth image of one or more viewpoints corresponding to the input image is input in the image processing device 180 in FIG. 38, this may also be generated from the input image. In this case, the image processing device 180 is provided, with a depth detecting unit 21 in FIG. 4 as illustrated in FIG. 39. Although not illustrated, it is also possible that the image processing device 180 in FIG. 38 generates new output images for the left eye and the right eye using a common depth image and generates the multi-view 3D image including the output images for the left eye and the right eye in the same manner as the image processing device 100 in FIG. 36.

When there is a plurality of viewers, the image processing device 180 may generate the output image for the left eye and the output image for the right eye for each viewer and display the multi-view 3D image including the output images for the left eye and the output images for the right eye of all the viewers. In this case, only the two-view 3D image is displayed for each viewer, so that, when crosstalk occurs between the images of adjacent viewpoints, the viewer might feel fatigued.

[Detailed Configuration Example of Image Processing Unit]

Figure 40:
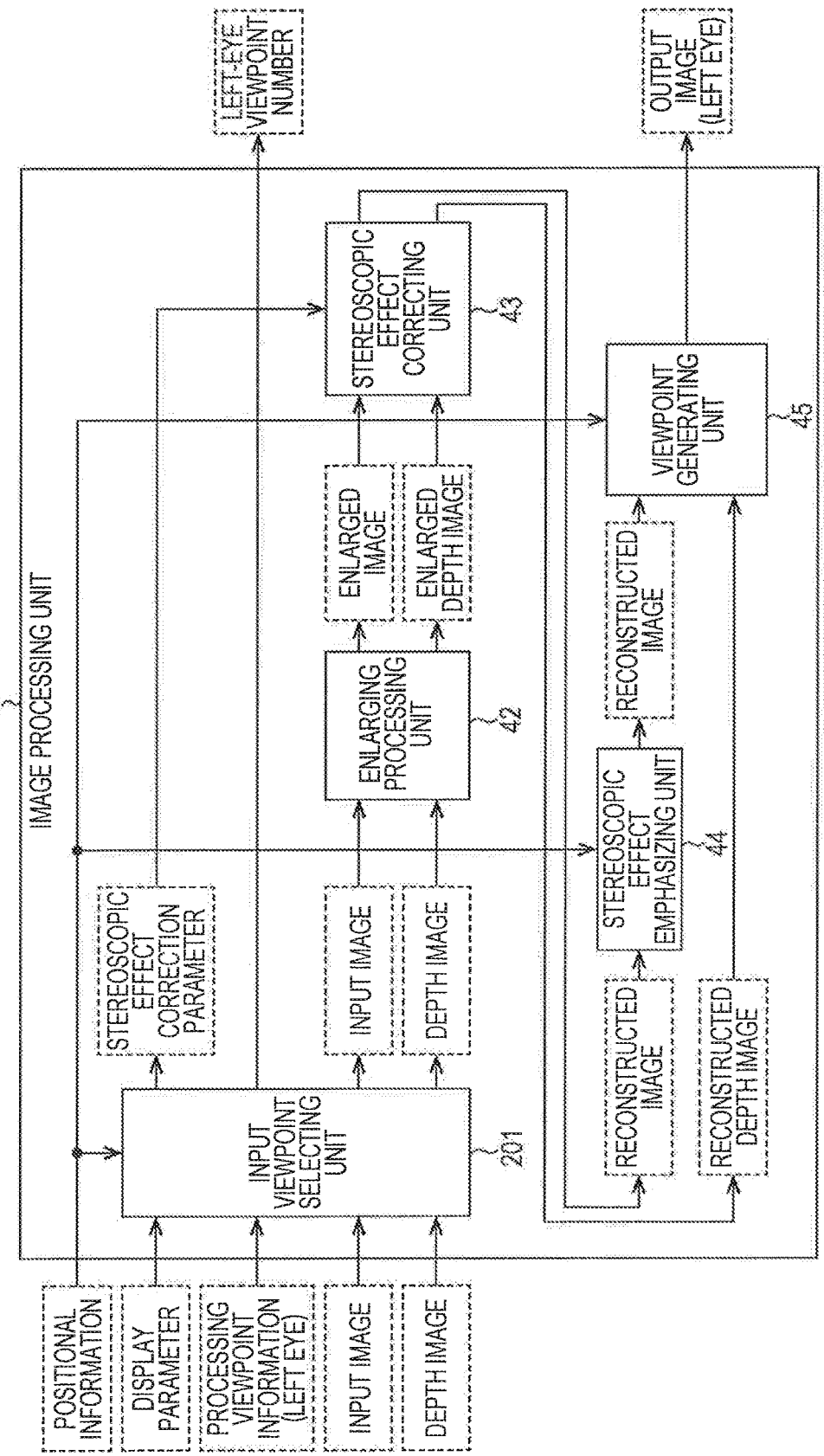
FIG. 40 is a block diagram illustrating a detailed configuration example of an image processing unit in FIG. 38.

FIG. 40 is a block diagram illustrating a detailed configuration example of the image processing unit 181 in FIG. 38.

In the configuration illustrated in FIG. 40, the same reference sign is assigned to the same configuration as the configuration in FIG. 5. Overlapping description is appropriately omitted.

The configuration of the image processing unit 181 in FIG. 40 is different from the configuration in FIG. 5 principally in that an input viewpoint selecting unit 201 is provided in place of an input viewpoint selecting unit 41.

Specifically, the input viewpoint selecting unit 201 of the image processing unit 181 determines the viewpoint of the multi-view 3D image displayed on the image display unit 183 as the image of which the output image for the left eye is displayed used on the viewing position indicated by the positional information from the position detecting unit 11, the processing viewpoint information from the target determining unit 101, and the display parameter from the image display unit 183. Then, the input viewpoint selecting unit 201 supplies the viewpoint number of the viewpoint to the image display unit 183 as the left-eye viewpoint number.

The input viewpoint selecting unit 201 selects a predetermined viewpoint from the viewpoint of the input image, which is externally input, based on the left-eye viewpoint number. Then, the input viewpoint selecting unit 201 generates the input image and the depth image of one predetermined viewpoint using the input image of the selected predetermined viewpoint and the corresponding depth image and supplies the same to an enlarging processing unit 42 in the same manner as the input viewpoint selecting unit 41 in FIG. 5. Further, the input viewpoint selecting unit 201 generates a stereoscopic effect correction parameter based on the left-eye viewpoint number, the viewing position indicated by the positional information, and the left eye specified by the processing viewpoint information and supplies the same to a stereoscopic effect correcting unit 43.

Meanwhile, although not illustrated, it is also possible that the image processing unit 181 in FIG. 40 is provided with the stereoscopic effect correcting unit 43 on a subsequent stage of a stereoscopic effect emphasizing unit 44.

[Detailed Configuration Example of Input Viewpoint Selecting Unit]

Figure 41:
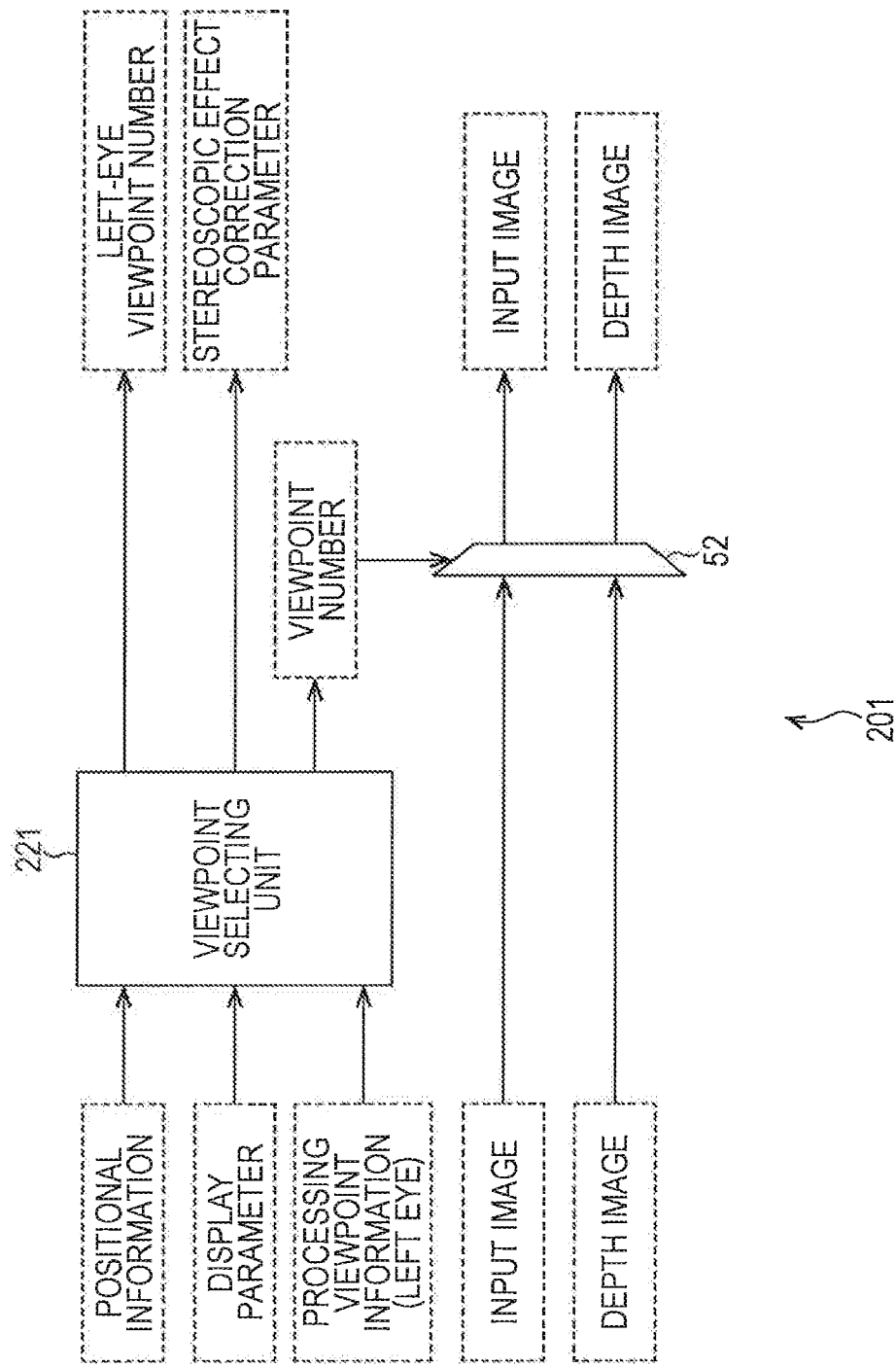
FIG. 41 is a block diagram illustrating a detailed configuration example of an input viewpoint selecting unit in FIG. 40.

FIG. 41 is a block diagram illustrating a detailed configuration example of the input viewpoint selecting unit 201 in FIG. 40.

In the configuration illustrated in FIG. 41, the same reference sign is assigned to the same configuration as the configuration in FIG. 7. Overlapping description is appropriately omitted.

The configuration of the input viewpoint selecting unit 201 in FIG. 41 is different from the configuration in FIG. 7 principally in that a viewpoint selecting unit 221 is provided in place of a viewpoint selecting unit 51.

Specifically, the viewpoint selecting unit 221 of the input viewpoint selecting unit 201 obtains a left-eye viewing position based on the viewing position indicated by the positional information from the position detecting unit 11 and the left eye specified by the processing viewpoint information from the target determining unit 101 in the same manner as the viewpoint selecting unit 141 in FIG. 32. Then, the viewpoint, selecting unit 221 determines the viewpoint of the multi-view 3D image displayed on the image display unit 183 as the image of which the output image for the left eye is displayed based on the left-eye viewing position and the display parameter supplied from the image display unit 183. Then, the viewpoint selecting unit 221 supplies the viewpoint number of the viewpoint to the image display unit 183 as the left-eye viewpoint number.

The viewpoint selecting unit 221 selects one predetermined viewpoint corresponding to the left-eye viewpoint number from the viewpoint of the input image based on the left-eye viewpoint number. The viewpoint selecting unit 221 supplies the viewpoint number of the one selected viewpoint to a selector 52.

Further, the viewpoint selecting unit 221 generates a coordinate of the left-eye viewing position based on an initial position set in advance for the viewpoint of the left-eye viewpoint number as the stereoscopic effect correction parameter based on the left-eye viewing position and supplies the same to the stereoscopic effect correcting unit 43. Meanwhile, the initial position is an optimal position for viewing the 3D image of the viewpoint set for each viewpoint corresponding to the multi-view 3D image displayed on the image display unit 183, for example.

[Description of Process of Input Viewpoint Selecting Unit]

Figure 42:
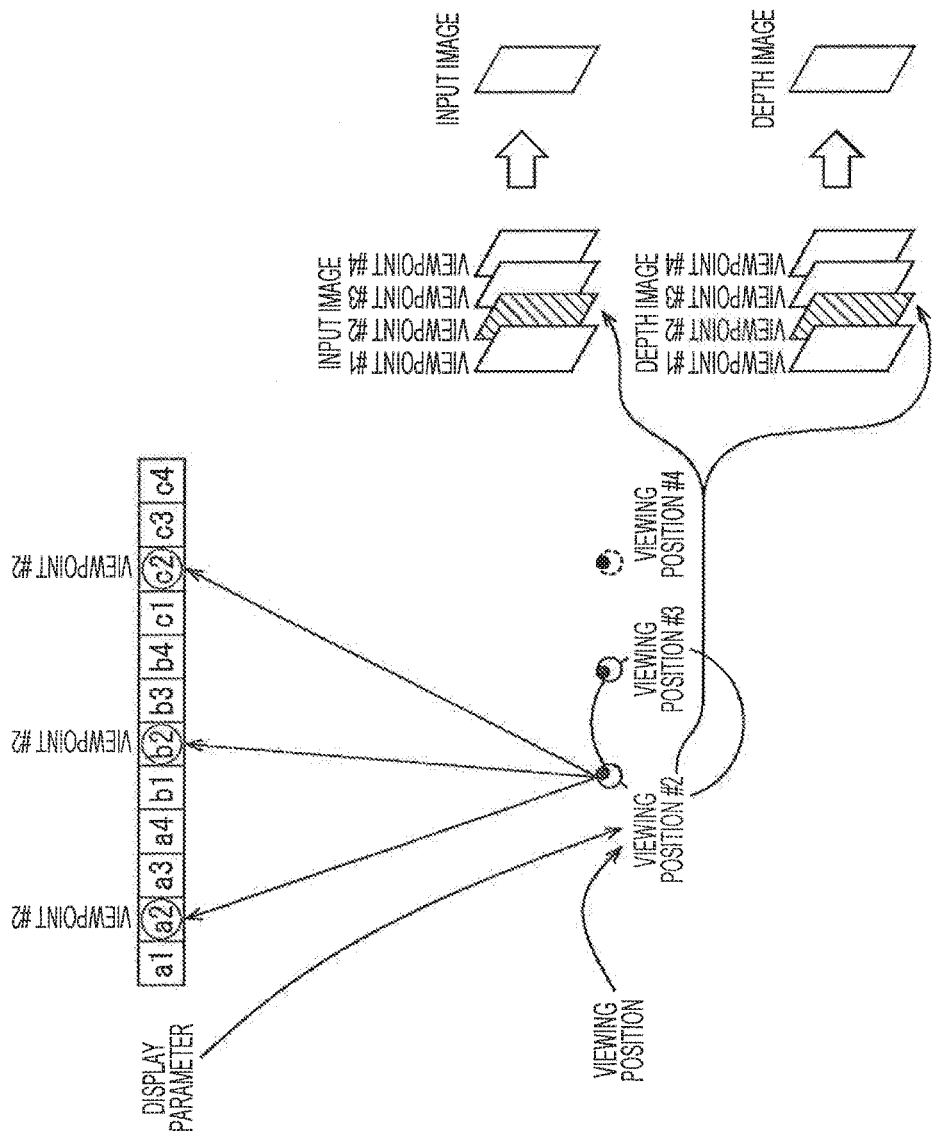
FIG. 42 is a view illustrating selection of a viewpoint of the input viewpoint selecting unit in FIG. 41.
Figure 43:
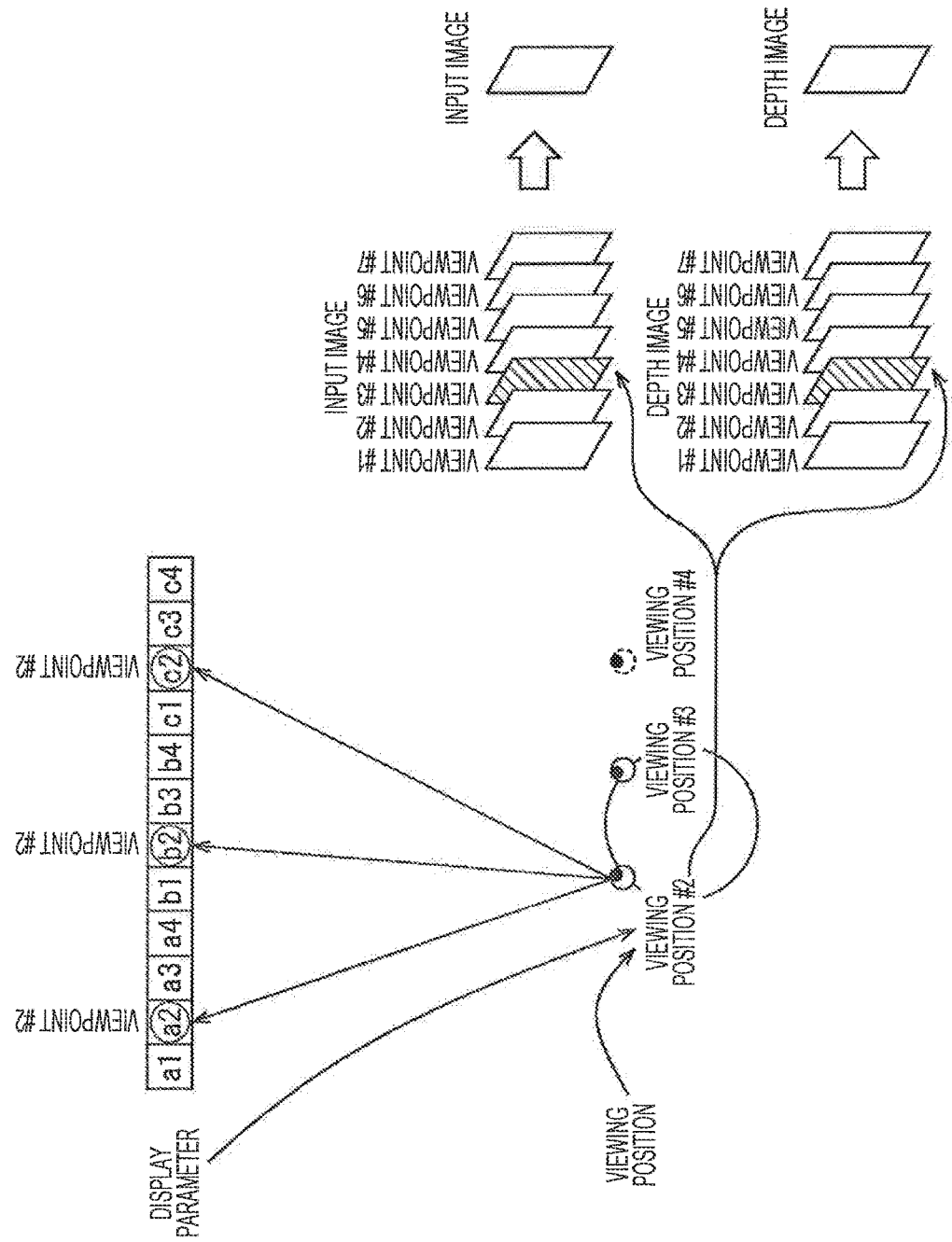
FIG. 43 is a view illustrating the selection of the viewpoint of the input viewpoint selecting unit in FIG. 41.

FIGS. 42 and 43 are views illustrating selection of the viewpoint of the input viewpoint selecting unit 201 in FIG. 41.

FIG. 42 is the view illustrating a process of the viewpoint selecting unit 221 in a case in which the number of viewpoints of the input images and that of the 3D image displayed on the image display unit 183 are the same.

Meanwhile, in an example in FIG. 42, there are four viewpoints of the input images and the 3D image displayed on the image display unit 183. In FIGS. 42 and 43, the viewpoint of viewpoint number i is referred to as viewpoint #i and the viewing position in which the image of the viewpoint of viewpoint number i may be viewed out of the viewing positions indicated, by the display parameters is referred to as viewing position #i.

The viewpoint selecting unit 221 of the input viewpoint selecting unit 201 first obtains the left-eye viewing position based on the viewing position indicated by the positional information and the left eye specified by the processing viewpoint information as illustrated in FIG. 42. Then, the viewpoint selecting unit 221 determines the viewpoint of the multi-view 3D image displayed, on the image display unit 183 as the image of which the output image for the left eye is displayed based on the left-eye viewing position and the display parameter.

In the example in FIG. 42, since the viewpoint corresponding to the 3D image displayed on the image display unit 183, which may be viewed from the left-eye viewing position, is viewpoint #2, the viewpoint selecting unit 221 determines to display the output image for the left eye as the image of viewpoint #2.

Also, in the example in FIG. 42, since the number of viewpoints of the input images and that of the 3D image displayed on the image display unit 183 are the same, the viewpoint selecting unit 221 selects same viewpoint #2 from viewpoints #1 to #4 of the input images as the viewpoint corresponding to viewpoint #2 in the image display unit 183. Then, the viewpoint selecting unit 221 supplies viewpoint number 2 of viewpoint. #2 to the selector 52. According to this, the selector 52 selects the input image and the depth image of viewpoint #2 from the input images and the depth images.

FIG. 43 is the view illustrating the process of the viewpoint selecting unit 221 in a case in which the number of viewpoints of the input images and that of the 3D image displayed on the image display unit 183 are different from each other.

Meanwhile, in an example in FIG. 43, there are seven viewpoints of the input images and four viewpoints of the 3D image displayed on the image display unit 183.

As illustrated in FIG. 43, the viewpoint selecting unit 221 first obtains the left-eye viewing position based on the viewing position indicated by the positional information and the left eye specified by the processing viewpoint information. Then, the viewpoint selecting unit 221 determines the viewpoint of the multi-view 3D image displayed on the image display unit 183 as the image of which the output image for the left eye is displayed based on the left-eye viewing position and the display parameter.

In the example in FIG. 43, since the viewpoint corresponding to the 3D image displayed on the image display unit 183, which may be viewed from the left-eye viewing position, is viewpoint #2, the viewpoint selecting unit 221 determines to display the output image for the left eye as the image of viewpoint #2.

Also, in the example in FIG. 43, since the number of viewpoints of the input images and that of the 3D image displayed on the image display unit 183 are different from each other, the viewpoint selecting unit 221 selects viewpoint #3, for example, from viewpoints #1 to #7 of the input images as the viewpoint corresponding to viewpoint #2 in the image display unit 183. Then, the viewpoint selecting unit 221 supplies viewpoint, number 3 of viewpoint #3 to the selector 52. According to this, the selector 52 selects the input image and the depth image of viewpoint #3 from the input images and the depth images.

Figure 44:
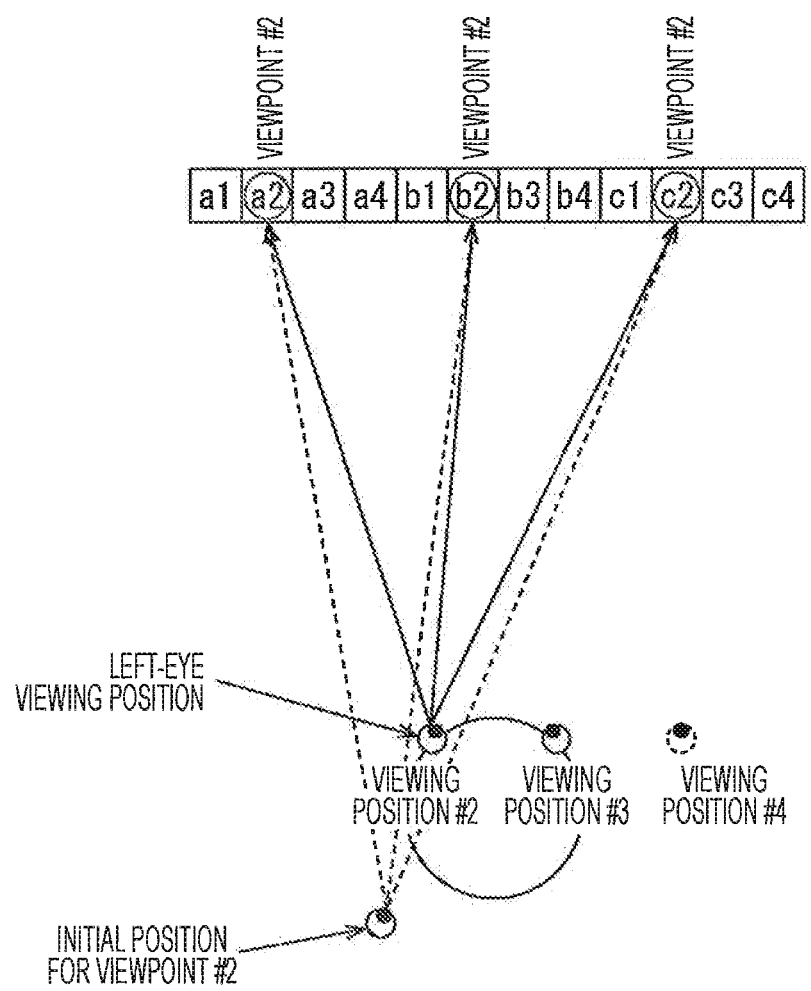
FIG. 44 is a view illustrating generation of a stereoscopic effect correction parameter of a viewpoint selecting unit in FIG. 41.

FIG. 44 is a view illustrating generation of the stereoscopic effect correction parameter of the viewpoint selecting unit 221 in FIG. 41.

In an example in FIG. 44, there are four viewpoints of the input images and the 3D image displayed on the image display unit 183. In FIG. 44, the viewpoint, of viewpoint number i is referred to as viewpoint #i and the viewing position in which the image of the viewpoint of viewpoint number i may be viewed out of the viewing positions indicated by the display parameters is referred to as viewing position #1.

As illustrated in FIG. 44, when the left-eye viewpoint number is 2, the viewpoint selecting unit 221 generates the coordinate of the left-eye viewing position based on the initial position set in advance for viewpoint #2 as the stereoscopic effect correction parameter.

[Another Detailed Configuration Example of Input Viewpoint Selecting Unit]

Figure 45:
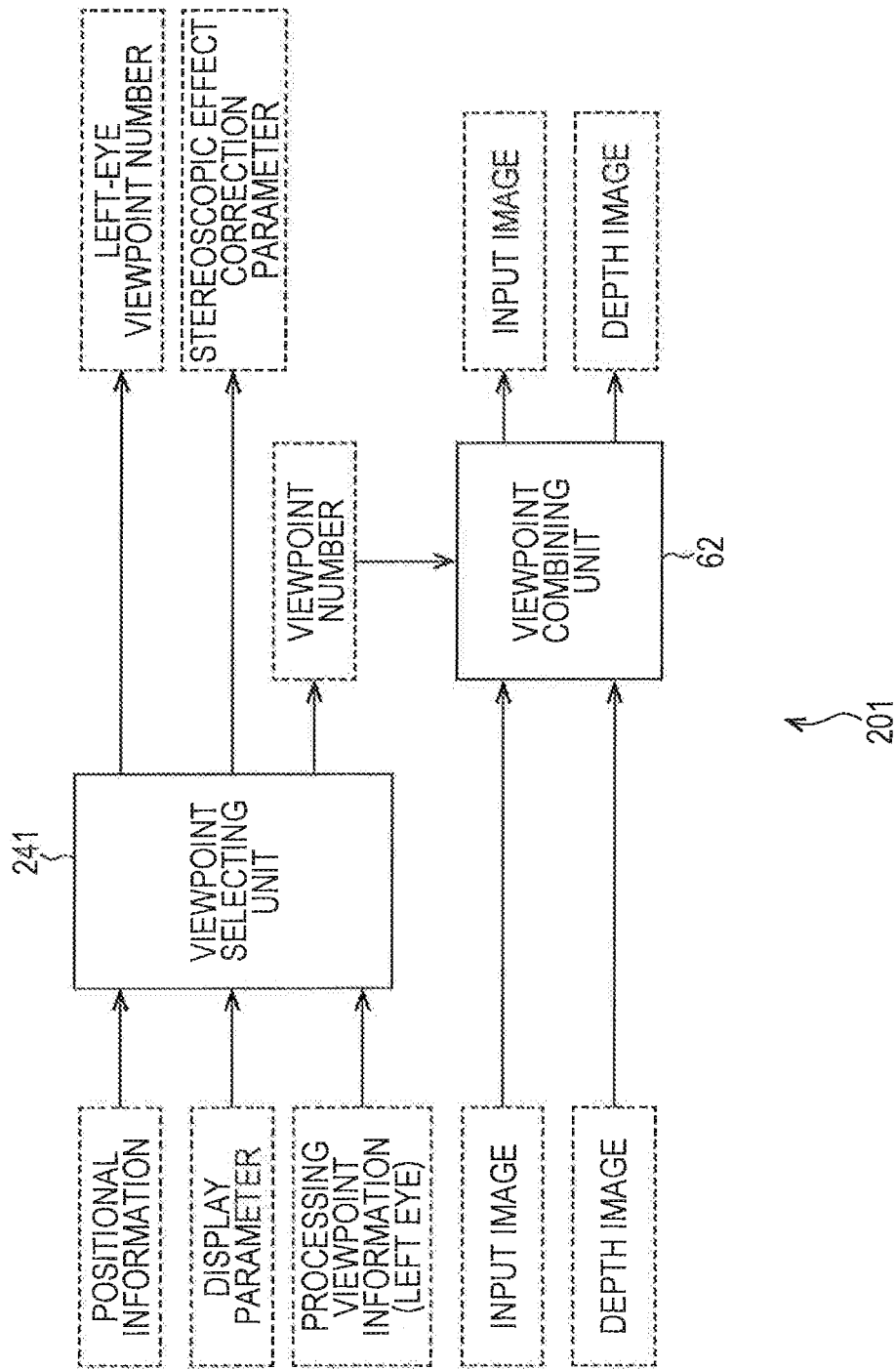
FIG. 45 is a block diagram illustrating another detailed configuration example of the input viewpoint selecting unit in FIG. 40.

FIG. 45 is a block, diagram illustrating another detailed configuration example of the input viewpoint selecting unit 201 in FIG. 40.

The configuration of the input viewpoint selecting unit 201 in FIG. 45 is different from the configuration in FIG. 8 principally in that a viewpoint selecting unit 241 is provided in place of a viewpoint selecting unit 61.

Specifically, the viewpoint selecting unit 241 of the input viewpoint selecting unit 201 obtains the left-eye viewing position based on the viewing position indicated by the positional information from the position detecting unit 11 and the left eye specified by the processing viewpoint information from the target determining unit 101 in the same manner as a viewpoint selecting unit 161 in FIG. 33. Then, the viewpoint selecting unit 241 determines the viewpoint of the multi-view 3D image displayed on the image display unit 183 as the image of which the output image for the left eye is displayed based on the left-eye viewing position and the display parameter supplied from the image display unit 183. Then, the viewpoint selecting unit 241 supplies the viewpoint number of the viewpoint to the image display unit 183 as the left-eye viewpoint number.

The viewpoint selecting unit 241 selects a plurality of viewpoints including one predetermined viewpoint corresponding to the left-eye viewpoint number and the viewpoint adjacent to the one viewpoint, from the viewpoints of the input images based on the left-eye viewpoint number. The viewpoint selecting unit 241 supplies the viewpoint numbers of a plurality of selected viewpoints to a viewpoint combining unit 62. Further, the viewpoint selecting unit 241 generates the stereoscopic effect correction parameter based on the left-eye viewing position and supplies the same to the stereoscopic effect correcting unit 43 in the same manner as the viewpoint selecting unit 221 in FIG. 41.

[Description of Process of Another Input Viewpoint Selecting Unit]

Figure 46:
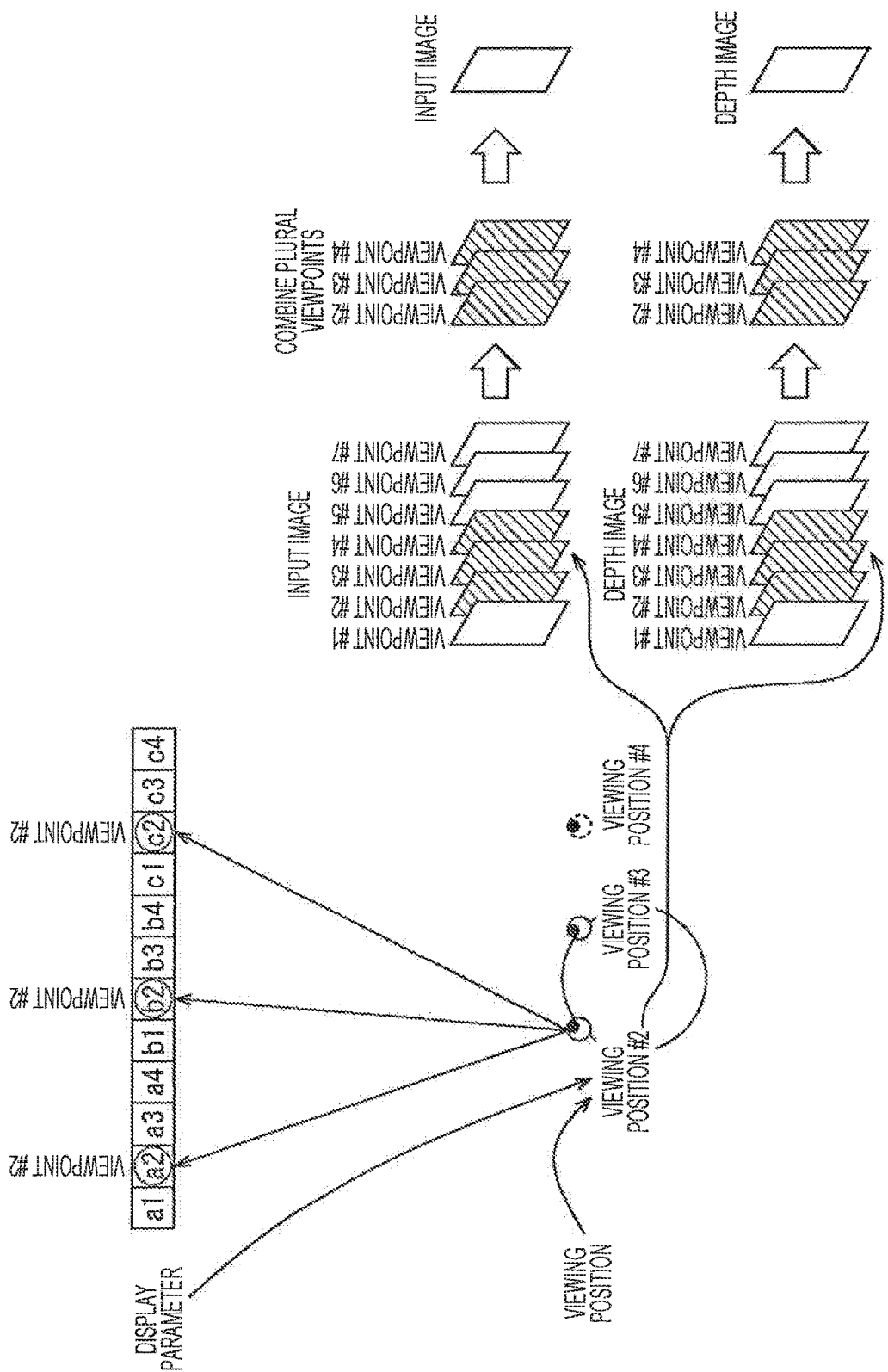
FIG. 46 is a view illustrating the selection of the viewpoint of the input viewpoint selecting unit in FIG. 45.

FIG. 46 is a view illustrating the selection of the viewpoint of the input viewpoint selecting unit 201 in FIG. 45.

Meanwhile, in an example in FIG. 46, there are seven viewpoints of the input images and four viewpoints of the 3D image displayed on the image display unit 183. In FIG. 46, the viewpoint of viewpoint number is referred to as viewpoint #i and the viewing position in which the image of the viewpoint, of viewpoint number i may be viewed out of the viewing positions indicated by the display parameters is referred to as viewing position #i.

The viewpoint selecting unit 241 of the input viewpoint selecting unit 201 first obtains the left-eye viewing position based on the viewing position indicated by the positional information and the left eye specified by the processing viewpoint information as illustrated in FIG. 46. Then, the viewpoint selecting unit 241 determines the viewpoint of the multi-view 3D image displayed on the image display unit 183 as the image of which the output image for the left eye is displayed based on the left-eye viewing position and the display parameter.

In the example in FIG. 46, since the viewpoint corresponding to the 3D image displayed on the image display unit 183, which may be viewed from the left-eye viewing position, is viewpoint #2, the viewpoint selecting unit 241 determines to display the output image for the left eye as the image of viewpoint #2.

Also, the viewpoint selecting unit 241 selects viewpoint #3 corresponding to viewpoint #2 in the image display unit 183 and viewpoints #2 and #4 adjacent to viewpoint #3 from viewpoints #1 to #7 of the input images. Then, the viewpoint selecting unit 241 supplies viewpoint numbers 2 to 4 of viewpoints #2 to #4 to the viewpoint combining unit 62. According to this, the viewpoint combining unit 62 generates the input image and the depth image of one predetermined viewpoint by selecting the input images and the depth images of viewpoints #2 to #4 from the input images and the depth images and combining them.

[Description of Process of Image Processing Unit]

An image process of the image processing unit 181 in FIG. 40 is similar to the image process in FIG. 24 except a viewpoint selecting process, so that only the viewpoint selecting process is described.

Figure 47:
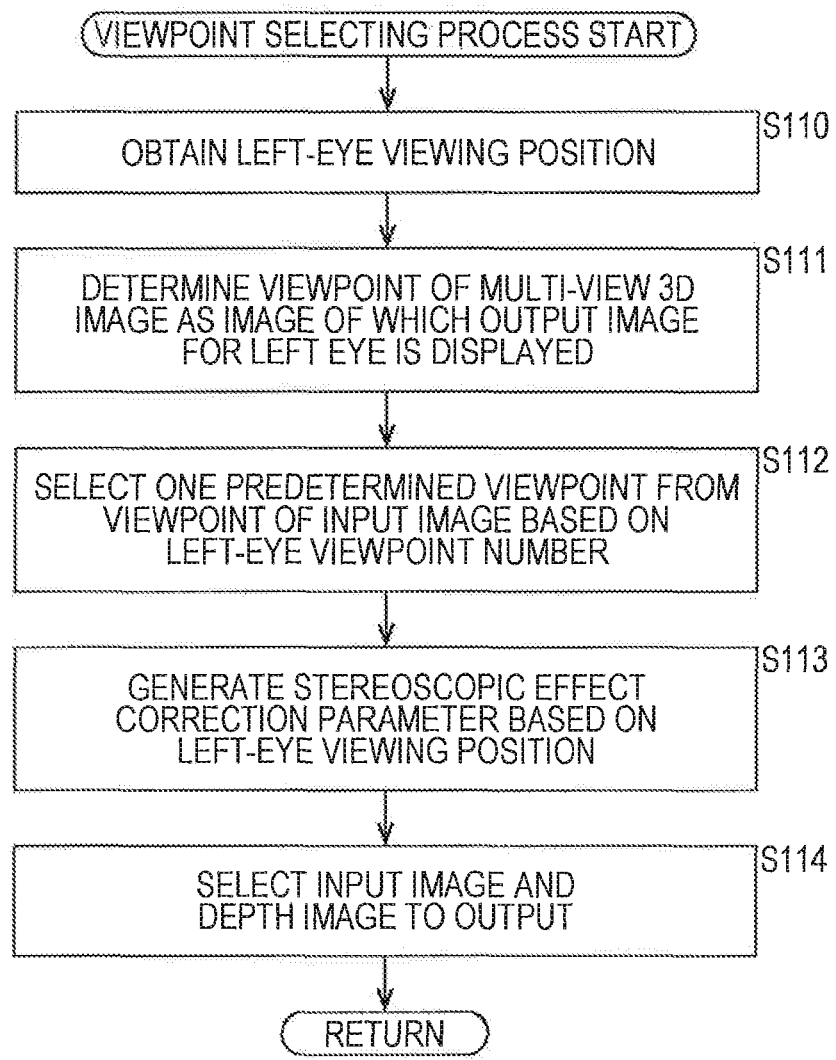
FIG. 47 is a flowchart illustrating a viewpoint selecting process by the input viewpoint selecting unit in FIG. 41 in detail.

FIG. 47 is a flowchart illustrating the viewpoint selecting process by the input viewpoint selecting unit 201 in FIG. 41 in detail.

At S110 in FIG. 47, the viewpoint selecting unit 221 of the input viewpoint selecting unit 201 obtains the left-eye viewing position based on the viewing position indicated by the positional information from the position detecting unit 11 and the left eye specified by the processing viewpoint information from the target determining unit 101.

At step S111, the viewpoint selecting unit 221 determines the viewpoint of the multi-view 3D image displayed on the image display unit. 183 as the image of which the output image for the left eye is displayed based on the left-eye viewing position and the display parameter supplied from the image display unit 183. Then, the viewpoint selecting unit 221 supplies the viewpoint number of the viewpoint to the image display unit 183 as the left-eye viewpoint number.

At step S112, the viewpoint selecting unit 221 selects one predetermined viewpoint corresponding to the left-eye viewpoint number from the viewpoint of the input image based on the left-eye viewpoint number. The viewpoint selecting unit 221 supplies the viewpoint number of the one selected viewpoint to the selector 52.

At step S113, the viewpoint selecting unit 221 generates the coordinate of the left-eye viewing position based on the initial position set in advance for the viewpoint of the left-eye viewpoint number as the stereoscopic effect correction parameter based on the left-eye viewing position and supplies the same to the stereoscopic effect correcting unit 43.

A process at step S114 is similar to the process at step S73 in FIG. 34, so that description thereof is omitted.

Figure 48:
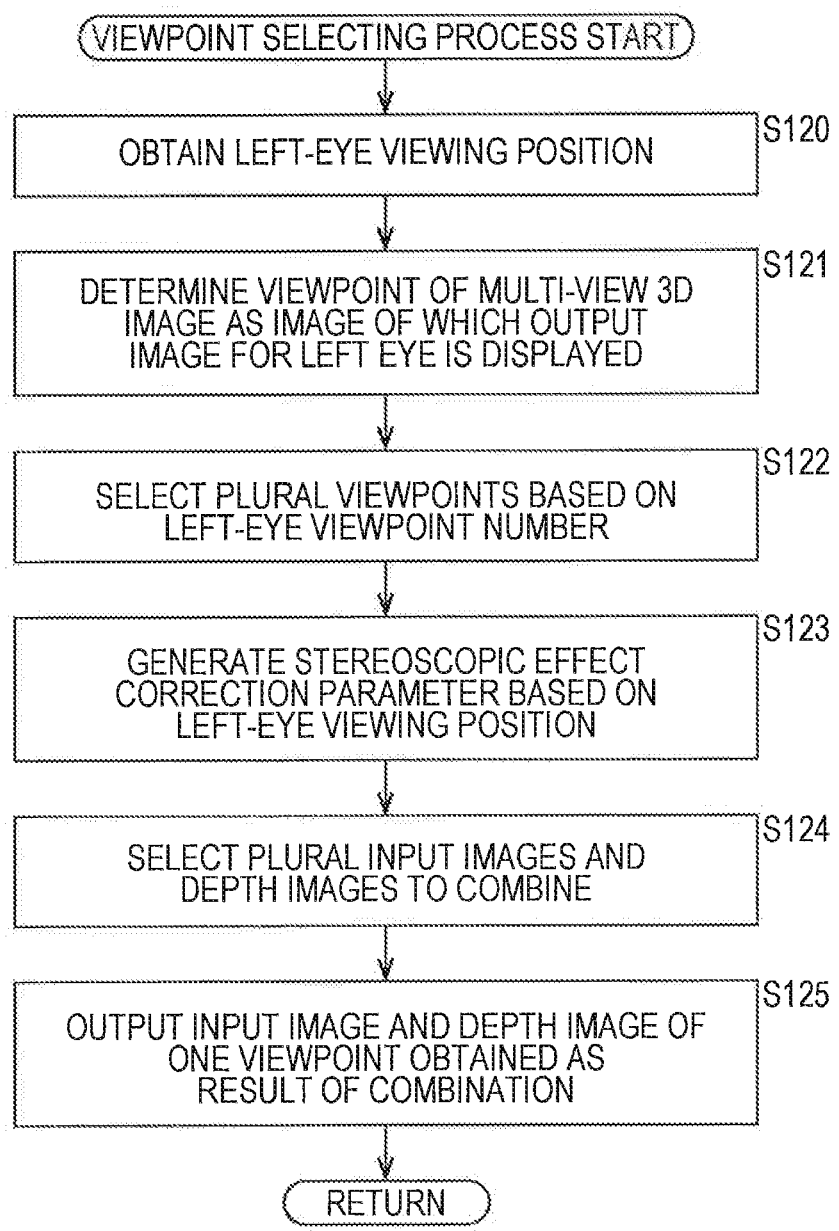
FIG. 48 is a flowchart illustrating the viewpoint selecting process by the input, viewpoint selecting unit in FIG. 45 in detail.

FIG. 48 is a flowchart illustrating the viewpoint selecting process by the input viewpoint selecting unit 201 in FIG. 45 in detail.

At S120 in FIG. 48, the viewpoint selecting unit 241 of the input viewpoint selecting unit 201 obtains the left-eye viewing position based on the viewing position indicated by the positional information from the position detecting unit 11 and the left eye specified by the processing viewpoint information from the target determining unit 101.

At step S121, the viewpoint selecting unit 241 determines the viewpoint of the multi-view 3D image displayed on the image display unit 183 as the image of which the output image for the left eye is displayed based on the left-eye viewing position and the display parameter supplied from the image display unit 183. Then, the viewpoint selecting unit 241 supplies the viewpoint number of the viewpoint to the image display unit 183 as the left-eye viewpoint number.

At step S122, the viewpoint selecting unit 241 selects a plurality of viewpoints including one predetermined viewpoint corresponding to the left-eye viewpoint number and the viewpoint adjacent to the one viewpoint from the viewpoints of the input images based on the left-eye viewpoint number. Then, the viewpoint selecting unit 241 supplies the viewpoint numbers of a plurality of selected viewpoints to the viewpoint combining unit 62.

At step S123, the viewpoint selecting unit 241 generates the coordinate of the left-eye viewing position based on the initial position set in advance for the viewpoint, of the left-eye viewpoint number as the stereoscopic effect correction parameter based on the left-eye viewing position and supplies the same to the stereoscopic effect correcting unit 43.

Processes at steps S124 and S125 are similar to the processes at steps S93 and S94 in FIG. 35, so that description thereof is omitted.

As described above, the image processing device 180 corrects the depth image based on the viewing position, so that this may realize motion parallax closely related to that of the real world in the image display unit 183, which is the 3D display to display the multi-view 3D image. As a result, the viewer may realize highly accurate stereoscopic viewing.

The image processing device 180 generates only the output images of the two viewpoints, which may be viewed in the left-eye viewing position and a right-eye viewing position, so that a reduced processing load as compared to that in a case in which the output images of the multiple viewpoints, which may be displayed on the image display unit 183, are generated may be realized.

Fourth Embodiment

[Configuration Example of Fourth Embodiment of Image Processing Device]

Figure 49:
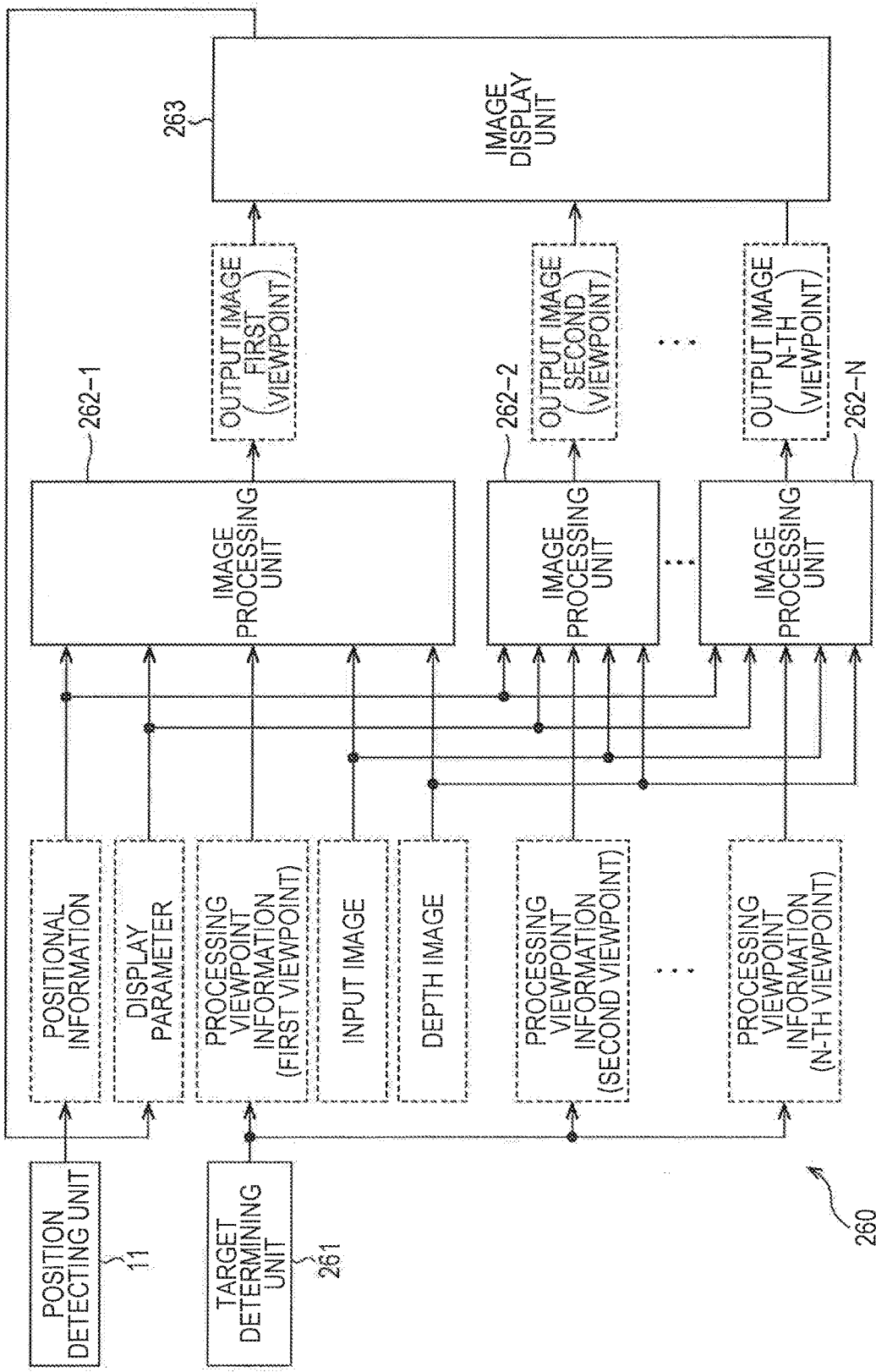
FIG. 49 is a block diagram illustrating a configuration example of a fourth embodiment of an image processing device to which this technology is applied.

FIG. 49 is a block diagram illustrating a configuration example of a fourth embodiment of an image processing device to which this technology is applied.

In the configuration illustrated in FIG. 49, the same reference sign is assigned to the same configuration as the configuration in FIG. 38. Overlapping description is appropriately omitted.

A configuration of an image processing device 260 in FIG. 49 is different, from the configuration in FIG. 38 principally in that a target determining unit 261 is provided in place of a target determining unit 101, image processing units 262-1 to 262-N (N is an integer not smaller than 3) are provided in place of image processing units 181 and 182, and an image display unit 263 is provided in place of an image display unit 183. The image processing device 260 displays output images of N viewpoints as an N-view 3D image to be displayed based on an input image and a depth image of one or more viewpoints and positional information.

Specifically, the target determining unit 261 of the image processing device 260 supplies processing viewpoint information to specify each of the N viewpoints as the viewpoint corresponding to a generation target by the image processing units 262-1 to 262-N to the image processing units 262-1 to 262-N.

A color image of one or more viewpoints is externally input as the input image and the depth image of one or more viewpoints corresponding to the input image is externally input to each of the image processing units 262-1 to 262-N in the same manner as the image processing unit 181 in FIG. 38. Each of the image processing units 262-1 to 262-N corrects the input image and the depth image, which are externally input, based on the positional information from a position detecting unit 11, processing viewpoint information from the target determining unit 261, and a display parameter from the image display unit 263. Then, each of the image processing units 262-1 to 262-N generates the color image of one predetermined viewpoint using the corrected input image and depth image and supplies the same to the image display unit 263 as the output image of the viewpoint specified by the processing viewpoint information.

Meanwhile, hereinafter, when it is not especially required to distinguish the image processing units 262-1 to 262-N from one another, they are collectively referred to as the image processing units 262.

The image display unit 263 is composed of a 3D display, which displays a multi-view 3D image. The image display unit 263 generates the N-view 3D image from the output images of the N viewpoints supplied from the image processing units 262. For example, the image display unit 263 generates the N-view 3D image in which the output images supplied from the image processing units 262 are sequentially made the images of first to N-th viewpoints.

Then, the image display unit 263 displays the generated N-view 3D image in different directions for each viewpoint. According to this, a viewer may view the 3D image formed of the images of the two viewpoints out of the N viewpoints without wearing glasses for 3D viewing.

Figure 50:
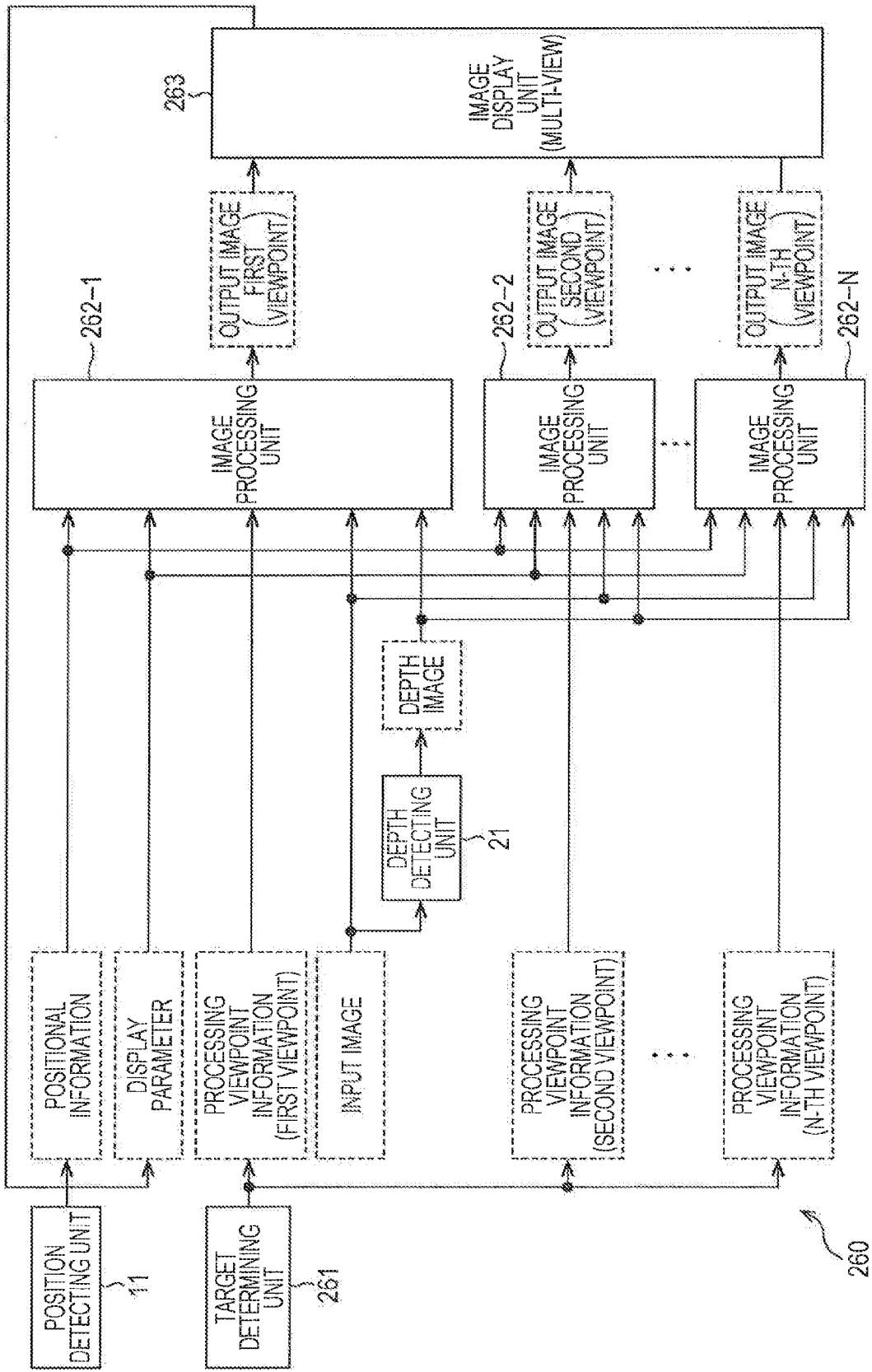
FIG. 50 is a block diagram illustrating another configuration example of the fourth embodiment of the image processing device to which this technology is applied.

Meanwhile, although the depth image of one or more viewpoints corresponding to the input image is input in the image processing device 260 in FIG. 49, this may also be generated from the input image. In this case, the image processing device 160 is provided with a depth detecting unit 21 in FIG. 4 as illustrated in FIG. 50. Although not illustrated, it is also possible that the image processing device 260 in FIG. 49 generates new output images of the N viewpoints using a common depth image for each two predetermined viewpoints and generate the N-view 3D image from the output images of the N viewpoints in the same manner as the image processing device 100 in FIG. 36.

When there is a plurality of viewers, the image processing device 260 may divide the N viewpoints by the number of viewers and assign the same to each viewer, generate the output images of the assigned viewpoints for each viewer, and display the N-view 3D image formed of the output images of all the viewers. In this case, the 3D image of the viewpoint other than that of the two viewpoints viewed by each viewer is also displayed for each viewer, so that the viewer is less likely to feel fatigued even when crosstalk occurs between the images of adjacent viewpoints.

[Detailed Configuration Example of Image Processing Unit]

Figure 51:
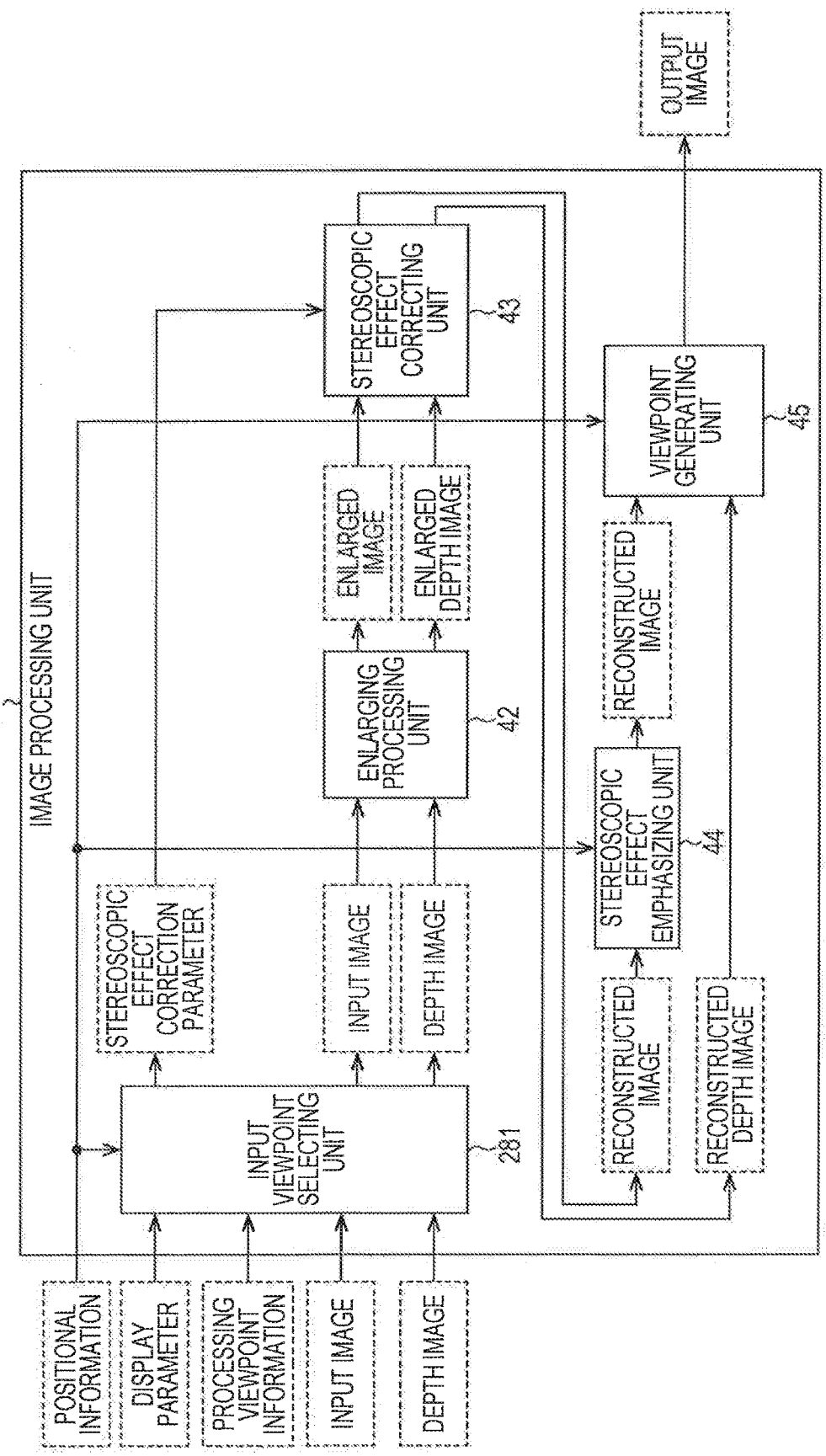
FIG. 51 is a block diagram illustrating a detailed configuration example of an image processing unit in FIG. 49.

FIG. 51 is a block diagram illustrating a detailed configuration example of the image processing unit 262 in FIG. 49.

In the configuration illustrated in FIG. 51, the same reference sign is assigned to the same configuration as the configuration in FIG. 5. Overlapping description is appropriately omitted.

The configuration of the image processing unit 262 in FIG. 51 is different from the configuration in FIG. 5 principally in that an input viewpoint selecting unit 281 is provided in place of an input viewpoint selecting unit 41.

Specifically, the input viewpoint selecting unit 281 of the image processing unit 262 selects a predetermined viewpoint from the viewpoint of the input image, which is externally input, based on the processing viewpoint information from the target determining unit 261. Then, the input, viewpoint selecting unit 281 generates the input image and the depth image of one predetermined viewpoint using the input image of the selected predetermined viewpoint and the corresponding depth image and supplies the same to an enlarging processing unit 42 in the same manner as the input viewpoint selecting unit 41 in FIG. 5

The input viewpoint selecting unit 281 also detects the viewpoint corresponding to the 3D image, which may be viewed from the viewing position, of the multi-view 3D image displayed on the image display unit 263 based on the viewing position indicated by the positional information from the position detecting unit 11 and the display parameter from the image display unit 263. Then, the input viewpoint selecting unit 281 generates a stereoscopic effect correction parameter based on the detected viewpoint, the viewing position, and the processing viewpoint information from the target determining unit 261 and supplies the same to a stereoscopic effect correcting unit 43.

Meanwhile, although not illustrated, it is also possible that the image processing unit 262 in FIG. 51 is provided with the stereoscopic effect correcting unit 43 on a subsequent stage of a stereoscopic effect emphasizing unit 44.

[Detailed Configuration Example of Input Viewpoint Selecting Unit]

Figure 52:
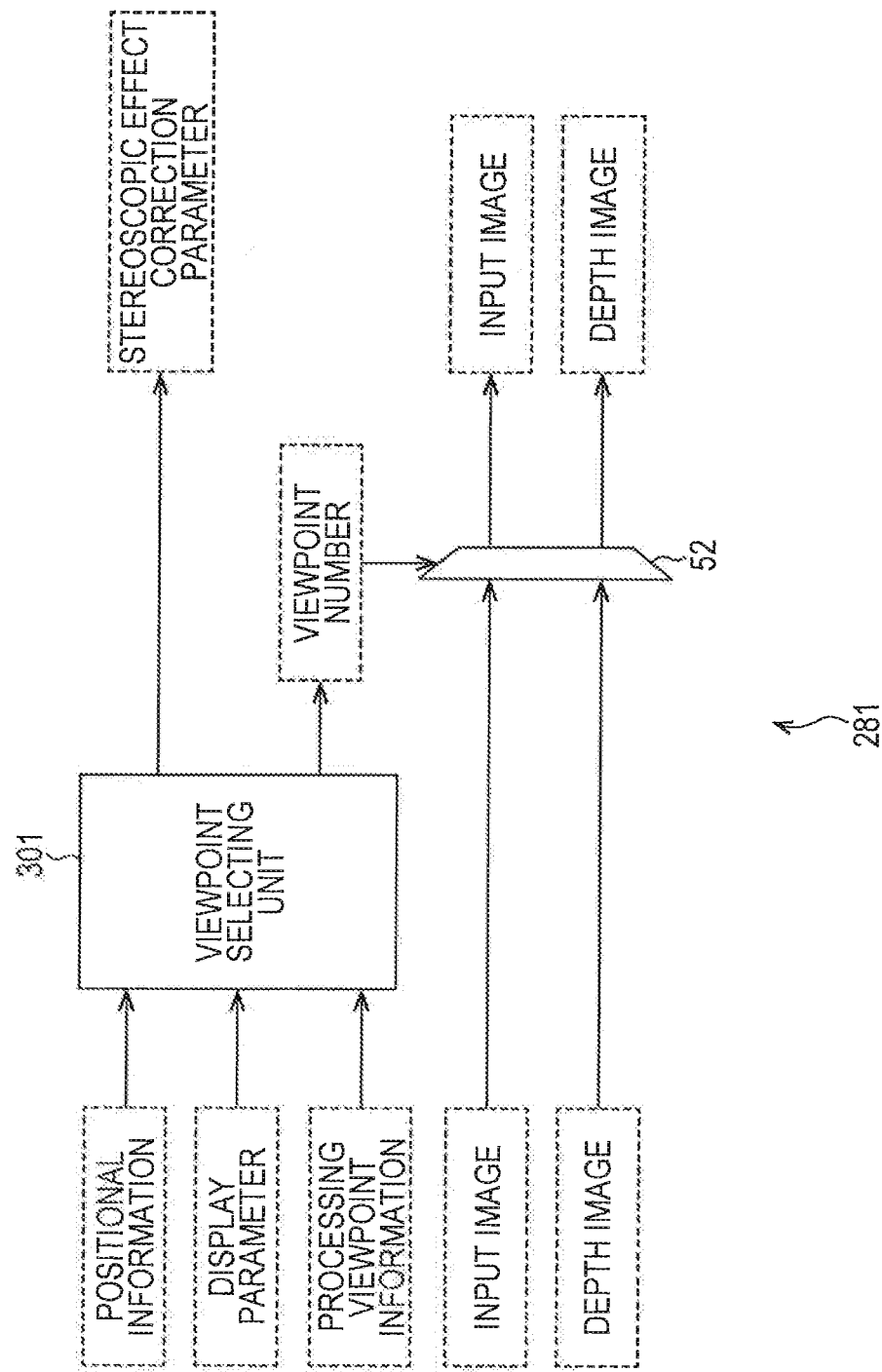
FIG. 52 is a block diagram illustrating a detailed configuration example of an input viewpoint selecting unit in FIG. 51.

FIG. 52 is a block diagram illustrating a detailed configuration example of the input viewpoint selecting unit 281 in FIG. 51.

In the configuration illustrated in FIG. 52, the same reference sign is assigned to the same configuration as the configuration in FIG. 7. Overlapping description is appropriately omitted.

The configuration of the input, viewpoint selecting unit 281 in FIG. 52 is different from the configuration in FIG. 7 principally in that a viewpoint selecting unit 301 is provided in place of a viewpoint selecting unit 51.

Specifically, the viewpoint selecting unit 301 of the input viewpoint, selecting unit 281 selects one predetermined viewpoint corresponding to the viewpoint specified by the processing viewpoint information from the viewpoint of the input image based on the processing viewpoint information from the target determining unit 261. Then, the viewpoint selecting unit 301 supplies the viewpoint number of the one selected viewpoint to a selector 52.

The viewpoint selecting unit 301 also detects the viewpoint corresponding to the 3D image, which may be viewed from the viewing position, of the multi-view 3D image displayed on the image display unit 263 based on the viewing position indicated by the positional information from the position detecting unit 11 and the display parameter from the image display unit 263. Then, the viewpoint selecting unit 301 generates a coordinate of a position corresponding to the viewpoint specified by the processing viewpoint information based on an initial position set in advance for the viewpoint as the stereoscopic effect correction parameter based on the detected viewpoint, the viewing position, and the processing viewpoint information. Then, the viewpoint selecting unit 301 supplies the stereoscopic effect correction parameter to the stereoscopic effect correcting unit 43.

[Description of Process of Input Viewpoint Selecting Unit]

Figure 53:
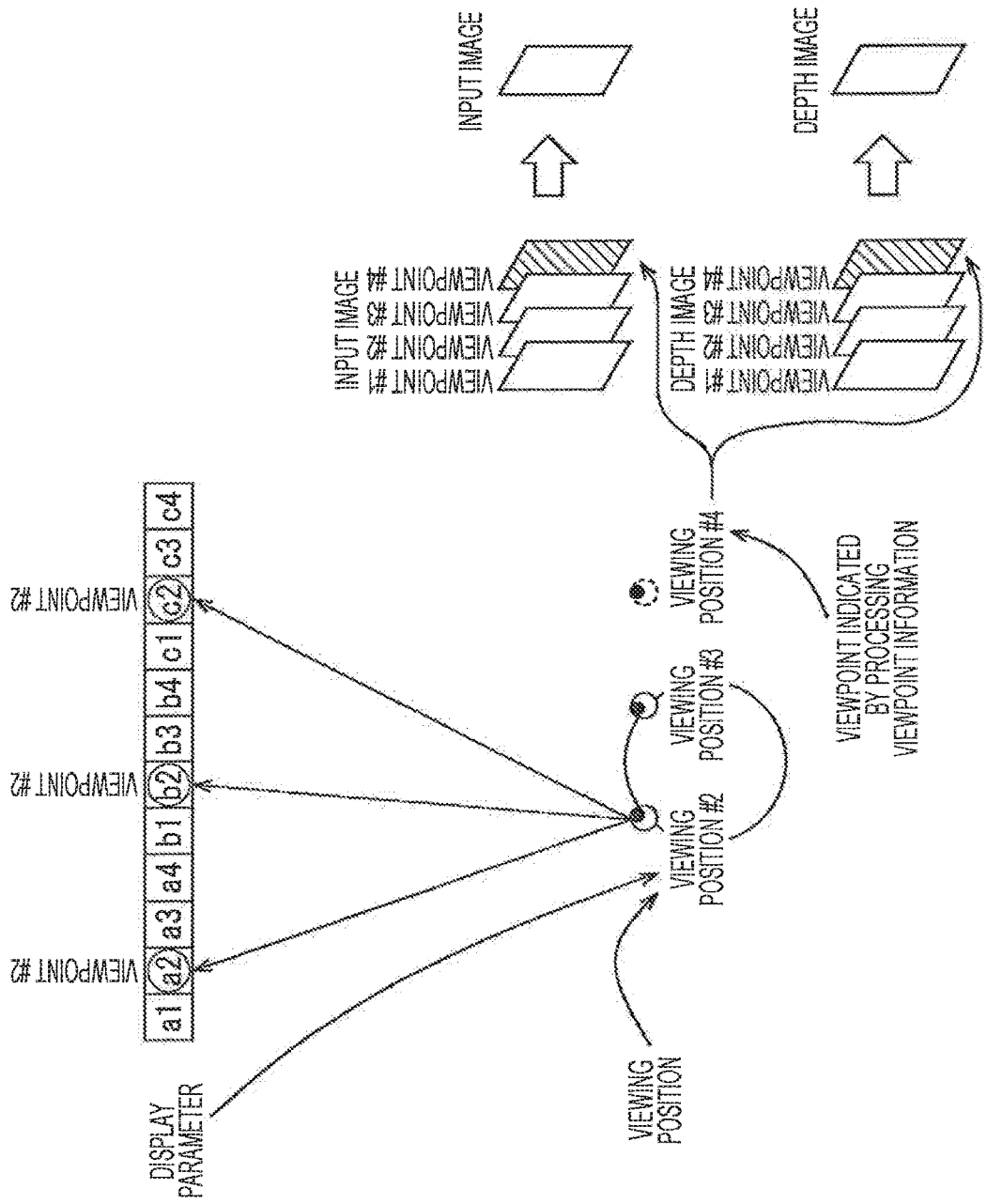
FIG. 53 is a view illustrating selection of a viewpoint of the input viewpoint selecting unit in FIG. 52.
Figure 54:
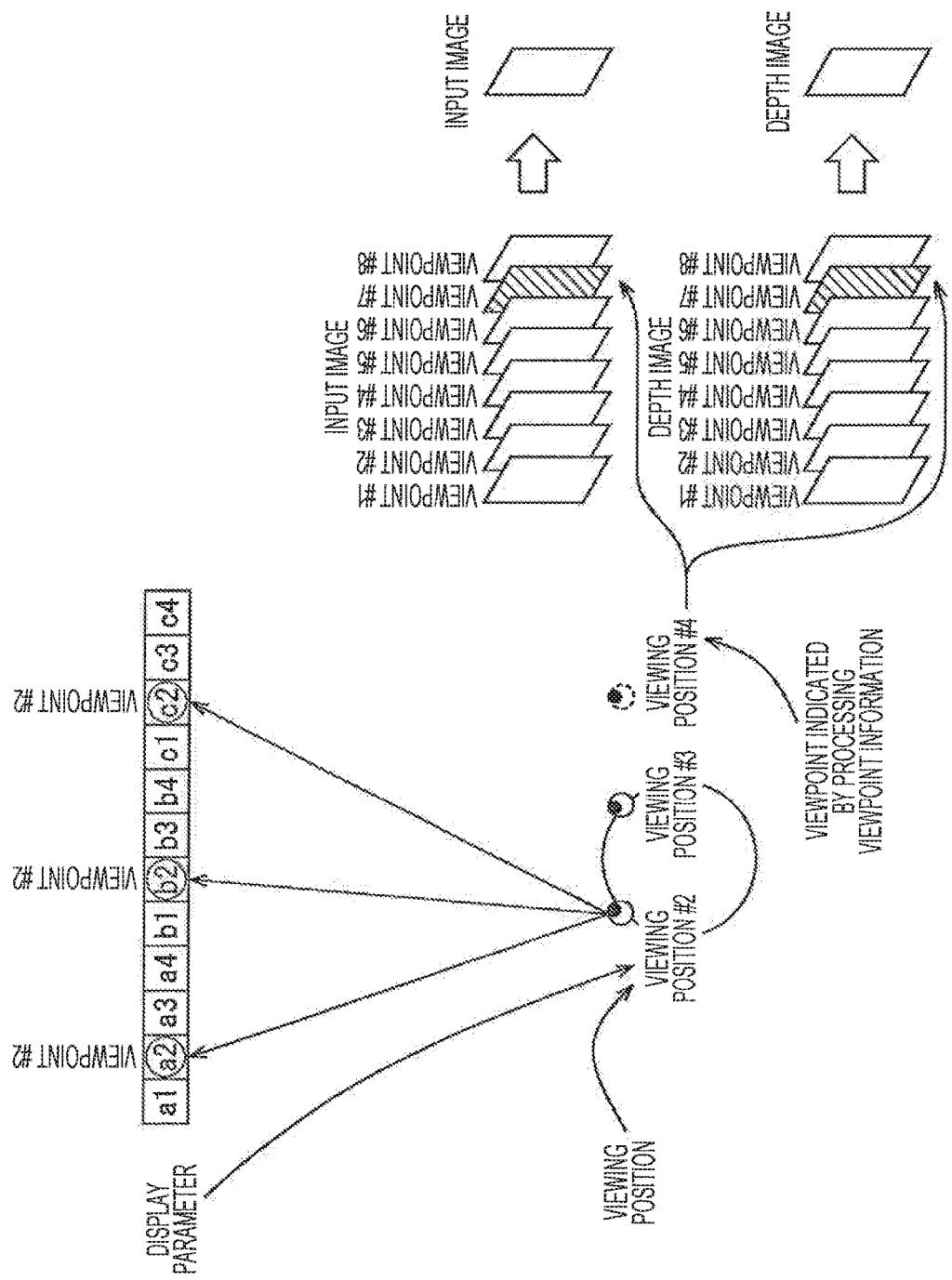
FIG. 54 is a view illustrating the selection of the viewpoint of the input viewpoint selecting unit in FIG. 52.

FIGS. 53 and 54 are views illustrating selection of the viewpoint by the input viewpoint selecting unit 281 in FIG. 52.

FIG. 53 is the view illustrating a process of the viewpoint selecting unit 301 in a case in which the number of viewpoints of the input images and that of the 3D image displayed on the image display unit 263 are the same.

Meanwhile, in an example in FIG. 53, there are four viewpoints of the input images and the 3D image displayed on the image display unit 263. In FIGS. 53 and 54, a viewpoint of viewpoint number i is referred to as viewpoint ii and a viewing position in which the image of the viewpoint of viewpoint number i may be viewed out of the viewing positions indicated by the display parameters is referred to as viewing position #i.

As illustrated in FIG. 53, the viewpoint selecting unit 301 of the input viewpoint selecting unit 281 selects one predetermined viewpoint corresponding to the viewpoint specified by the processing viewpoint information from the viewpoints of the input images based on the processing viewpoint information from the target determining unit 261 and supplies the viewpoint number of the one viewpoint to the selector 52. In the example in FIG. 53, since the number of viewpoints of the input images and that of the 3D image displayed on the image display unit 263 are the same, the viewpoint selecting unit 301 selects same viewpoint #4 from viewpoints #1 to #4 of the input images as the viewpoint corresponding to viewpoint #4 specified by the processing viewpoint information. Then, the viewpoint selecting unit 301 supplies viewpoint number 4 of viewpoint #4 to the selector 52. According to this, the selector 52 selects the input image and the depth image of viewpoint #4 from the input images and the depth images.

FIG. 54 is the view illustrating the process of the viewpoint selecting unit 301 in a case in which the number of viewpoints of the input images and that of the 3D image displayed on the image display unit 263 are different from each other.

Meanwhile, in an example in FIG. 54, there are eight viewpoints of the input images and four viewpoints of the 3D image displayed on the image display unit 263.

As illustrated in FIG. 54, the viewpoint selecting unit 301 selects one predetermined viewpoint corresponding to the viewpoint specified by the processing viewpoint information from the viewpoints of the input images based on the processing viewpoint information from the target determining unit 261 and supplies the viewpoint number of the one viewpoint to the selector 52. In the example in FIG. 54, since the number of viewpoints of the input images and that of the 3D image displayed on the image display unit 263 are different from each other, the viewpoint selecting unit 301 selects viewpoint #7, for example, from viewpoints #1 to #8 of the input images as the viewpoint corresponding to viewpoint #4 specified by the processing viewpoint information. Then, the viewpoint-selecting unit 301 supplies viewpoint number 7 of viewpoint #7 to the selector 52. According to this, the selector 52 selects the input, image and the depth image of viewpoint #7 from the input images and the depth images.

Figure 55:
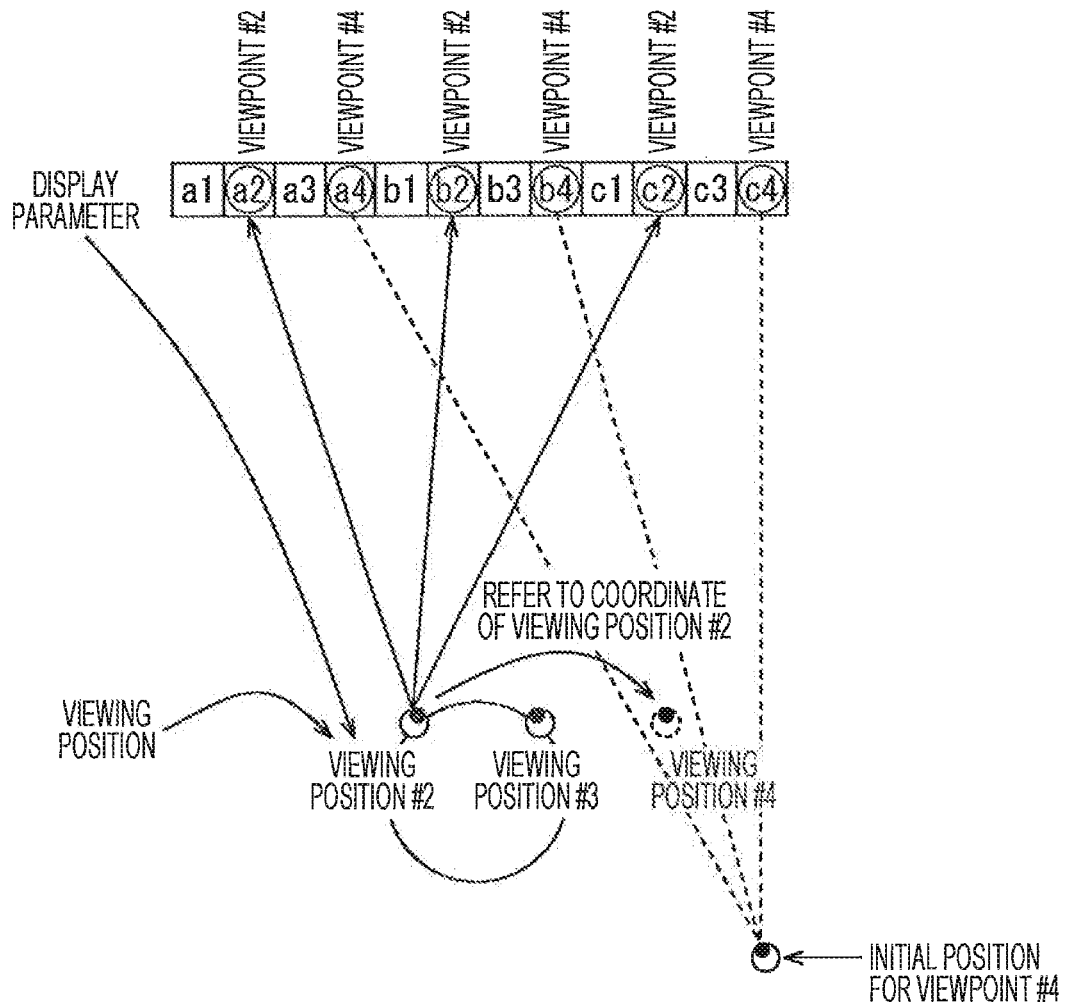
FIG. 55 is a view illustrating generation of a stereoscopic effect correction parameter of a viewpoint selecting unit in FIG. 52.

FIG. 55 is a view illustrating generation of the stereoscopic effect correction parameter of the viewpoint selecting unit 301 in FIG. 52.

In an example in FIG. 55, there are four viewpoints of the input, images and the 3D image displayed on the image display unit 263. In FIG. 55, the viewpoint of viewpoint number i is referred to as viewpoint #1 and the viewing position in which the image of the viewpoint of viewpoint number i may be viewed out of the viewing positions indicated by the display parameters is referred to as viewing position #i.

As illustrated in FIG. 55, the viewpoint selecting unit 301 first detects the viewpoint corresponding to the 3D image, which may be viewed from the viewing position, of the multi-view 3D image displayed on the image display unit 263 based on the viewing position indicated by the positional information from the position detecting unit 11 and the display parameter from the image display unit 263. In the example in FIG. 55, viewpoint #2 is detected as the viewpoint corresponding to the 3D image displayed on the image display unit 263, which may be viewed from the viewing position.

Then, the viewpoint selecting unit 301 makes a position in the same position in a depth direction as viewing position #2 corresponding to viewpoint #2 and in the position in a horizontal direction in which viewpoint #4 may be viewed, for example, the position corresponding to viewpoint #4 based on detected viewpoint 42, the viewing position, and viewpoint #4 specified by the processing viewpoint information. The viewpoint selecting unit 301 generates the coordinate based on the initial position set in advance for viewpoint #4 of the position corresponding to viewpoint #4 as the stereoscopic effect correction parameter.

[Another Detailed Configuration Example of Input Viewpoint Selecting Unit]

Figure 56:
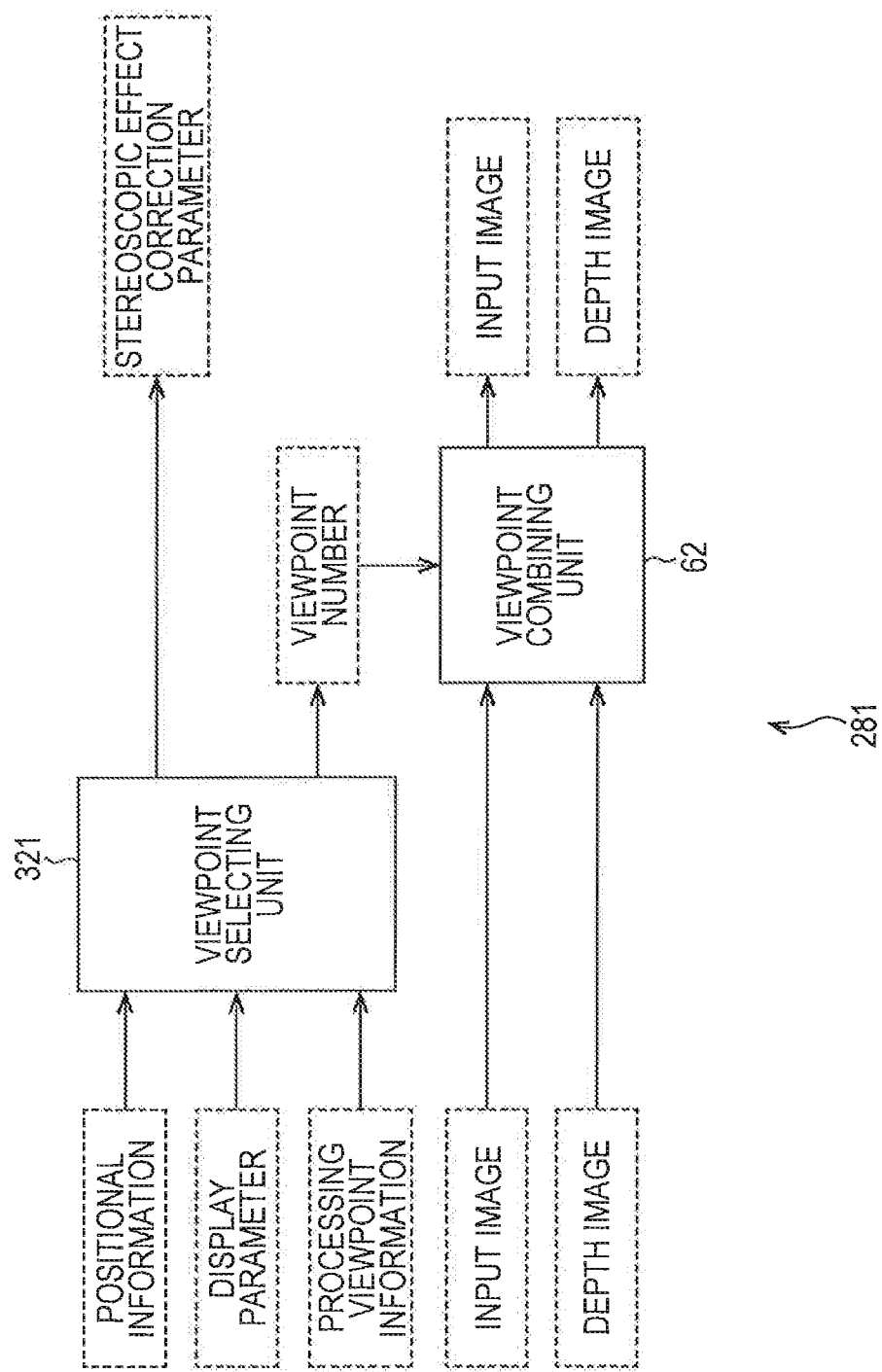
FIG. 56 is a block diagram illustrating another detailed configuration example of the input viewpoint selecting unit in FIG. 51.

FIG. 56 is a block diagram illustrating another detailed configuration example of the input viewpoint selecting unit 281 in FIG. 51.

The configuration of the input viewpoint selecting unit 281 in FIG. 56 is different from the configuration in FIG. 8 principally in that a viewpoint selecting unit 321 is provided in place of a viewpoint selecting unit 61.

Specifically, the viewpoint selecting unit 321 of the input, viewpoint selecting unit 281 selects a plurality of viewpoints including one predetermined viewpoint corresponding to the viewpoint specified by the processing viewpoint, information and the viewpoint adjacent to the one viewpoint from the viewpoints of the input image based on the processing viewpoint information from the target determining unit 261. Then, the viewpoint selecting unit 301 supplies the viewpoint numbers of a plurality of selected viewpoints to the viewpoint combining unit 62.

Also, the viewpoint selecting unit 321 detects the viewpoint corresponding to the 3D image, which may be viewed from the viewing position, of the multi-view 3D image displayed on the image display unit 263 based on the viewing position indicated by the positional information from the position detecting unit 11 and the display parameter from the image display unit 263 in the same manner as the viewpoint selecting unit 301 in FIG. 52. Then, the viewpoint selecting unit 321 generates the stereoscopic effect correction parameter based on the detected viewpoint, the viewing position, and the processing viewpoint information and supplies the same to the stereoscopic effect correcting unit 43 in the same manner as the viewpoint selecting unit 301.

[Description of Process of Another Input Viewpoint Selecting Unit]

Figure 57:
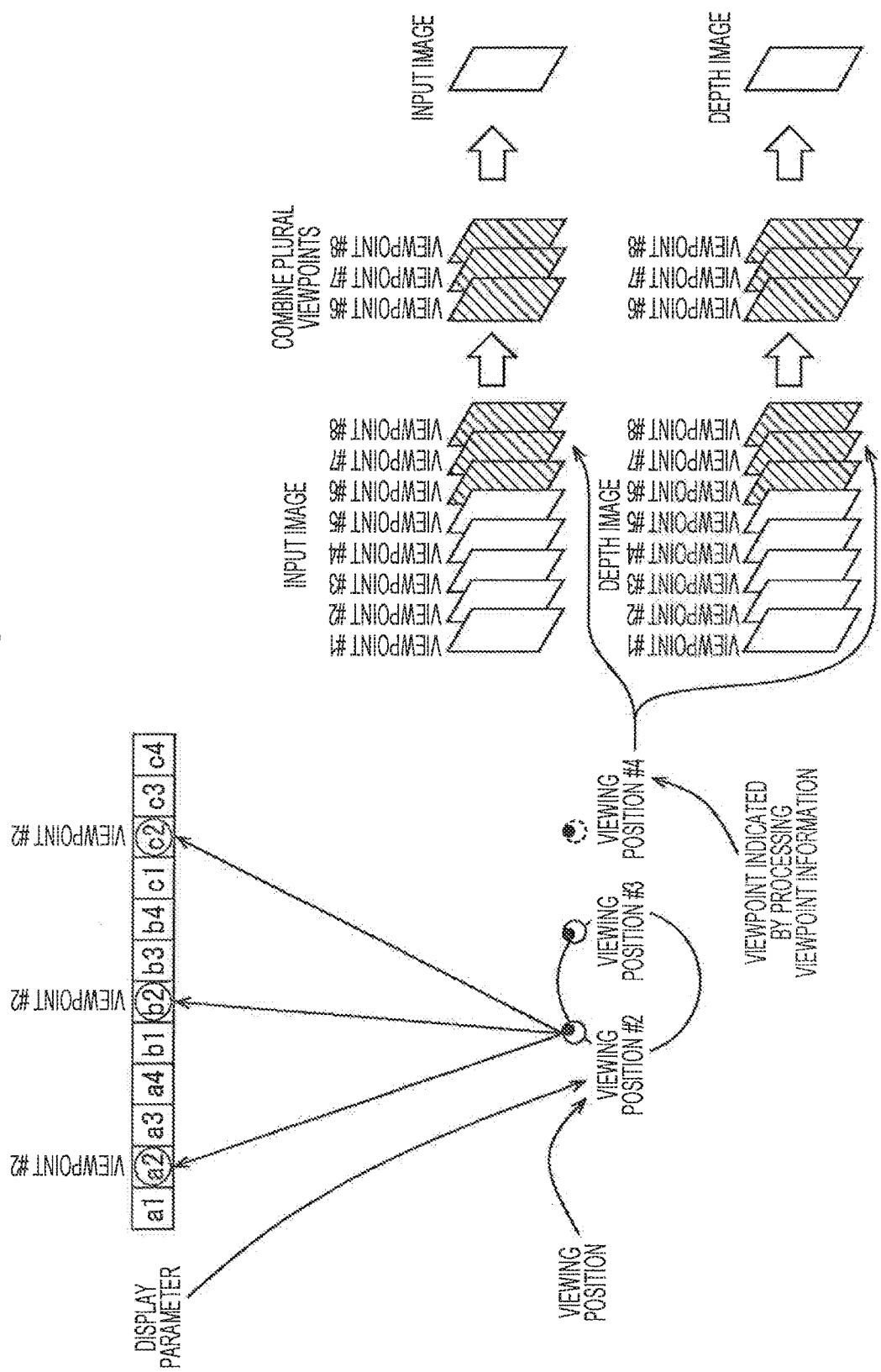
FIG. 57 is a view illustrating selection of a viewpoint of the input viewpoint selecting unit in FIG. 56.

FIG. 57 is a view illustrating the selection of the viewpoint of the input viewpoint selecting unit 281 in FIG. 56.

Meanwhile, in an example in FIG. 57, there are eight viewpoints of the input images and four viewpoints of the 3D image displayed on the image display unit 263. In FIG. 57, the viewpoint of viewpoint number i is referred to as viewpoint #i and the viewing position in which the image of the viewpoint of viewpoint number i may be viewed out of the viewing positions indicated by the display parameters is referred to as viewing position #i.

As illustrated in FIG. 57, the viewpoint selecting unit 321 of the input viewpoint selecting unit 281 selects a plurality of viewpoints including one predetermined viewpoint corresponding to the viewpoint specified by the processing viewpoint information and the viewpoint adjacent to the one viewpoints from the viewpoints of the input images based on the processing viewpoint information from the target determining unit 261.

In the example in FIG. 57, since the number of viewpoints of the input images and that of the 3D image displayed on the image display unit 263 are different from each other, the viewpoint selecting unit 321 selects viewpoint #7, for example, from viewpoints #1 to #8 of the input images as the viewpoint corresponding to viewpoint #4 specified by the processing viewpoint information. The viewpoint selecting unit 321 also selects viewpoints #6 and #8 adjacent to viewpoint #7. Then, the viewpoint, selecting unit 321 supplies viewpoint numbers 6 to 8 of viewpoints #6 to #8 to the viewpoint combining unit 62. According to this, the viewpoint combining unit 62 generates the input image and the depth image of one predetermined viewpoint by selecting the input images and the depth images of viewpoints #6 to #6 from the input images and the depth images and combining them.

[Description of Process of Image Processing Unit]

An image process of the image processing unit 262 in FIG. 51 is similar to the image process in FIG. 24 except a viewpoint selecting process, so that only the viewpoint selecting process is described.

Figure 58:
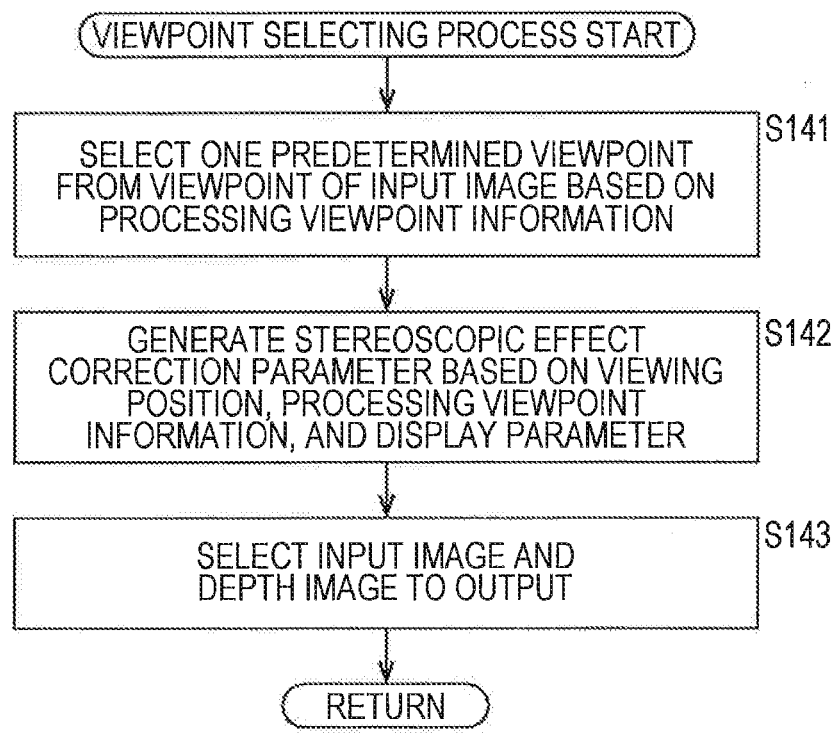
FIG. 58 is a flowchart illustrating a viewpoint selecting process by the input viewpoint selecting unit in FIG. 52 in detail.

FIG. 58 is a flowchart illustrating the viewpoint selecting process by the input viewpoint selecting unit 281 in FIG. 52 in detail.

At S141 in FIG. 58, the viewpoint selecting unit 301 of the input viewpoint selecting unit 281 selects one predetermined viewpoint corresponding to the viewpoint specified by the processing viewpoint information from the viewpoint of the input image based on the processing viewpoint information from the target determining unit 261. Then, the viewpoint selecting unit 301 supplies the viewpoint number of the one selected viewpoint to the selector 52.

At step S142, the viewpoint selecting unit 301 generates the stereoscopic effect correction parameter based on the viewing position indicated by the positional information from the position detecting unit 11, the processing viewpoint information, and the display parameter from the image display unit 263. Then, the viewpoint selecting unit 301 supplies the stereoscopic effect correction parameter to the stereoscopic effect correcting unit 43.

A process at step S143 is similar to the process at step S73 in FIG. 34, so that description thereof is omitted.

FIG. 59 is a flowchart illustrating the viewpoint selecting process by the input viewpoint selecting unit 281 in FIG. 56 in detail.

At S161 in FIG. 59, the viewpoint selecting unit 321 of the input viewpoint selecting unit 281 selects a plurality of viewpoints including one predetermined viewpoint corresponding to the viewpoint specified by the processing viewpoint information and the viewpoint adjacent to the one viewpoint, from the viewpoints of the input, images based on the processing viewpoint information from the target determining unit 261. Then, the viewpoint selecting unit 301 supplies the viewpoint numbers of a plurality of selected viewpoints to the viewpoint combining unit 62.

At step S162, the viewpoint selecting unit 321 generates the stereoscopic effect correction parameter based on the viewing position indicated by the positional information from the position detecting unit 11, the processing viewpoint information, and the display parameter from the image display unit 263 and supplies the same to the stereoscopic effect correcting unit 43.

Processes at steps S163 and S164 are similar to the processes at steps S93 and S94 in FIG. 35, so that description thereof is omitted.

As described above, the image processing device 260 corrects the depth image based on the viewing position, so that this may realize motion parallax closely related to that of the real world in the image display unit 263, which is the 3D display to display the multi-view 3D image. As a result, the viewer may realize highly-accurate stereoscopic viewing.

Meanwhile, when the above-described image processing device 10 (100, 180, 260) is a portable device, the position detecting unit 11 may detect a position, inclination and the like of the image processing device 10 (100, 180, 260) in place of the position of the viewer. In this case, the viewing position is obtained based on the position and the inclination of the image processing device 10 (100, 180, 260), It is also possible that a size, display resolution and the like of the image processing device 10 (100, 180, 260) also are externally input.

It is also possible that the image processing device 100 (180, 260) also outputs the depth image corresponding to the output image in the same manner as the image processing device 10.

Further, although a motion parallax process and an aerial perspective process are performed based on the positional information, they may be performed based on feeling of fatigue and an emotion of the viewer.

[Description of Computer to which this Technology is Applied]

A series of processes described above may be performed by hardware or by software. When a series of processes is performed by the software, a program, which composes the software, is installed on a multi-purpose computer and the like.

FIG. 60 illustrates a configuration example of one embodiment of the computer on which the program, which executes a series of processes described above, is installed.

The program may be recorded in advance in a storage unit 508 and a ROM (Read Only Memory) 502 as a recording medium embedded in the computer.

Alternatively, the program may be stored in (recorded on) a removable medium 511. Such removable medium 511 may be provided as so-called packaged software. Herein, the removable medium 511 includes a flexible disk, a CD-ROM (compact disc read only memory), an MO (magneto optical) disk, a DVD (digital versatile disc), a magnetic disk, a semiconductor memory and the like, for example.

Meanwhile, the program may be installed on the computer from the above-described removable medium 511 through a drive 510 or may be downloaded to the computer through a communication network and, a broadcast network to be installed on the embedded storage unit 508. That is to say, the program may be wirelessly transmitted from a downloading site to the computer through a satellite for digital satellite broadcasting or may be transmitted by wire to the computer through a network such as a LAN (local area network) and the Internet, for example.

A CPU (central processing unit) 501 is embedded in the computer and an input/output interface 505 is connected to the CPU 501 through a bus 504.

When an instruction is input by operation and the like of an input unit 506 by a user through the input/output interface 505, the CPU 501 executes the program stored in the ROM 502 according to the same. Alternatively, the CPU 501 loads the program stored in the storage unit 508 onto a RAM (random access memory) 503 to execute.

According to this, the CPU 501 performs the process according to the above-described flowchart or the process performed by the configuration of the above-described block diagram. Then, the CPU 501 outputs a processed result from an output unit 507 or transmits the same from a communication unit 509, and further records the same on the storage unit 508 through the input/output interface 505, for example, as needed.

Meanwhile, the input unit 506 is composed of a keyboard, a mouse, a microphone and the like. The output unit 507 is composed of a LCD (liquid crystal display), a speaker and the like.

Herein, in this specification, the process performed by the computer according to the program is not necessarily required to be performed in chronological order along the order described as the flowchart. That is, the process performed by the computer according to the program also includes the process executed in parallel or independently executed (for example, a parallel process and a process by an object).

The program may be processed by one computer (processor) or processed by a plurality of computers. Further, the program may be transmitted to a remote computer to be executed.

The embodiments of this technology are not limited to the above-described embodiments and various modifications may be made without departing from the scope of this technology.

Meanwhile, this technology may also have a following configuration.

(1)

An image processing device, including:

an image processing unit, which corrects a depth image formed of a depth value indicating a position in a depth direction of each pixel of a color image of a predetermined viewpoint based on viewer positional information being information indicating a position of a viewer.

(2)

The image processing device according to (1), wherein the image processing unit determines a correction amount of each pixel of the depth image of the predetermined viewpoint so as to be larger for the pixel corresponding to the depth value indicating that the position in the depth direction is on a nearer side in the depth image of the predetermined viewpoint based on the viewing positional information and corrects the depth value by the correction amount of the pixel for each pixel.

(3)

The image processing device according to (2), wherein the image processing unit corrects the depth value of each pixel of the depth image of the predetermined viewpoint in a direction toward a near side by the correction amount when the position of the viewer is on a side closer to a display device, which displays the color image of the predetermined viewpoint based on the depth image of the predetermined viewpoint corrected by the image processing unit, than a predetermined initial position and corrects the depth value of each pixel of the depth image of the predetermined viewpoint in a direction toward a far side by the correction amount when the position of the viewer is on a side opposite to the display device across the predetermined initial position.

(4)

The image processing device according to any one of (1) to (3) wherein the image processing unit determines a central point of scaling of the depth image and the color image of the predetermined viewpoint based on the viewer positional information, determines a scaling rate of each pixel of the depth image and the color image of the predetermined viewpoint so as to be larger for the pixel corresponding to the depth value indicating that a distance from the central point is larger and the position in the depth direction is on a nearer side, and performs the scaling of the depth value and a pixel value forming the color image of the predetermined viewpoint centering around the central point at the scaling rate of the pixel for each pixel.

(5)

The image processing device according to (4), wherein.

the image processing unit enlarges the depth value of each pixel of the depth image of the predetermined viewpoint at the scaling rate when the position of the viewer is on the side closer to the display device, which displays the color image of the predetermined viewpoint based on the depth image of the predetermined viewpoint corrected by the image processing unit, than the predetermined initial position and reduces the depth value of each pixel of the depth image of the predetermined viewpoint at the scaling rate when the position of the viewer is on the side opposite to the display device across the predetermined initial position.

(6)

The image processing device according to (5), further including:

an enlarging processing unit, which enlarges the depth image of the predetermined viewpoint, wherein the image processing unit performs the scaling of the depth image of the predetermined viewpoint enlarged by the enlarging processing unit based on the viewer positional information.

(7)

The image processing device according to any one of (1) to (6), wherein the image processing unit also performs a process to improve enhancement or a contrast to an area in the vicinity of a point of gaze of the color image of the predetermined viewpoint based on point-of-gaze positional information indicating a position of the point of gaze of the viewer and performs a process to reduce the enhancement or the contrast to an area other than the area in the vicinity of the point of gaze.

(8)

The image processing device according to any one of (1) to (7), further including:

a display control unit, which performs a projecting process to project the color image of the predetermined viewpoint on the position of the viewer based on the positional information and the depth image of the predetermined viewpoint corrected by the image processing unit and allows the display device to display the color image of the predetermined viewpoint obtained as a result of the projecting process.

(9)

The image processing device according to any one of (1) to (8), further including:

a selecting unit, which selects the depth image of the predetermined viewpoint from depth images of a plurality of viewpoints based on the positional information.

(10)

The image processing device according to any one of (1) to (8), further including:

a selecting unit, which selects the depth images of a plurality of predetermined viewpoints from the depth images of a plurality of viewpoints based on the positional information; and a combining unit, which combines the depth images of the plurality of predetermined viewpoints selected by the selecting unit to generate the depth image of the predetermined viewpoint.

(11)

The image processing device according to any one of (1) to (7), wherein the predetermined viewpoint is a plurality of viewpoints, and the image processing unit corrects the depth image of the viewpoint based on the positional information for each viewpoint of the predetermined viewpoints.

(12)

The image processing device according to (11), further including:

a display control unit, which performs a projecting process to project the color image of the predetermined viewpoint on the position of the viewer based on the positional information and the depth image of the predetermined viewpoint corrected by the image processing unit and allows the display device, which displays an image of viewpoints more than the predetermined viewpoints, to display the color image of the predetermined viewpoint obtained as a result of the projecting process for each viewpoint of the predetermined viewpoints; and a selecting unit, which selects the viewpoint assigned to the color image of the predetermined viewpoint obtained as the result of the projecting process from the viewpoints corresponding to the image displayed on the display device based on the positional information and selects the depth image of the predetermined viewpoint from depth images of a plurality of viewpoints based on the viewpoint.

(13)

The image processing device according to (11), further including:

a display control unit, which performs a projecting process to project the color image of the predetermined viewpoint on the position of the viewer based on the positional information and the depth image of the predetermined viewpoint corrected by the image processing unit and allows a display device, which displays an image of viewpoints more than the predetermined viewpoints, to display the color image of the predetermined viewpoint obtained as a result of the projecting process for each viewpoint of the predetermined viewpoints;

a selecting unit, which selects the viewpoint assigned to the color image of the predetermined viewpoint obtained as the result of the projecting process from the viewpoints corresponding to the image displayed on the display device based on the positional information and selects color images of a plurality of predetermined viewpoints from the color images of a plurality of viewpoints based on the viewpoint; and a combining unit, which combines the color images of the plurality of predetermined viewpoints selected by the selecting unit to generate the color image of the predetermined viewpoint.

(14)

The image processing device according to (11), further including:

a projecting processing unit, which performs a projecting process to project the color image of the predetermined viewpoint on the position of the viewer based on the positional information and the depth image of the predetermined viewpoint corrected by the image processing unit for each viewpoint of the predetermined viewpoints;

a generating unit, which generates the depth image common to color images using the color images of the predetermined viewpoints obtained as a result of the projecting process by the projecting processing unit; and a display control unit, which performs the projecting process to project the color image of the predetermined viewpoint, on the position of the viewer based on the positional information and the depth image generated by the generating unit for each viewpoint of the predetermined viewpoints and allows a display device to display the color image of the predetermined viewpoint obtained as the result of the projecting process.

(15)

An image processing method, including: an image processing step of correcting a depth image formed of a depth value indicating a position in a depth direction of each pixel of a color image of a predetermined viewpoint based on viewer positional information being information indicating a position of a viewer, the step being carried out by an image processing device.

(16)

A program, which allows a computer to execute a process including an image processing step of correcting a depth image formed of a depth value indicating a position in a depth direction of each pixel of a color image of a predetermined viewpoint based on viewer positional information being information indicating a position of a viewer.

REFERENCE SIGNS LIST 10 image processing device, 12 image processing unit, 13 image display unit, 41 input viewpoint selecting unit, 42 enlarging processing unit, 43 stereoscopic effect correcting unit, 44 stereoscopic effect emphasizing unit, 45 viewpoint generating unit, 51, 61 viewpoint, selecting unit, 62 viewpoint combining unit, 81 depth correcting unit, 82 scaling unit, 100 image processing device, 102, 103 image processing unit, 104 image display unit, 121 input viewpoint selecting unit, 141, 161 viewpoint selecting unit, 171, 172 image processing unit, 173 depth detecting unit, 174 viewpoint generating unit, 260 image processing device, 262-1 to 262-N image processing unit, 263 image display unit, 281 input viewpoint selecting unit, 301, 321 viewpoint selecting unit

The invention claimed is:

1. An image processing device, comprising:
an image processing unit, which corrects a depth image formed of a depth value indicating a position in a depth direction of each pixel of a color image of a predetermined viewpoint based on a change in viewer positional information indicating that a position of a viewer is moved in a depth direction with regard to a position at which the depth image is displayed,
wherein the image processing unit determines a central point of scaling of the depth image and the color image of the predetermined viewpoint based on the change in viewer positional information, determines a scaling rate of each pixel of the depth image and the color image of the predetermined viewpoint so as to be a larger depth value scaling rate for pixels having a larger horizontal distance from the central point and a smaller initial depth value prior to the change in viewer positional information, and performs the scaling of the depth value and a pixel value forming the color image of the predetermined viewpoint centering around the central point at the scaling rate of the pixel for each pixel,
wherein the scaling rate of each pixel of the depth image and the color image of the predetermined viewpoint changes based on the change in viewer positional information, and
wherein the image processing unit is implemented via at least one processor.

2. The image processing device according to claim 1, wherein
the image processing unit corrects the depth value of each pixel of the depth image of the predetermined viewpoint in a direction toward a near side by the correction amount when the position of the viewer is on a side closer to a display device, which displays the color image of the predetermined viewpoint based on the depth image of the predetermined viewpoint corrected by the image processing unit, than a predetermined initial position and corrects the depth value of each pixel of the depth image of the predetermined viewpoint in a direction toward a far side by the correction amount when the position of the viewer is on a side opposite to the display device across the predetermined initial position.

3. The image processing device according to claim 1, wherein
the image processing unit enlarges the depth value of each pixel of the depth image of the predetermined viewpoint at the scaling rate when the position of the viewer is on a side closer to a display device, which displays the color image of the predetermined viewpoint based on the depth image of the predetermined viewpoint corrected by the image processing unit, than a predetermined initial position and reduces the depth value of each pixel of the depth image of the predetermined viewpoint at the scaling rate when the position of the viewer is on a side opposite to the display device across the predetermined initial position.

4. The image processing device according to claim 3, further comprising:
an enlarging processing unit, which enlarges the depth image of the predetermined viewpoint, wherein
the image processing unit performs the scaling of the depth image of the predetermined viewpoint enlarged by the enlarging processing unit based on the change in viewer positional information,
wherein the enlarging processing unit and the image processing unit are each implemented via at least one processor.

5. The image processing device according to claim 3, wherein the image processing unit further performs the scaling of the enlarged depth image centering around the central point at a larger scaling rate for the pixel farther from central point with a smaller depth value.

6. The image processing device according to claim 1, wherein
the image processing unit also performs a process to improve enhancement or a contrast to an area in the vicinity of a point of gaze of the color image of the predetermined viewpoint based on point-of-gaze positional information indicating a position of the point of gaze of the viewer, and performs a process to reduce the enhancement or the contrast to an area other than the area in the vicinity of the point of gaze.

7. The image processing device according to claim 1, further comprising:
a display control unit, which performs a projecting process to project the color image of the predetermined viewpoint on the position of the viewer based on the positional information and the depth image of the predetermined viewpoint corrected by the image processing unit and allows a display device to display the color image of the predetermined viewpoint obtained as a result of the projecting process, wherein the display control unit is implemented via at least one processor.

8. The image processing device according to claim 1, further comprising:

a selecting unit, which selects the depth image of the predetermined viewpoint from depth images of a plurality of viewpoints based on the positional information, wherein the selecting unit is implemented via at least one processor.

9. The image processing device according to claim 1, further comprising:

a selecting unit, which selects depth images of a plurality of predetermined viewpoints from the depth images of a plurality of viewpoints based on the positional information; and a combining unit, which combines the depth images of the plurality of predetermined viewpoints selected by the selecting unit to generate the depth image of the predetermined viewpoint, wherein the selecting unit and the combining unit are each implemented via at least one processor.

10. The image processing device according to claim 1, wherein the predetermined viewpoint is a plurality of viewpoints, and the image processing unit corrects the depth image of the viewpoint based on the positional information for each viewpoint of the predetermined viewpoints.

11. The image processing device according to claim 10, further comprising:

a display control unit, which performs a projecting process to project the color image of the predetermined viewpoint on the position of the viewer based on the positional information and the depth image of the predetermined viewpoint corrected by the image processing unit and allows a display device, which displays an image of viewpoints more than the predetermined viewpoints, to display the color image of the predetermined viewpoint obtained as a result of the projecting process for each viewpoint of the predetermined viewpoints; and a selecting unit, which selects the viewpoint assigned to the color image of the predetermined viewpoint obtained as the result of the projecting process from the viewpoints corresponding to the image displayed on the display device based on the positional information and selects the depth image of the predetermined viewpoint from depth images of a plurality of viewpoints based on the viewpoint, wherein the display control unit, the selecting unit are each implemented via at least one processor.

12. The image processing device according to claim 10, further comprising:

a display control unit, which performs a projecting process to project the color image of the predetermined viewpoint on the position of the viewer based on the positional information and the depth image of the predetermined viewpoint corrected by the image processing unit and allows a display device, which displays an image of viewpoints more than the predetermined viewpoints, to display the color image of the predetermined viewpoint obtained as a result of the projecting process for each viewpoint of the predetermined viewpoints;

a selecting unit, which selects the viewpoint assigned to the color image of the predetermined viewpoint obtained as the result of the projecting process from the viewpoints corresponding to the image displayed on the display device based on the positional information and selects color images of a plurality of predetermined viewpoints from the color images of a plurality of viewpoints based on the viewpoint; and a combining unit, which combines the color images of the plurality of predetermined viewpoints selected by the selecting unit to generate the color image of the predetermined viewpoint, wherein the display control unit, the selecting unit and the combining unit are each implemented via at least one processor.

13. The image processing device according to claim 10, further comprising:

a projecting processing unit, which performs a projecting process to project the color image of the predetermined viewpoint on the position of the viewer based on the positional information and the depth image of the predetermined viewpoint corrected by the image processing unit for each viewpoint of the predetermined viewpoints;

a generating unit, which generates the depth image common to color images using the color images of the predetermined viewpoints obtained as a result of the projecting process by the projecting processing unit; and a display control unit, which performs the projecting process to project the color image of the predetermined viewpoint on the position of the viewer based on the positional information and the depth image generated by the generating unit for each viewpoint of the predetermined viewpoints and allows a display device to display the color image of the predetermined viewpoint obtained as the result of the projecting process, wherein the projecting processing unit, the generating unit and the display control unit are each implemented via at least one processor.

14. An image processing method, the method being executed via at least one processor, and comprising:

correcting a depth image formed of a depth value indicating a position in a depth direction of each pixel of a color image of a predetermined viewpoint based on a change in viewer positional information indicating that a position of a viewer is moved in a depth direction with regard to a position at which the depth image is displayed, the processing of the depth image being carried out by an image processing device, determining a central point of scaling of the depth image and the color image of the predetermined viewpoint based on the change in viewer positional information, determining a scaling rate of each pixel of the depth image and the color image of the predetermined viewpoint so as to be a larger depth value for pixels having a larger horizontal distance from the central point and a smaller initial depth value prior to the change in viewer positional information, and performing the scaling of the depth value and a pixel value forming the color image of the predetermined viewpoint centering around the central point at the scaling rate of the pixel for each pixel, wherein the scaling rate of each pixel of the depth image and the color image of the predetermined viewpoint changes based on the change in viewer positional information.

15. A non-transitory computer-readable storage medium having stored thereon a program, which when executed by a computer causes the computer to execute a method, the method comprising correcting a depth image formed of a depth value indicating a position in a depth direction of each pixel of a color image of a predetermined viewpoint based on a change in viewer positional information indicating that a position of a viewer is moved in a depth direction with regard to a position at which the depth image is displayed,
- determining a central point of scaling of the depth image and the color image of the predetermined viewpoint based on the change in viewer positional information,
- determining a scaling rate of each pixel of the depth image and the color image of the predetermined viewpoint so as to be a larger depth value scaling rate for pixels having a larger horizontal distance from the central point and a smaller initial depth value prior to the change in viewer positional information, and
- performing the scaling of the depth value and a pixel value forming the color image of the predetermined viewpoint centering around the central point at the scaling rate of the pixel for each pixel,
- wherein the scaling rate of each pixel of the depth image and the color image of the predetermined viewpoint changes based on the change in viewer positional information.

* * * * *